US012661828B2

(12) United States Patent
Alva

(10) Patent No.: US 12,661,828 B2
(45) Date of Patent: Jun. 23, 2026

(54) MACHINE FOR BEVEL ("MITER") CUTTING A SLAB WITH FINISHED FACE DOWN FOR MAKING A FARM SINK AND RELATED METHOD

(71) Applicant: POSEIDON INDUSTRIES, INC., Punta Gorda, FL (US)

(72) Inventor: Jose Antonio Alva, North Port, FL (US)

(73) Assignee: POSEIDON INDUSTRIES, INC., Punta Gorda, FL (US)

( * ) Notice: Subject to any disclaimer, the term of this patent is extended or adjusted under 35 U.S.C. 154(b) by 331 days.

(21) Appl. No.: 18/469,595

(22) Filed: Sep. 19, 2023

(65) Prior Publication Data

US 2025/0091250 A1 Mar. 20, 2025

(51) Int. Cl.
*B28D 1/04* (2006.01)
*B28D 7/00* (2006.01)

(52) U.S. Cl.
CPC ............. *B28D 1/043* (2013.01); *B28D 7/005* (2013.01)

(58) Field of Classification Search
CPC .......... B28D 1/04; B28D 1/043; B28D 1/044; B28D 1/047; B28D 1/048; B28D 1/00; B28D 1/005; B28D 7/005; B28D 7/046; B28D 7/04; B24B 7/22; B24B 41/005; B24B 41/047; B24B 41/068; B24B 41/06; B24B 9/06; B24B 27/0084; B23Q 2240/002; B23Q 3/088; B23D 47/02; B23D 47/024; B23D 47/025; B23D 47/027; B65G 2249/04; B65G 2249/045; B65G 49/064; B65G 49/067; B65G 49/061
USPC ..... 125/35, 13.01, 4, 8; 451/5, 44, 362, 363, 451/342, 388
See application file for complete search history.

(56) References Cited

U.S. PATENT DOCUMENTS

| | | | | |
|---|---|---|---|---|
| 6,006,735 | A * | 12/1999 | Schlough | B24B 9/06 451/65 |
| 7,241,981 | B2 * | 7/2007 | Hofmann | A43D 95/14 353/122 |
| 8,365,715 | B2 | 2/2013 | Toncelli | |
| 8,528,536 | B2 | 9/2013 | Jacobsson et al. | |
| 9,409,242 | B2 * | 8/2016 | Guazzoni | B28D 1/00 |
| 9,533,430 | B1 | 1/2017 | Kalb | |
| 10,607,332 | B2 | 3/2020 | Olson et al. | |

(Continued)

OTHER PUBLICATIONS

U.S. Appl. No. 18/327,101, filed Jun. 1, 2023 Inventor: Jose Antonio Alva.

(Continued)

*Primary Examiner* — Robert F Neibaur
(74) *Attorney, Agent, or Firm* — ALLEN, DYER, DOPPELT + GILCHRIST, PA

(57) ABSTRACT

A slab processing machine includes a work table, a machining head and at least one drive mechanism that drives the machining head over the work table in an X, Y, Z coordinate axis and rotates the machining head for C-axis rotation and A-axis rotation. A controller is connected to the machining head and at least one drive mechanism and operates the machining head to rotate the machining head on the A-axis and bevel cut in the slab a sink hole for a farm sink while the slab is positioned upside down with the finished face down on the vacuum pods.

22 Claims, 55 Drawing Sheets

(56) References Cited

U.S. PATENT DOCUMENTS

| | | | | |
|---|---|---|---|---|
| 2017/0252945 | A1* | 9/2017 | Traini | B24B 7/224 |
| 2023/0019907 | A1 | 1/2023 | Mantenuto | |

OTHER PUBLICATIONS

U.S. Appl. No. 18/469,582, filed Sep. 19, 2023 Inventor: Jose Antonio Alva.

U.S. Appl. No. 18/469,589, filed Sep. 19, 2023 Inventor: Jose Antonio Alva.

* cited by examiner

MACHINE FOR BEVEL ("MITER") CUTTING A SLAB WITH FINISHED FACE DOWN FOR MAKING A FARM SINK AND RELATED METHOD

FIELD OF THE INVENTION

The present invention relates to the field of stone processing, and more particularly, this invention relates to bevel cutting stone or stone-like slabs with finished face down, and adhering lamination strips to side edge areas of the slab and associated method.

BACKGROUND OF THE INVENTION

A stone or stone-like slab is commonly used in building construction. For example, granite, quartz, marble, soapstone, engineered stone, and other quarry stones are often selected for use as flooring, tables, countertops, and kitchen sinks. These stone slabs may also be formed from a combination of natural and synthetic materials and include binders, and have improved qualities and aesthetic characteristics, reproducibility, and stain-resistant or heat-resistant properties. Stone slabs usually have certain features that must be taken into account during processing, which includes cutting and fabrication, especially for counter tops, kitchen sinks, and other end-use applications that require high aesthetic consideration.

For example, the stone slabs may have grain, i.e., vein patterns, that dictate the desired positioning of a countertop or similar product to be cut from the stone. The countertop may be more aesthetically pleasing if the grain pattern extends in a certain direction. Other cut sections from the same or similar stone slab that are arranged in the same location in the home should match the vein pattern.

Cutting the outline of the slab and cutting any sink holes, cut-outs, or other slab details is important and requires precision cutting. Many vendors employ a three axis cutting machine having a circular saw blade. These machines are often used in the industry to cut the outer perimeter of the slab, followed by cutting sink holes using the circular saw blade. The slab outline may be initially cut, and then manually repositioned for sink hole cutting.

Sometimes the cutting tool is a router or finger bit that may be used with repeated cutting passes to gradually cut a sink hole. This is a slow process since repeated passes are made with each router pass making a deeper cut into the slab. To alleviate the slow processing time associated with normal finger bit cutting, the circular saw blade is employed instead of a router bit, but even then, there are usually issues with circular blade cutting since it may not be possible to make accurate deep cuts since the blade runs into the table surface during cutting, creating friction, drag and heat. For this reason, sink hole cutting on stone slabs and similar slab cutting is challenging when the aesthetic considerations of the slab are taken into consideration and accurate and clean cuts are required, without unduly slowing the slab processing into a finished product.

Currently, the industry standard for fabrication of kitchen countertops, made of natural stone (granite, quartz, marble, travertine, quartzite, or porcelain), is divided into three phases. In the first phase of cutting, the basic shape of a custom kitchen countertop is cut out of a slab of stone, which typically is about 2-3 centimeters thick and usually about 120 inches by about 60 inches. The industry standard solution at the first phase is a remote-controlled bridge saw, or a handsaw, or a CNC bridge saw or CNC saw jet. These methods require one laborer.

The second phase in fabrication of the countertop is preparation. Once the slab shapes have been removed from the saw table, no matter which method is used to cut them, it must have radius and sink cut-outs (holes) done by hand or by a CNC router. This phase is called preparation because it is finalizing the two-dimensional shaping of all countertops before moving to the "edging/finishing" stage.

The third phase as edging finishing requires placing the edge profile on the inside of the sink holes and the exterior edging and polishing. This is currently accomplished by a second laborer aside from the first laborer used for the phase one cutting. This part may also be performed by a laborer by hand or an operator who will perform this with a CNC router.

These three phases are labor intensive and time consuming and improvements have been long desired in the industry, but the technical achievement has not been realized.

When cutting a slab of stone with a traditional manually controlled bridge saw or a computer numerical control saw, both which use 14 inch, 16 inch, or 18 inch diameter diamond blades, there is an "overcut" corresponding to how far past a measurement the blade must cut in order to have the slab pieces detached from each other in the slab. For example, if a countertop is 80 inches by 26 inches, the blade will travel 4.5 inches before the 80 inch cut and 4.5 inches after, or the center of the blade motor must travel from 0 inches to 80 inches. This holds true for the other side of the slab. Thus, the slab pieces must be "nested" inside of a slab with a distance of 4.6 inches between each other to ensure separation.

In current stone slab processing machines, there are various processing techniques for cutting. For example, in order to allow tighter distances between slab pieces, less than 4.6 inches, some techniques employ a CNC saw/waterjet combination, where the waterjet performs the final few inches of a cut to avoid the curved "overcut" of the diamond blade. This cutting technique is costly and inefficient because the waterjet process is slow and adds high overhead to the machine operation. There is also time that must be spent to remove the waterjet scuff marks, such as removing either by hand or by machine.

In another slab processing technique, rubber vacuum cups or pads are attached to the cutting unit of the CNC saw to grab the slab piece and perform what is termed a "cut and move." This process works by the machine performing what is known as a "horizontal" cut, and in an example, moving to the "north" piece, grabbing that north piece by rubber pads, and moving it out of harm's way to 4.6 inches or greater distance before returning to perform a "vertical" cut on the south piece. This is time-consuming when performed throughout the day. There may be over one hour of "cut and move" time, thus, diminishing the total daily cutting time on the machine making the machine less proficient. More efficient cutting techniques are desirable.

Some countertops of stone are processed using what some in the stone slab industry refer to as a "miter" cut, where the blade is angled at 45° to form a bevel cut. This process allows for stone slab pieces to be glued together and avoid the step of polishing the outside edge with profile wheels or tools, either by hand or by a CNC router. A stone slab may be polished completely on one side in pieces and then "strips" or "aprons" are cut from the slab. In this process, the main countertop has sides that are beveled cut at 45°, also called "mitered" by some in the industry, and the strip/aprons are also cut at 45° so that both sides can be glued together.

In one technique using a manually controlled bridge saw or handsaw, the operator has the ability to position a diamond circular saw blade at a 45° angle, and the slab is cut with the slab or stone positioned on a concrete, wood or waterjet work table with the polished face of the slab facing upwards. There are technical problems with this technique. First, the imperfect level of the substrate causes deviations in the measurement of the bevel cuts. Second, because most stone or engineered stone materials used for countertops do not have consistent thickness throughout, there is even more imperfection in the measurements between the bevel cuts. Some CNC saw makers have implemented a thickness probe process to help, but that process adds at least about 15 minutes before each cutting cycle and only helps obtain a better error measurement, but there are still imperfect measurements. For example, when the bevel is cut, the blade appears to cut in a rise and fall manner. This effect occurs for several reasons, notably that the level of the work table makes this effect and there are gaps. One way to alleviate this problem has been to run the blade over the material and measure with a tape measure, for example, to determine the variation on one side compared to the other side. One side may be shimmed up, e.g., a quarter inch to be level with the other side. If the blade, however, had been cutting across the granite slab and lowering and rising as it moves, this is changing the sideways measurement on the bevel. That is unacceptable.

This problem becomes more acute when manufacturing "farm sinks," where the interior shape of a sink hole for the farm sink is cut on a bevel at a 45° angle, i.e., the "miter" cut as called by some skilled in the art. This is currently accomplished by hand, which takes about one hour, or accomplished with a waterjet cutter, which takes about 9 inches per minute to cut, plus about three minutes per inch to clean off waterjet scuff marks by hand before laminating/gluing the beveled edges of the farm sink. As a result, the slab cutting for a farm sink may take at least about 1 to 2 hours to prepare the slab pieces for gluing. This is also time consuming and difficult because the cutting occurs with the slab's polished or finished face up, and that orientation imparts measurement accuracy and quality of cut issues because most substrate surfaces of a work table have an unlevel surface. It is also difficult to cut and separate side corners of slab cuts.

Another slab processing issue arises when dealing with the thickness of different slab sections used, for example, for countertops. There are normally two main choices of slab thickness, i.e., 2 centimeters (e.g., about 0.75 inches) or 3 centimeters (e.g., about 1.25 inches). Sometimes, strips of about 1.5 inches to 3.0 inches wide are cut and glued to the outer side edge areas of the slab, a process also called "laminating" to build up the outer edge of the countertop. The cutting usually occurs using a bridge or CNC saw or CNC saw jet, especially in these areas where there is an edge detail. This is usually accomplished with 2 centimeter material, but it can also be accomplished with 3 centimeter material. For example, a 2 centimeter slab material may be laminated to become a 4 centimeter slab at the outer edge of the slab, making the countertop appear thicker overall.

Currently, this process is done by cutting slab pieces into countertop shapes with a handsaw, bridge saw, or saw jet robot or bridge saw jet. The pieces are removed from a portion of the work table and moved to another section of the work table or another work table altogether, where pieces are manually laid upside down. Using an angle grinder, a worker mills the rough side of the lamination strips and that area of the slab where the lamination strip will be glued to perform the "build-up" of the 2 centimeter+2 centimeter edge of the slab, to make sure surfaces are smooth and flat when they are glued together. This creates much dust and the process is slow because it is done by hand. The pieces are then glued together, i.e., the lamination strips glued onto the slab side edge portions and allowed to dry. The glue may be common "akemi" or epoxy and pieces may be held together with C-clamps to ensure nothing moves. The pieces are glued tight so as not to leave a visible seam where the pieces meet when the edge detail is done. This is all currently accomplished by hand.

After the glued pieces are dry, the pieces are flipped over and the edge is usually profiled by hand, and then polished by hand because it is cumbersome to place these slab pieces on a CNC router. Cutting the thicker 4 centimeter edge is slower because that edge is thicker than the average 3 centimeter edge, and feed rates are slower on the CNC (Computer Numerical Control) machines. Therefore, many of these lamination jobs are completely done by hand using a manual worker after the slab comes off the bridge saw, i.e., after step 1 when cutting the basic custom kitchen countertop.

SUMMARY OF THE INVENTION

This summary is provided to introduce a selection of concepts that are further described below in the Detailed Description. This summary is not intended to identify key or essential features of the claimed subject matter, nor is it intended to be used as an aid in limiting the scope of the claimed subject matter.

A slab processing machine may comprise a work table, a machining head, and at least one drive mechanism connected thereto configured to drive the machining head over the work table in an X, Y, Z coordinate axis and rotate the machining head for C-axis rotation and A-axis rotation. The machining head may be configured to mount a circular saw blade for respective cutting of a stone or stone-like slab positioned on the work table with a finished face of the slab down on vacuum pods. A controller may be connected to the machining head and at least one drive mechanism. The controller may be configured to operate the machining head to rotate the machining head on the A-axis and bevel cut in the slab a sink hole for a farm sink while the slab is positioned upside down with the finished face down on the vacuum pods.

The controller may be configured to operate the machining head to bevel cut pieces from the slab that are configured in geometry to be adhered at an inside bevel cut edge of the sink hole and to respective bevel cut edges of each other, forming the sides of the farm sink. The slab piece remaining from the bevel cut sink hole is configured to be adhered to a lower bevel cut edge of the bevel cut pieces forming the bottom of the farm sink, with the finished face exposed as the bottom of the farm sink. The machining head is rotated about 45 degrees on the A-axis for bevel cutting.

A laser projector may be connected to said controller, which may be configured to project a first slab cut layout from the laser projector onto the work table to aid in positioning the slab upside down with the finished face down on vacuum pods positioned on the work table. The slab may be oriented finished face down based upon a first mirror imaged slab cut layout that is projected from the laser projector. The slab may be oriented with the respective first mirror imaged slab cut layout that is based upon a slab cut layout on the finished face of the slab. The head may be configured to mount the circular saw blade, a finger bit, a milling wheel or at least one finishing tool for respective cutting, routing, milling or finishing of stone or stone-like slabs positioned on vacuum pods upside down with the finished face down.

A bridge may be mounted for movement on guide rails of a frame and support a carriage. A machine yoke may be rotatably mounted at the lower end of the carriage and configured for C-axis rotation. The machine yoke may comprise opposing support arms. The machining head may be rotatably mounted between the support arms and configured for A-axis rotation for bevel cutting.

A method of operating a slab processing machine having a work table, a machining head, at least one drive mechanism connected thereto, and a controller connected to the at least one drive mechanism includes positioning a stone or stone-like slab upside down on vacuum pods on the work table with a finished face of the slab down on the vacuum pods and mounting a circular saw blade within the machining head. The method further includes controlling the at least one drive mechanism to drive the machining head over the work table in an X, Y, Z coordinate axis and rotate the machining head for C-axis rotation and A-axis rotation, rotating the machining head on the A-axis into a predetermined bevel angle, and bevel cutting in the slab a sink hole for a farm sink while the slab is positioned upside down with the finished face down on the vacuum pods.

BRIEF DESCRIPTION OF THE DRAWINGS

Other objects, features and advantages of the present invention will become apparent from the Detailed Description of the invention which follows, when considered in light of the accompanying drawings in which.

DETAILED DESCRIPTION

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

Figure 1:
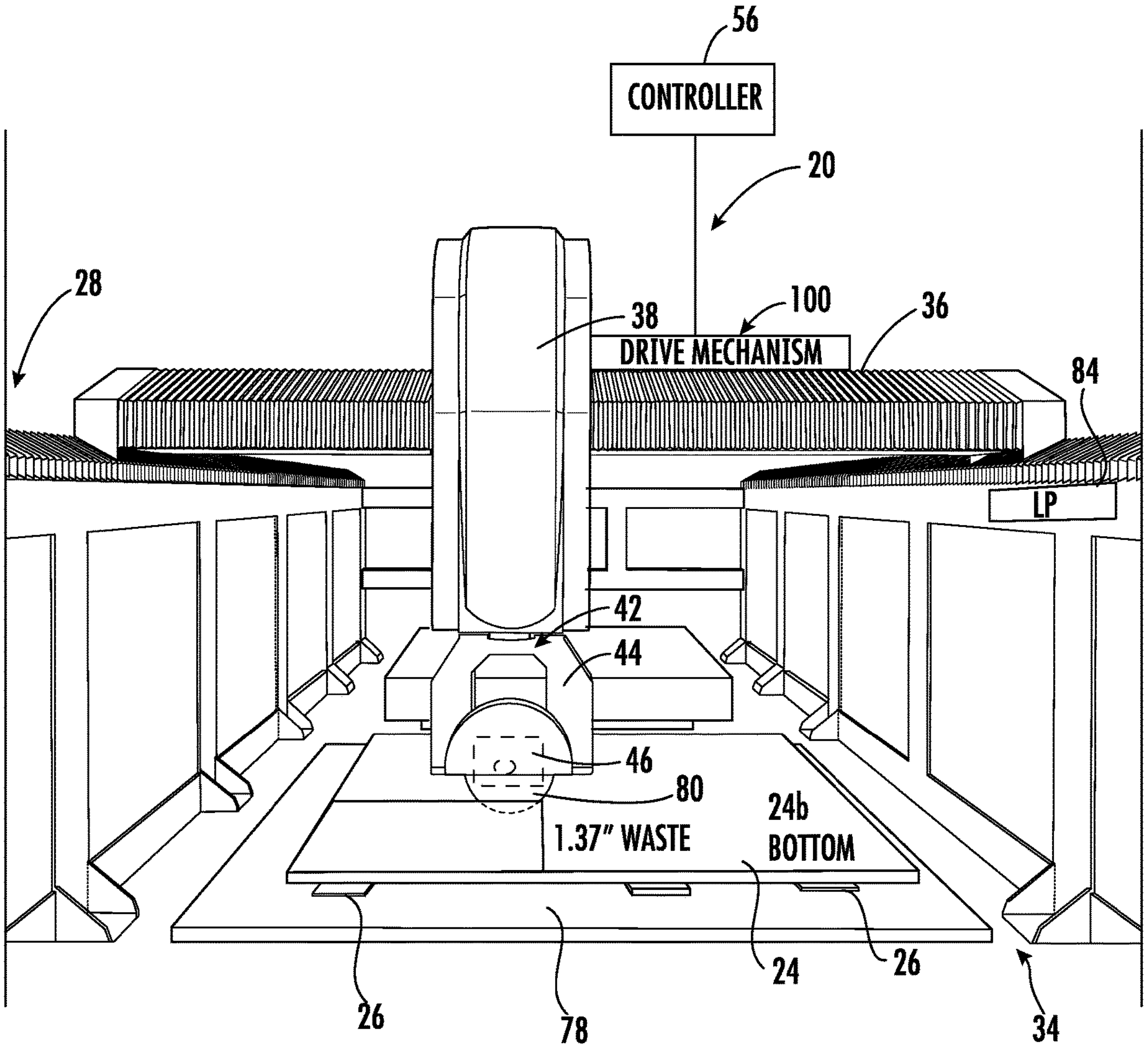
FIG. 1 is a schematic, isometric view of the dual work table, slab processing machine showing a slab being cut with finished face down on raised vacuum pods and showing minimal waste in accordance with the invention.
Figure 2:
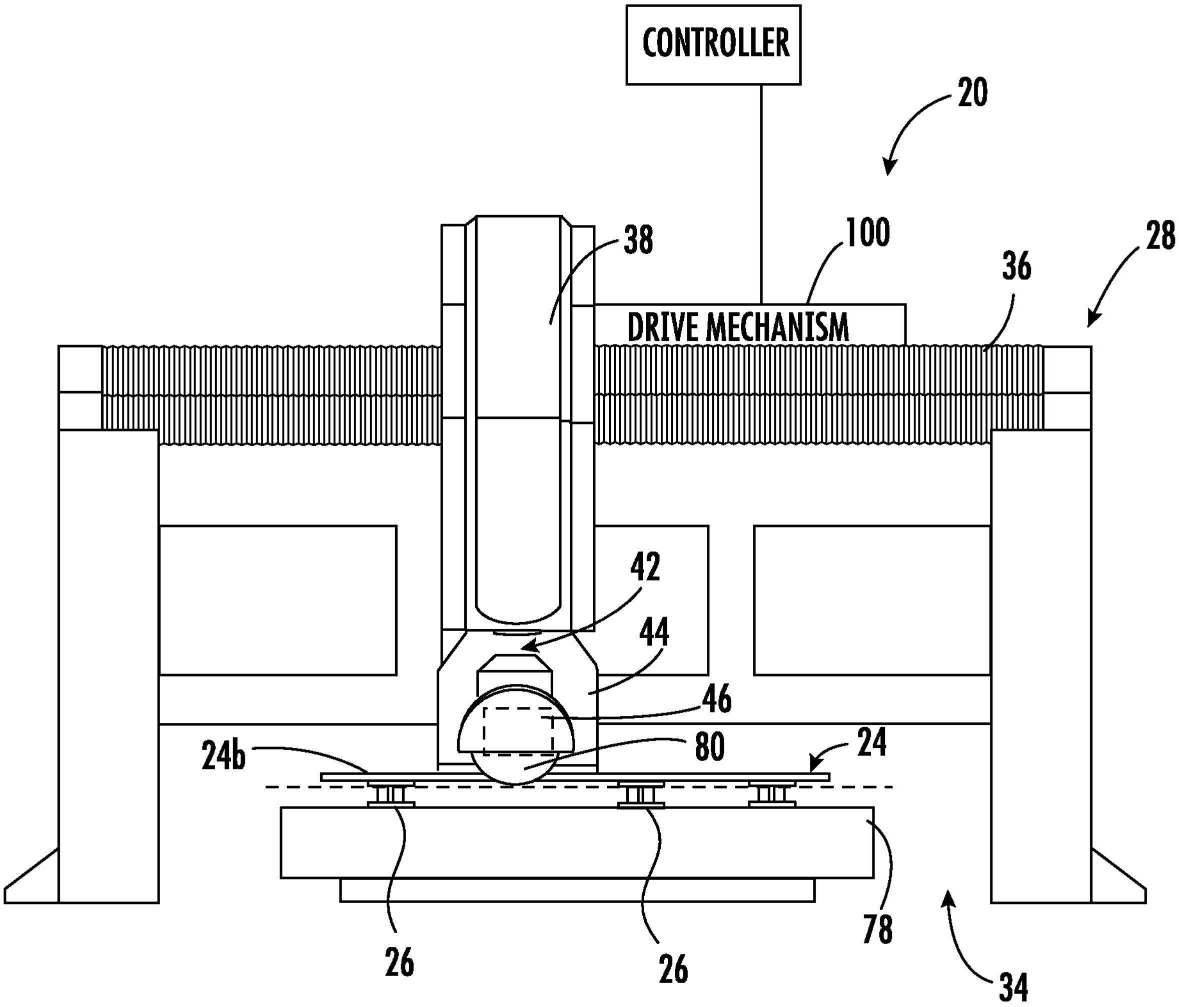
FIG. 2 is a side elevation view of the machine of FIG. 1.
Figure 5:
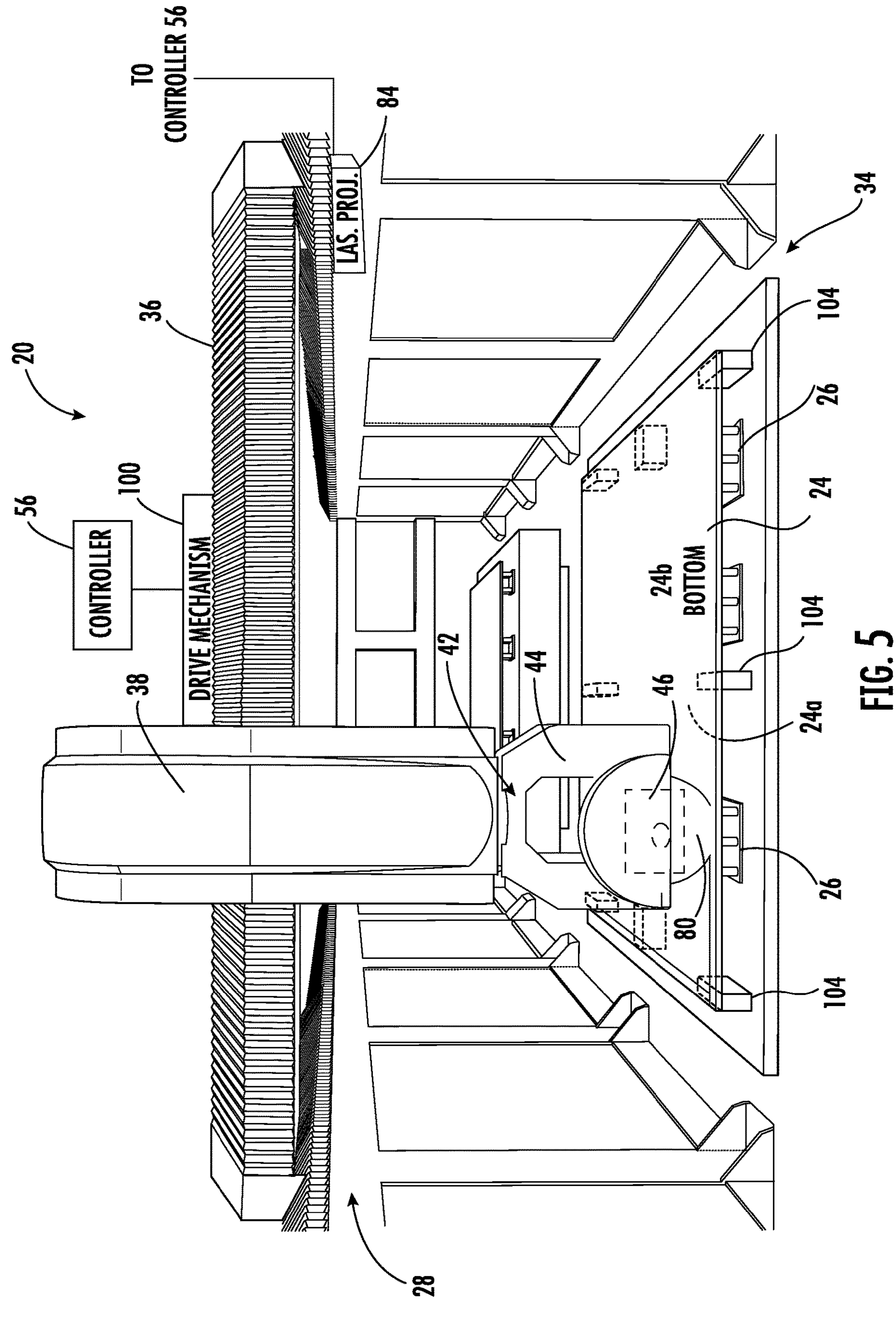
FIG. 5 is another schematic, isometric view of the machine as in FIG. 1 showing relief supports positioned on the work table under the side edges.

An example of the dual table, slab processing machine 20 for processing a stone or a stone-like slab having side edges and a finished face and bottom surface is illustrated generally at FIGS. 1, 2 and 5 and configured as a 5-axis machining center for slab processing. Reference numerals identifying components of the machine in these figures are the same as described in the description of the machine at FIG. 7 where a more detailed description of the machine components and their function is described. The machine 20 allows Phase 1 cutting to be completed when a slab 24 is positioned upside down with the finished face 24*a* down. A laser projector 84 may project a laser optical beam towards the work table 78 to position the slab 24 upside down on the work table 78 as will be explained in further detail below. In these example drawing figures, one work table 78 may be described, but as illustrated, the machine 20 may be a dual table machine and for description purposes, first and second work tables as illustrated may be described and are given the reference numerals 78*a* and 78*b*, respectively. The machine 20 cuts the pieces of the slab 24 to measurement.

The upside down cutting allows tighter nesting because overcuts are shorter due to a deeper plunge of the circular saw blade 80. There is also a reduced table maintenance because the circular saw blade 80 cuts through the stone in the air as shown in FIGS. 1 and 2, where the slab 24 is raised from the work table because the slab is positioned on vacuum pods 26. The slab is not on top of a substrate 79 for the work table as shown in FIGS. 3 and 4, where a deep plunge is not possible and the blade 80 encounters friction against the substrate when cutting.

Figure 3:
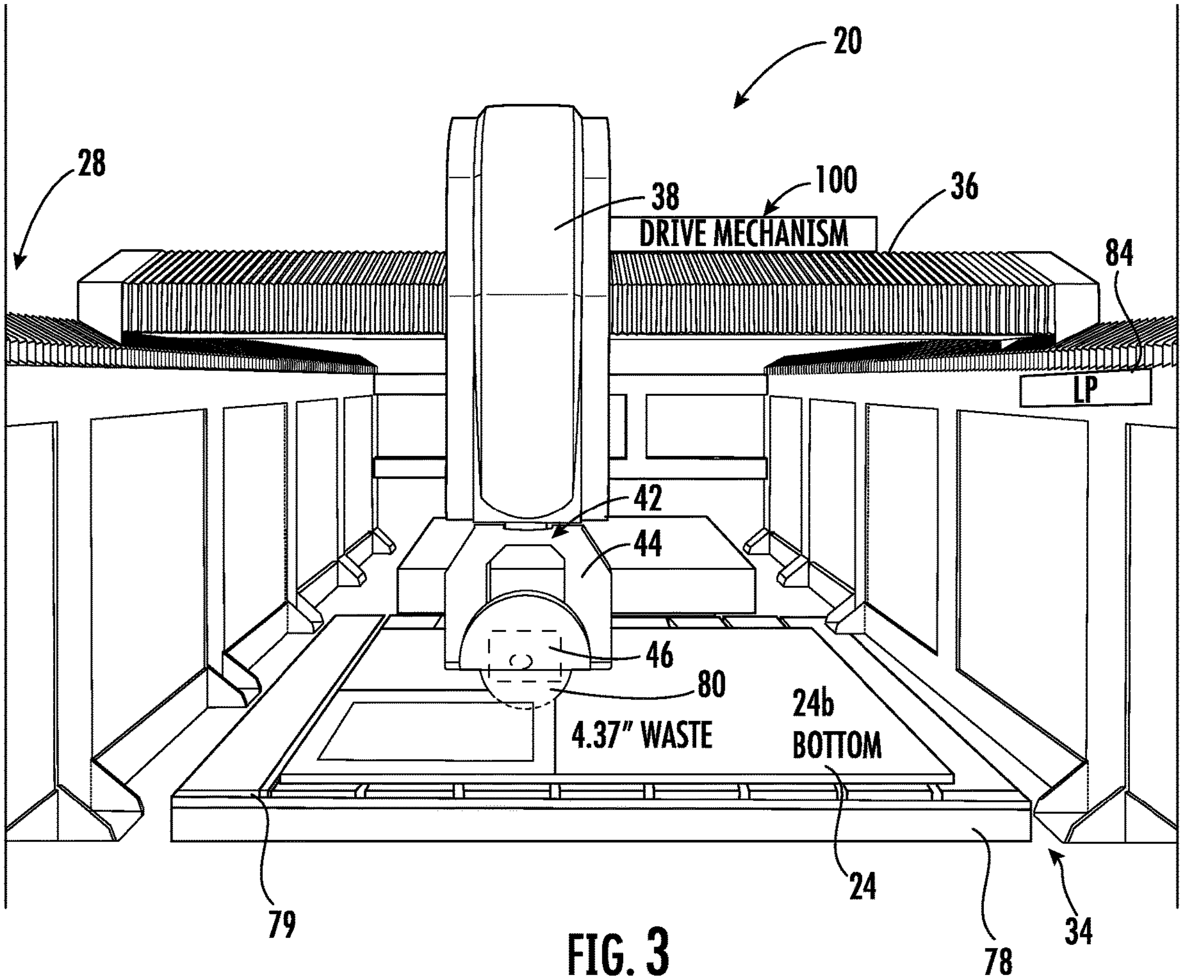
FIG. 3 is a schematic, isometric view of a machine similar to that of FIG. 1 showing a slab being cut on top of a substrate and not vacuum pods and producing much greater waste.
Figure 4:
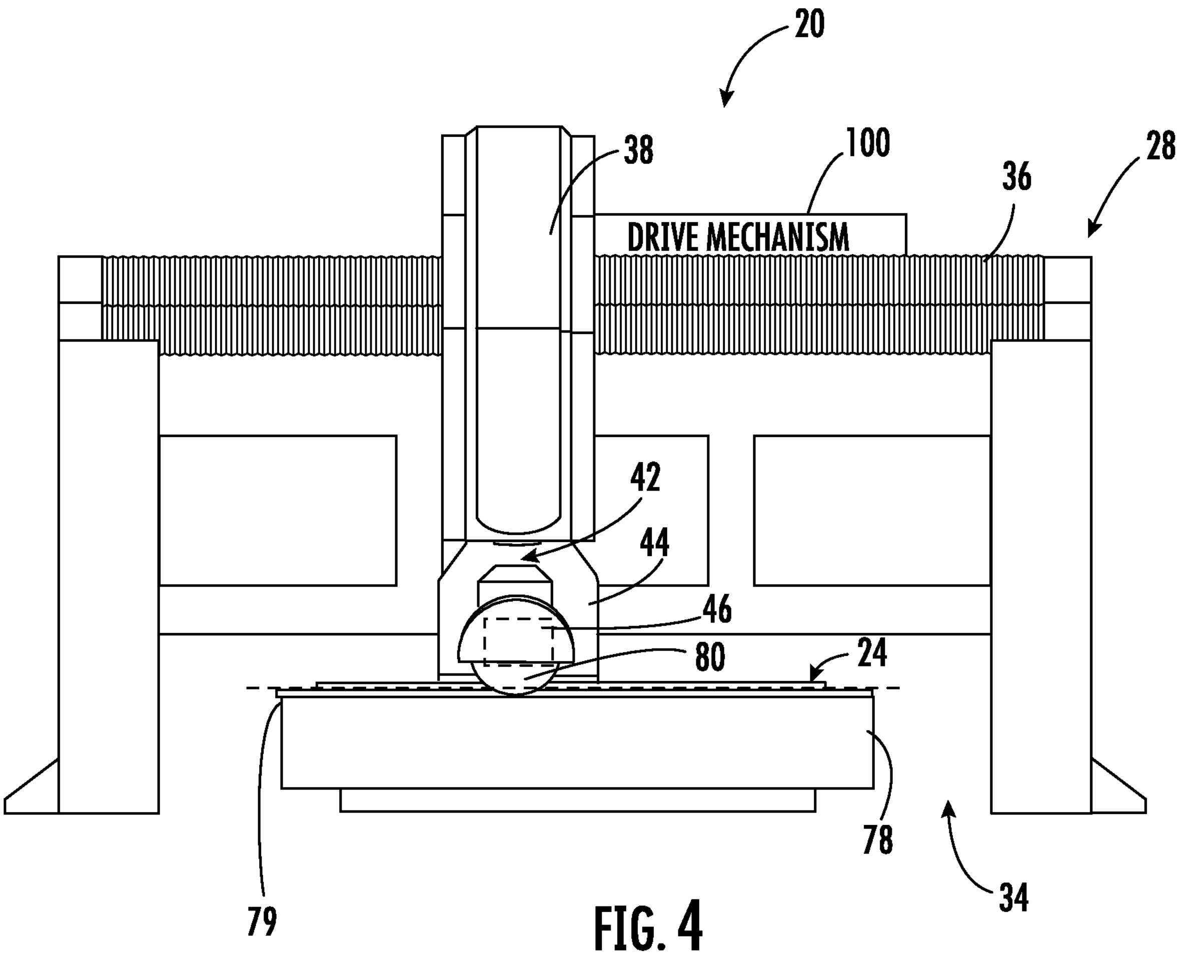
FIG. 4 is a side elevation view of the machine of FIG. 3.

A comparison may be made between the slab cutting shown in FIG. 1 and the slab cutting shown in FIG. 3, where there is much less waste when the slab 24 is on the vacuum pods 26 (FIGS. 1 and 2) instead of on the substrate 79 as shown in FIGS. 3 and 4, There is 1.37 inches of waste in the slab 24 of FIGS. 1, and 4.37 inches of waste in the slab of FIG. 3. It is also possible to separate material with a shorter distance between slab pieces by cutting and then pausing and moving the slab pieces to a new projected position via the laser projector 84 to perform a "cut and move" function without requiring a vacuum lifter in order to raise the slab pieces up and move them greater distances.

Because the machine 20 is performing upside down slab cutting, it is possible to go straight into Phases 2 and 3 for the preparation and finishing of the slab 24 right after slab cutting and perform these slab processing phases on the same work table 78 while the slab is still upside down with little or no movement of any slab pieces. This process may also be referred to as the "hybrid cycle." It should be understood that it is possible to cut polished face up on the vacuum pods 26, however, upside down cutting is preferred. However, it is advantageous to cut polished face down as described. Sink holes 64 (FIG. 7) may be cut with a finger bit 52 (FIGS. 8-11). The cutting may be performed on the rough cut side edges (FIGS. 5 and 14) or on other portions of the slab 24 as shown in FIG. 1, which permits tighter nesting.

After the slab 24 has been cut upside down, is possible to move straight to fabrication as Phases 2 and 3 of the slab processing with the same machine 20 and a single operator. This machine 20 carries out all three phases readily with one operator.

Figure 7:
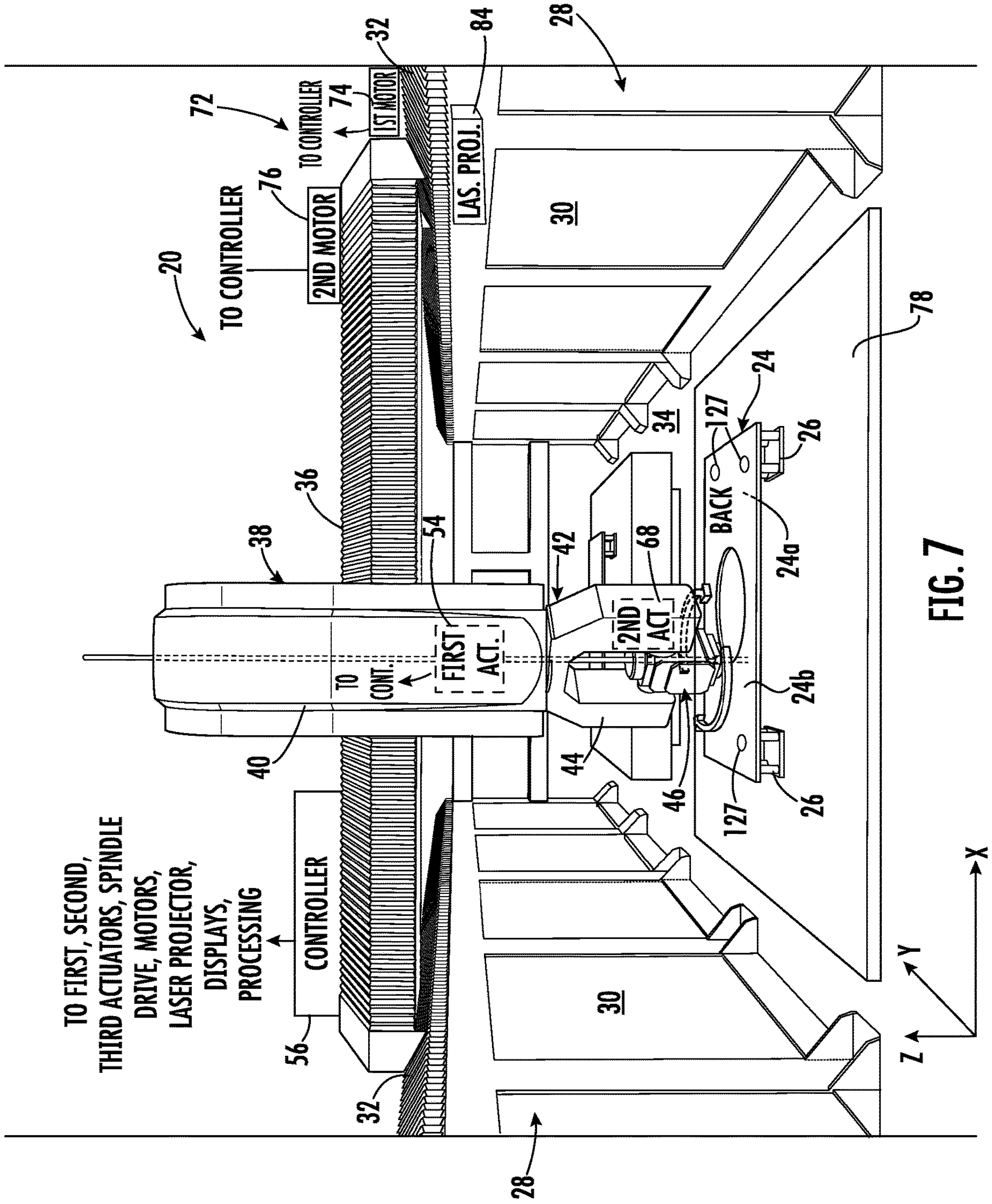
FIG. 7 is a schematic, isometric view of the machine of FIG. 1 that has switched to a finger bit received in the machining head instead of a circular blade and having reduced stresses during routing and cutting such as a sink hole.

The industry prior art standard has been to divide the slab processing of Phases 1, 2 and 3 into a process requiring two separate laborers and requiring at least two separate machines. The machine 20 and method of the current invention overcomes that disadvantage. It is also possible to maximize the machine time using dual work tables with a laser projector system that allows one table to be set up while processing occurs on the other table. This allows the operator to eliminate any down time of a single table fabrication. A work table CNC router process as shown in FIG. 7 may perform Phases 2 and 3, such as sink hole cutting and finishing and edging. This saves about 2 to about 3 hours of daily down time.

The slab 24 with its finished face 24*a* down is positioned on the vacuum pods 26, which in turn, are on the work table 78 as shown in FIGS. 1, 2, 5 and 7. The slab 24 is correctly positioned and oriented using a mirror image slab cut layout that is based upon a slab cut layout on the finished face of the slab as will be explained with reference to FIGS. 13-21. The machine 20 employs the circular saw blade 80 mounted on a spindle 50 to cut the rough cut side edges of the slab, or other sections of the slab, upside down while positioned on the vacuum pods 26 and following the mirror image slab cut layout to produce a substantially finished slab.

As shown in FIGS. 1, 2 and 5 and described in greater detail with reference to FIG. 7, the machine 20 includes a frame 28 defining a slab processing area 34 in which the slab 24 to be processed extends along an X and Y coordinate axis. The frame 28 in this description may include those fixed sections that support the moving components and those moving components that support cutting, routing and finishing tools. The work table 78 is positioned at the slab processing area 34 and includes vacuum pods 26 on which the slab is positioned with the finished face down 24*a* for cutting. In an example, because the slab 24 is upside down, the slab is initially oriented on the vacuum pods using a mirror imaged slab cut layout that is based upon a slab cut layout initially produced on the finished face of the slab as described later with reference to FIGS. 13-21.

The bridge 36 is mounted for movement on the frame 28 across the slab processing area 34. The bridge 36, although movable, in some examples, may be considered as part of and an extension of the frame 28 to support the machining head 46. The carriage 38 is formed as a vertical column and supports a machining head 46, e.g., cut head. The carriage 38 is mounted on the bridge 36 and configured for vertical movement along a Z-coordinate axis and horizontal movement on the bridge to define movement of a lower end of the carriage that supports the machining head 46 along the X, Y and Z coordinate axes. The carriage 38, although movable, in some examples, may be considered as part of and an extension of the frame 28 to support the machining head 46.

Figure 12:
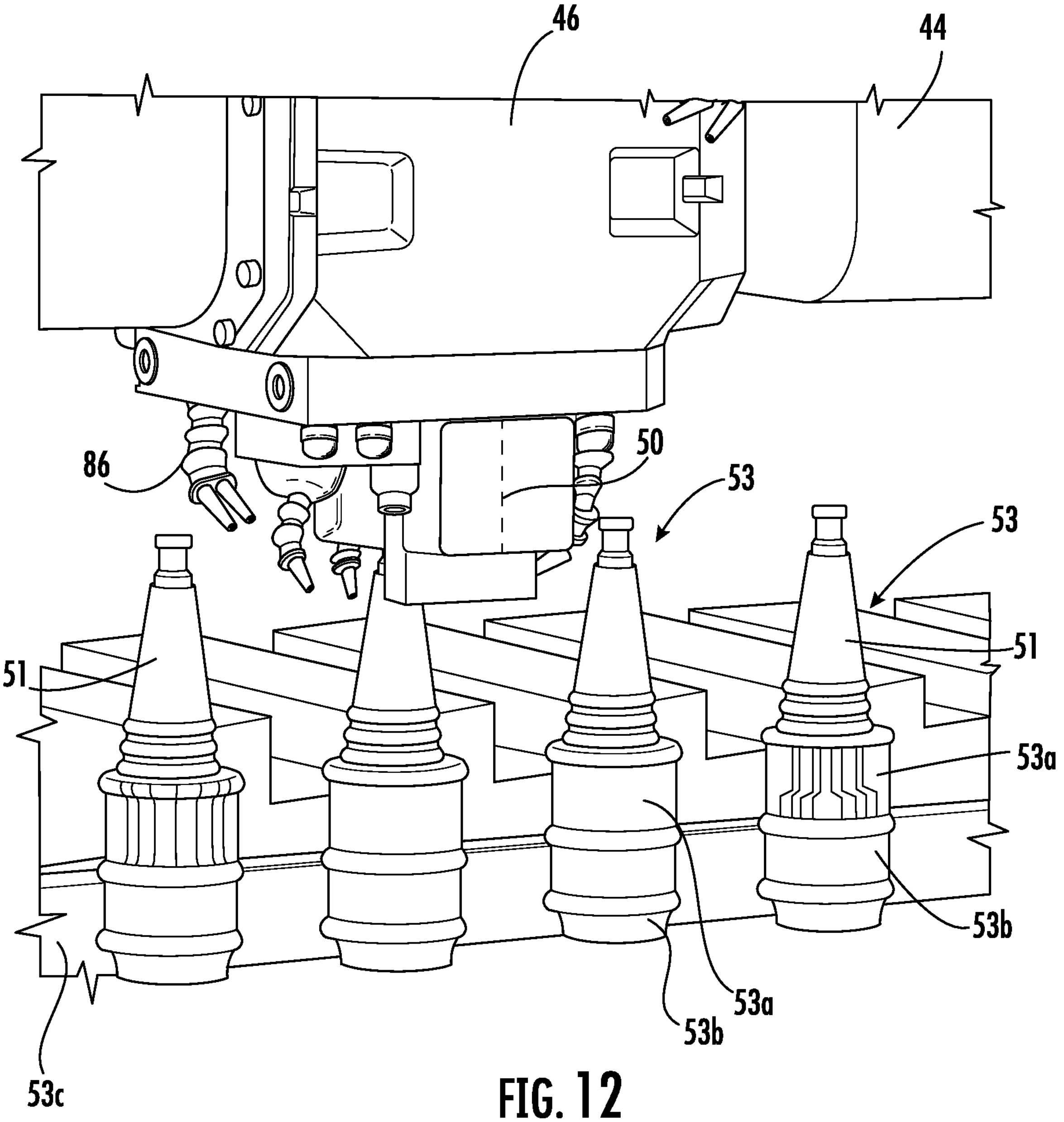
FIG. 12 is a schematic isometric view of the lower end of the machining head in the process of switching out the finger bit with at least one finishing tool for finishing the slab.
Figure 20:
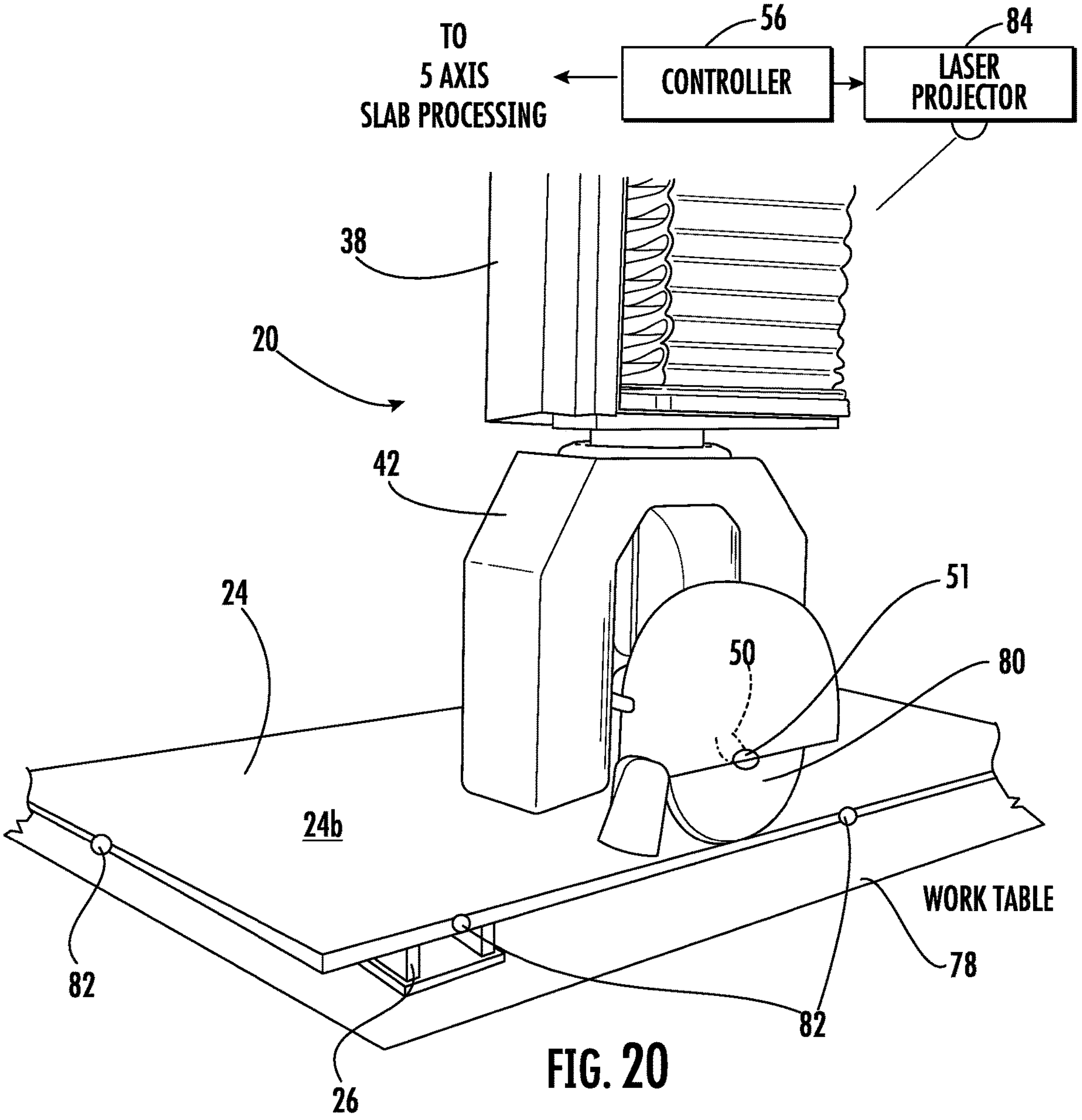
FIG. 20 is a schematic, isometric view of the machine having a stone slab correctly positioned upside down for cutting of the side edges.

A machine yoke 42 is rotatably mounted at the lower end of the carriage 38 and configured for C-axis rotation. The machine yoke 42 includes opposing support arms 44. The machining head 46 is rotatably mounted between the support arms 44 and configured for A-axis rotation. The machining head 46 includes a spindle 50 configured to receive a mounting cone 51 or similar tool receiver onto which the circular saw blade 80 is secured for respective cutting on the slab 24 when the slab is positioned upside down on the vacuum pods 26 (FIGS. 12 and 20). Different mounting cones 51 may support different circular saw blades, finger bits, edging tools, and other finishing tools so that the different mounting cones with different tools may be interchanged into and out from the spindle 50.

Figure 9:
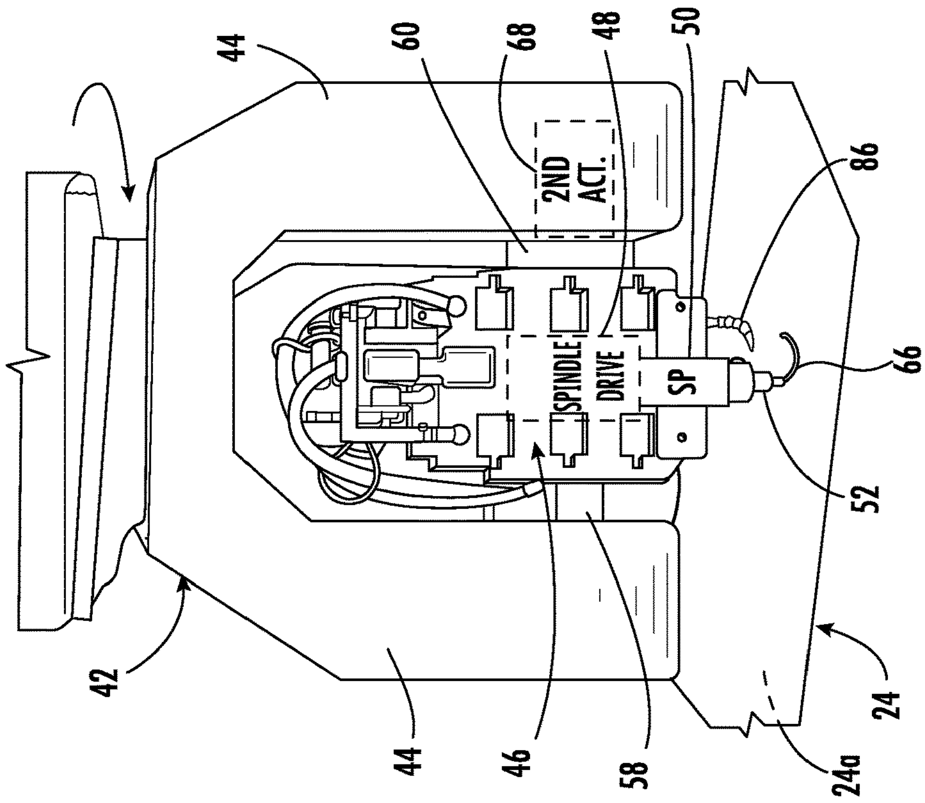
FIGS. 8-11 are schematic, isometric views of the machining head at different stages of finger bit routing a sink hole on the slab and showing the support arm leading along the path of advancement of the finger bit to relieve stress on the A-axis.

At least one drive mechanism, shown schematically at 100 in FIGS. 1 and 5, is connected to the bridge 36, carriage 38, machine yoke 42, and machining head 46 to operate and drive the 5-axis machine as explained relative to FIG. 7 below. The drive mechanism 100, depending on configuration, may be closed or open loop and may include different actuators, electric motors, stepper or servomotors, or other drive mechanisms for driving separate components such as the bridge 36, carriage 38, machine yoke 42, machining head 46 (FIG. 7), and a spindle drive 48 (FIG. 9). Different position sensors if applicable may be incorporated depending on configuration. A controller 56 is connected to the at least one drive mechanism 100 and configured to control movement of the bridge 36, carriage 38, machine yoke 42, and machining head 46 to cut the side edges of the slab or internal sections of the slab while upside down and positioned on the vacuum pods 26 by following a mirror image slab cut layout to form a substantially finished slab, which in an example, may be the configuration of a countertop.

As shown in FIG. 5, relief supports 104 may be positioned on the work table 78 under the rough cut side edges to support outside edge trim relief strips during some cutting examples and prevent chipping or damage to the exterior side of the substantially finished slab after cutting. In an example, the relief supports 104 may be formed from foam blocks inserted under the side edges of the slab 24 and the foam blocks may be configured to permit the circular saw blade 80 to cut therethrough without impacting saw blade operation. Two foam blocks as relief supports 104 may be positioned under each rough cut side edge.

In another example, the relief supports 104 are formed as vacuum clamps 108 (FIG. 6) that have a mounting plate 110 with a bottom surface 112 that is secured by vacuum via a vacuum fitting 114 onto the work table 78 and an upper clamp 116 to secure an outside edge trim relief strip. The upper clamp 116 may include a lower support block 118 and movable clamp member 120 that may be raised and lowered to the lower support block via a fastener such as an Allen screw.

The hybrid cycle incorporates the Phases 1, 2 and 3 of slab processing and allows routing any sink holes 70 (FIGS. 7 and 13) and any radius curves on the slab 24 after cutting the side edges without removing the cut slabs from the vacuum pods 26 and maintaining the finished face down. The slab does not need to be moved in some examples. A finger bit 52 supported on a mounting cone 51 may be inserted within the spindle 50 after removal of the circular saw blade 80 and the routing path based upon a mirror image slab cut layout (FIG. 9). The finger bit 80 may be switched out automatically after a sink hole 70 is cut and replaced with at least one finishing tool 53 as later explained, relative to the example finishing tools shown in FIG. 12, to finish the finished slab by forming an edge profile on the inside of any sink holes and edging and polishing the sides of the finished slab.

Referring now to FIG. 7, a more detailed explanation of the machine 20 is described. The slab 24 has its finished or polished face 24*a* corresponding to the top polished face down and resting on the vacuum pods 26. The machine 20 includes the frame 28 having the vertical supports 30 formed as two opposing side walls, and guide rails 32 are located on the top portion of the frame defined by the vertical supports or side walls. The frame 28 may define the slab processing area 34 in which a slab 24 to be processed extends along an X and Y coordinate axis.

The bridge 36 extends across the slab processing area 34 and is mounted for movement along the guide rails 32 so that the bridge may traverse across the slab processing area. The carriage 38 is mounted on the bridge 36 and includes a vertically extending housing 40 configured not only for vertical movement along a Z coordinate axis, but also for horizontal movement on the bridge to define movement at a lower end of the carriage along the X, Y and Z coordinate axes. The machine yoke 42 is rotatably mounted at the lower end of the carriage 38 and configured for C-axis rotation as illustrated by the horizontal direction of the rotating arrow in FIG. 7. Rotation may be clockwise or counterclockwise.

The machine yoke 42 includes opposing support arms 44 such that the machine yoke is similar to an inverted U. The machining head 46 is rotatably mounted between the support arms 44 and configured for A-axis rotation. The machining head 46 includes a spindle drive 48 and the spindle 50 connected thereto shown diagrammatically in the machining head (FIG. 9), such that the spindle drives rotates the spindle that supports a circular saw blade 80, finger bit 52 or other cutting and finishing tools.

In the example of FIGS. 1, 2, 5 and 13, the machining head 46 is rotatably mounted 90 degrees between the support arms 44 along its A-axis so that the spindle 50 is horizontally oriented to mount the circular saw blade 80 for respective cutting of the slab 24 when positioned upside down on the vacuum pods 26. In this position, the cutting occurs and any edge relief strips, such as shown in FIG. 5 when the peripheral edge of the slab 24 is cut, are supported by the relief supports 104 formed as foam blocks in this example, which allows cutting directly through them easily without impacting cutting as would occur when cutting on a substrate such as shown in FIGS. 3 and 4, where the cutting blade impacts the substrate, creating friction and heat, lowering blade performance and reducing cut quality.

In another example of FIGS. 7-12, the machining head 46 is rotated 90 degrees to orient the spindle 50 vertically along the Z or vertical axis as compared to the more horizontal orientation shown in FIGS. 1,2,5 and 13. The spindle 50 is configured to mount a router bit, e.g., the finger bit 52 (FIGS. 7-11), for routing a sink hole 64 or performing similar cutting on the slab 24. The machine 20 operates via the controller 56 so that the spindle 50 (FIG. 12) may switch out the finger bit 52 automatically and another finishing tool 53 inserted such as shown by the different finishing tool selections in FIG. 12 that may be used to form an edge profile on the inside of any sink holes 70 and edge and polish the sides of the slab 24.

As illustrated in FIG. 7, the machining head 46 is vertically oriented and the spindle 50 oriented vertically along the Z-axis so that any router or finger bit 52 is perpendicular to the plane of the slab 24 that extends along the X and Y coordinate axis on the work table 78. As described before, the at least one drive mechanism 100 provides for controlled, 5-axis movement, and as described with reference to the machine 20 shown in FIG. 7, the at least one drive mechanism includes different drive components, including different actuators, electric motors, servomotors, stepper motors, or similar components for 5-axis machine function.

A first actuator 54 is carried by the carriage 38 within its housing 40 and connected to the machine yoke 42 and configured to rotate the machine yoke 42 about the C-axis when processing the slab 24, including routing, cutting or performing any finishing operations on the slab 24. The controller 56 is connected to the spindle drive 48 (FIG. 9) and the first actuator 54 and configured to drive the first actuator and rotate the machine yoke 42 and maintain a support arm 44 leading along the path of advancement of the router or finger bit 52 to relieve stress on the A-axis when routing or cutting on the slab 24. Similar functions may be performed when finishing to relieve stress on the A-axis.

At least one shaft 58 (FIG. 9) is supported by at least one of the support arms 44 and axial with the A-axis. The shaft 58 may operate as a support to the machining head 46 and aid in allowing A-axis rotation either by rotating itself or allowing the machining head to rotate thereon. In an example, a gear unit 60 is positioned on one side and the shaft 58 on the other side of the machining head 46 and rotatably mounted between the support arms 44, and configured for A-axis rotation about the shaft and gear unit.

The machining head 46 may be used for routing and cutting at different angles. Thus, by rotating the machine yoke 42 during the routing and cutting, and maintaining a support arm 44 leading along the path of advancement of the finger bit 52, stresses are relieved on the A-axis during the routing or cutting of the slab 24, such as when forming a sink hole 70 or other cuts, and also when finishing. The controller 56 may be pre-programmed for the exact cutting or routing path and finishing path on the slab 24 based upon the desired configuration of a sink hole 70 and/or countertop and its desired edge profile, such as on the inside of any sink holes and the edging and polishing on the sides and edges of the slab.

Referring now to FIGS. 8-11, there are illustrated schematic, isometric views of the machine yoke 42 with its support arms 44 and machining head 46 at different stages of finger bit 52 routing a sink hole 70 on the slab 24. The same process as will be described for reducing the A-axis stress may also be performed for other finishing processes of the slab 24 when applicable. As illustrated, the support arm 44 is always leading along the path of advancement of the finger bit 52 to relieve stress on the A-axis such as defined by the shaft 58 and gear unit 60 in this example or other components mounting the machining head 46 for rotation about the A-axis.

Figure 8:
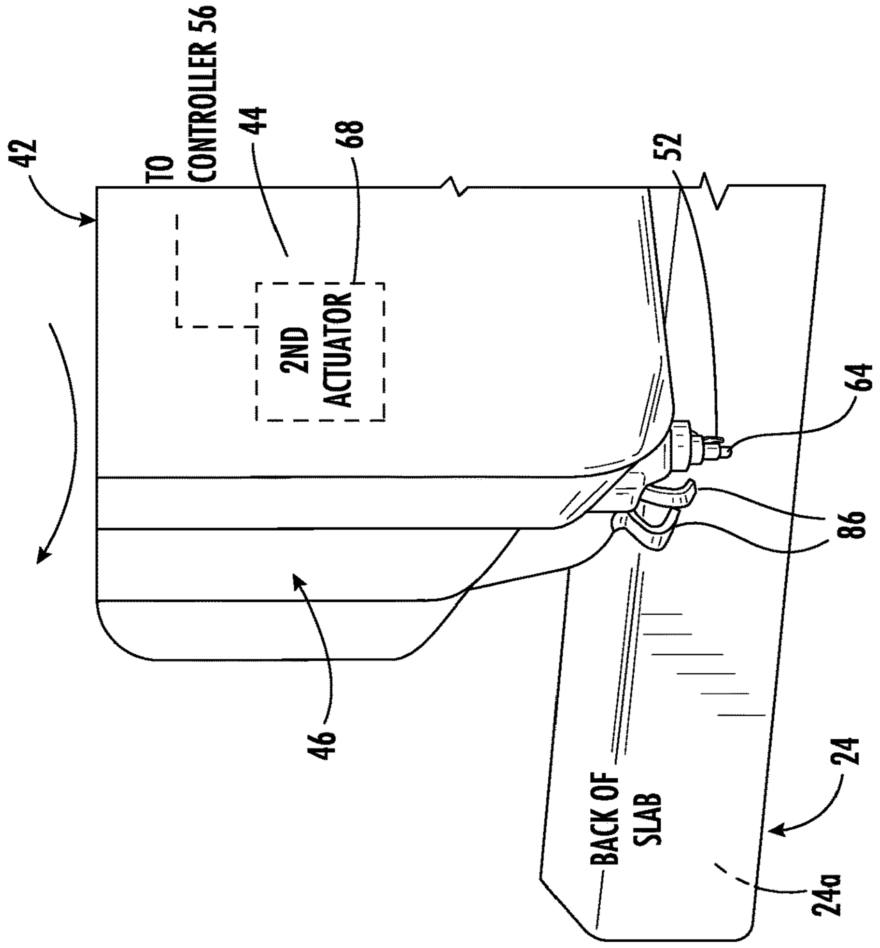

As shown in FIG. 8, the router or finger bit 52 cut is initially made by lowering the carriage 38 that mounts the machine yoke 42 and machining head 46 into the initial routing or cutting position. An initial hole 64 is drilled (or routed) such as corresponding to an interior section of the sink hole 70. The finger bit 52 may be different diameters depending on the sink hole 70 configuration, but the initial cut or hole 64 is made and cutting progresses along the cut line or cut path 66 designed for the sink hole 70.

In a non-limiting example, the finger bit 52 may be an engineered finger bit such as a 40 millimeter and operate at about 5,500 to 6,000 rpm in an example with feed rates at more than 15 to 20 inches per minute. The finger bit 52 may be a diamond tool, including in an example a one inch, 35 mm straight finger bit. Another example includes an 8-segment high-speed finger bit 52. Different binders may be used, with a soft binder having a bigger cut potential. Other finger bit 52 configurations may be used.

As the routing or cutting continues as shown in FIG. 9, and shown by the initial rout or cut path 66, the machine yoke 42 is rotated about its C-axis to always maintain a support arm 44 leading along the path of advancement of the finger bit 52 to relieve stress on the A-axis during the routing or cutting operation.

Figure 10:
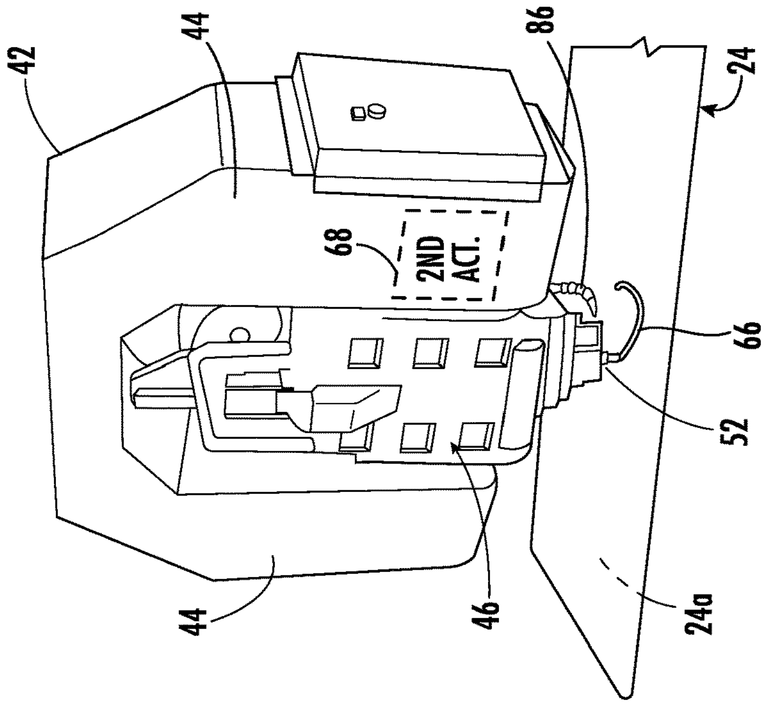
Figure 11:
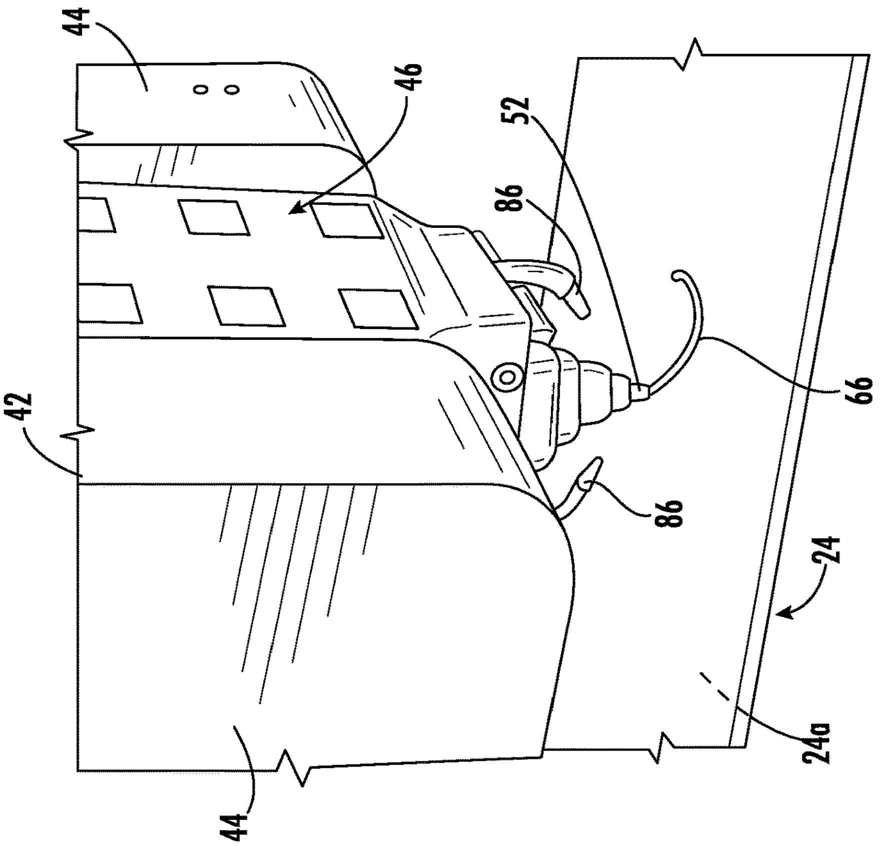

As shown in FIG. 10, the machine yoke 42 continues its rotation to reach a point as shown in FIG. 11 where the cut path 66 is continued in a direction almost 90° from the initial cut path. Depending on the configuration of the sink hole 70 to be formed, the support arm 44 may lead in a straight direction for a predetermined distance and then turn as shown in FIG. 11, where portions of the cut path 66 are straight and then follow with a gentle 90° turn, but with stresses always relieved on the A-axis. A helicoidal movement may be generated during routing/cutting.

During the routing or cutting, the controller 56 may be configured to periodically rotate the machine yoke 1800 so that the other opposing support arm 44 is leading along the path of advancement of the finger bit 52 when routing or cutting on the slab 24. This 180 degree rotation to allow the other support arm 44 to lead aids in relieving stress along the same axial direction on the shaft 58, such as any motors, actuators, drive shafts, and gear unit 60 to equal out over time the various stresses imposed on machine components that are in the machining head 46 along the A-axis and along the shaft and gear unit.

A second actuator 68, such as an electric drive motor or servomotor, or other drive unit may be connected to the at least one shaft 58 and/or gear unit 60 and controller 56. The second actuator 68 may be configured to rotate the machining head 46 along the A-axis at different angles for routing and cutting at angles, including 90 degrees as noted before for circular saw blade 80 cutting as shown in FIGS. 1, 2, 5, 13 and 20.

The first and second actuators 54,68 may be formed as electric drive motors or servomotors and include any other appropriate drive mechanisms. In the example of the first actuator 54, an electric motor may be connected to a gear mechanism (not shown) that rotates the machine yoke 42 about the C-axis and may include a stepper motor or other controlled electric motor or drive mechanism. The second actuator 68 may also be formed as an electric motor, such as a stepper motor or other drive mechanism, that may be mounted in one of the support arms 44 and connected to the shaft 58 or gear unit 60 in a non-limiting example and configured to rotate the shaft and the machining head 46, or mounted within the machining head in an example. Different drive units, stepper motors or other drive mechanisms may be used. The spindle drive 48 also may include an electric drive with an appropriate drive mechanism configured to rotate the spindle 50 at high speeds for circular saw blade cutting, routing, and any finishing operations.

A third actuator mechanism 72 may be supported by the frame 28 and connected to the bridge 36 and carriage 38 and the controller 56 and configured to drive the bridge and carriage during circular saw blade 80 cutting (FIGS. 1, 2 and 5), routing or cutting on the slab 24 (FIGS. 7-11), and finishing with a finishing tool 53 as shown in FIG. 12.

Referring again to FIG. 7, the third actuator mechanism 72 may include a first motor 74 supported by the frame 28 and connected to the controller 56 and bridge 36 and configured to drive bridge movement on the frame. A second motor 76 may be supported by the bridge 36 and connected to the controller 56 and carriage 38 and configured to drive carriage movement on the bridge. Various drive mechanisms may include different actuators, including different electric motors, servomotors, stepper motors, or other appropriate drive mechanisms to maintain exact positioning and control of the bridge 36, carriage 38, machine yoke rotation, machining head 46, and spindle 50 rotation speed. Positioning sensors and feedback sensors if used may be located on different components of the machine 20 to aid in exact positioning of components within thousandths of an inch and mounted on the guide rails 32, frame 28, bridge 36, carriage 38 and other components, including the spindle drive 48 and any actuators and motors 54, 68, 72, 74, 76.

Figure 12A:
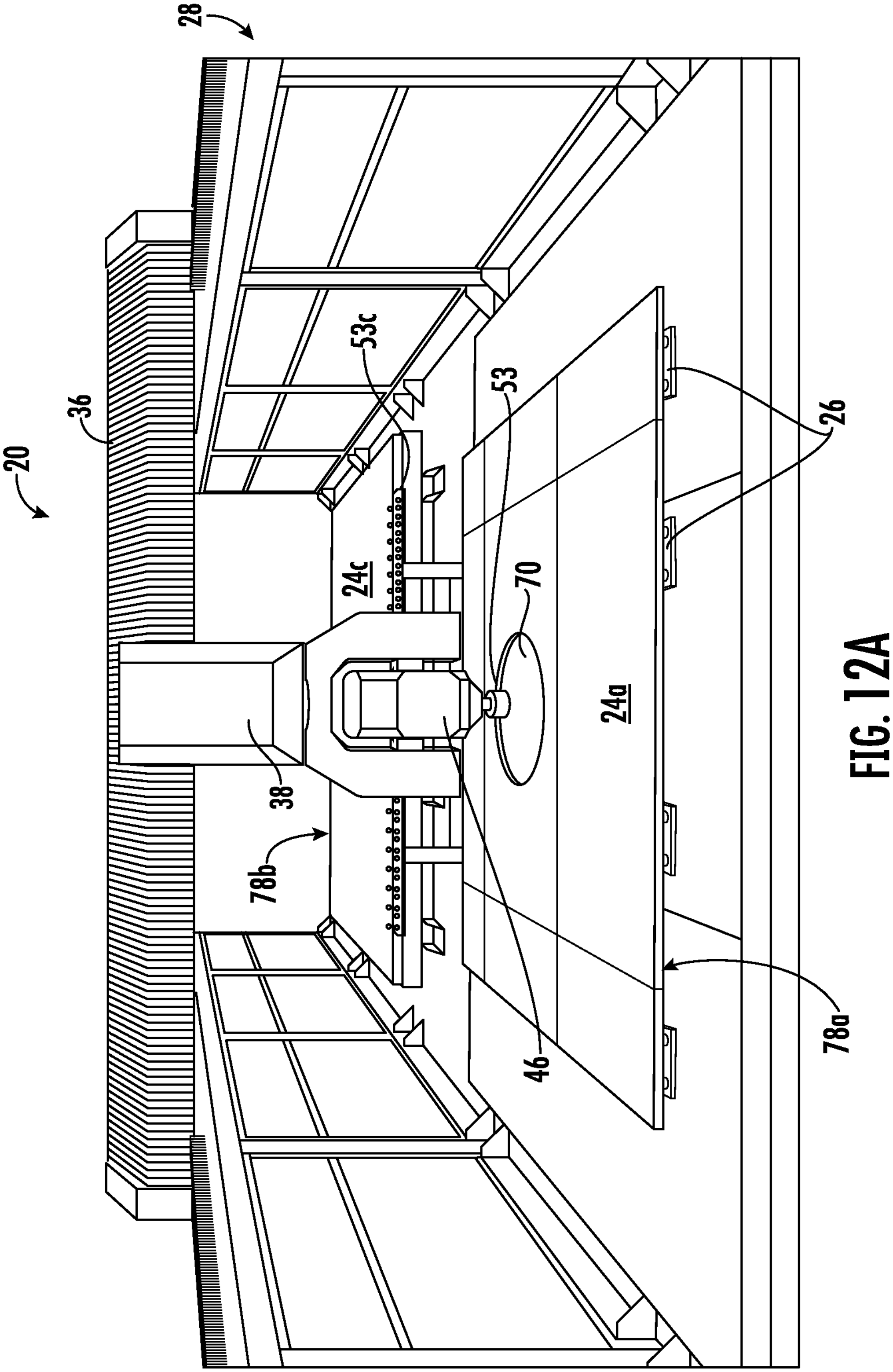
FIG. 12A is a schematic, isometric view of the machine showing a slab sink hole being finished with a finishing and edging tool.
Figure 13:
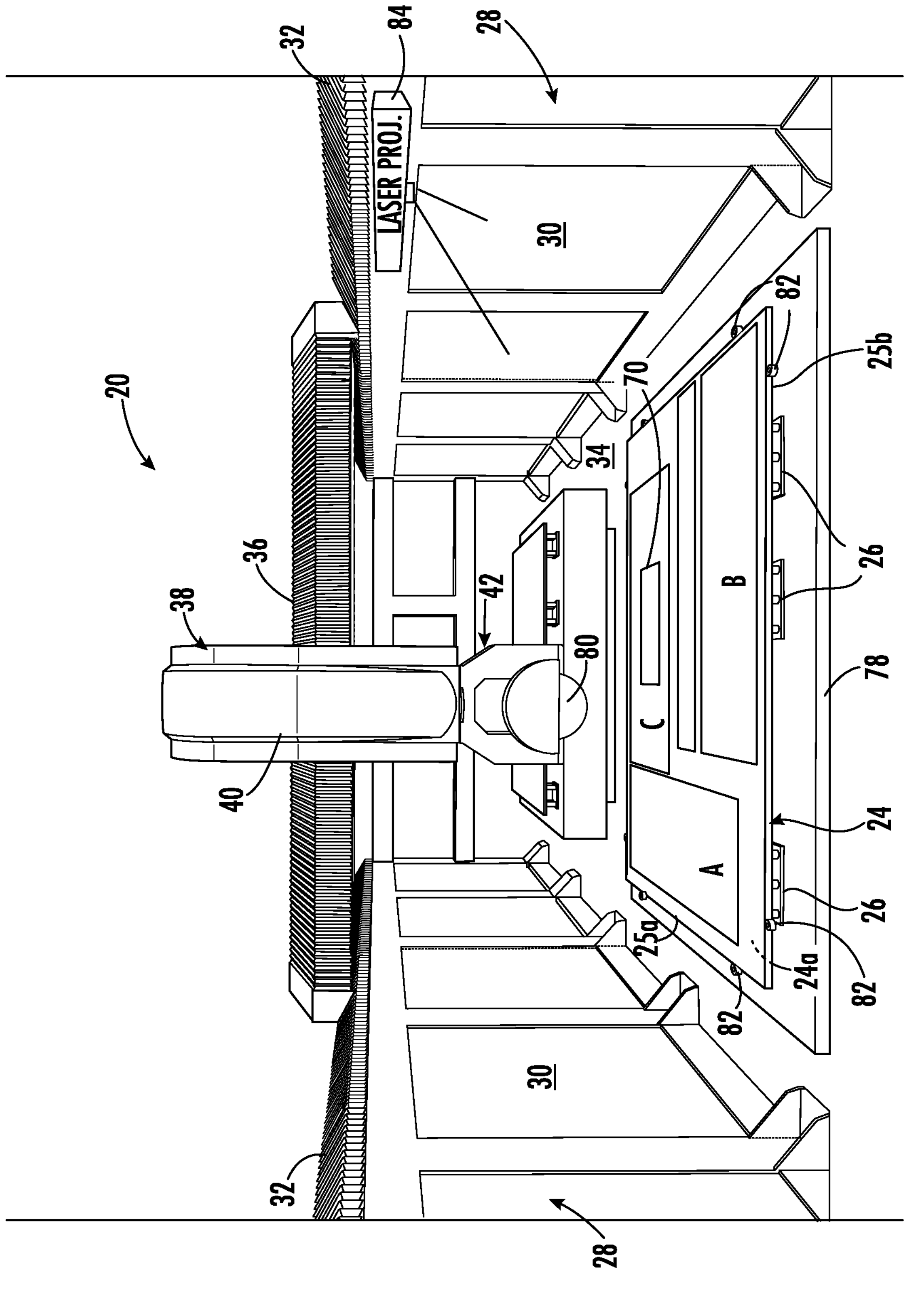
FIG. 13 is a schematic, isometric view of the machine similar to FIGS. 1 and 2 showing the machining head having a circular saw blade to cut a slab using a mirror imaged slab cut layout that has been aligned for upside down cutting in a slab cutting position.

The work table 78 is positioned at the slab processing area 34 and the vacuum pods 26 are positioned on the work table. The vacuum pods 26 are configured to support the top polished finished face 24*a* of the slab upside down for initial cutting, routing, and processing on the rear side 24*b* of the slab 24. The work table 78 may include a milled and polished work surface, and in an example, two work tables 78*a*,78*b* may be positioned within the slab processing area 34, such as shown more particularly in FIGS. 12A, 27 and 28. In the example as shown in FIG. 13, the machining head 46 mounts the circular saw blade 80 via its mounting cone 51 and is configured to be rotated up to 90° along the A-axis into a horizontal orientation as compared to the vertical configuration shown in FIG. 7 (for routing) to permit circular saw blade cutting, such as on the outer peripheral edges of the slab 24, which often are rough cut side edges.

It is also possible as shown in FIG. 7 to form sink anchor holes 127 in the slab 24 when positioned on the vacuum pods 26, before or after sink hole 70 routing. The sink anchor holes 127 may be configured to receive anchors for final mounting of the slab in a residence or business. In the example shown in FIG. 12, the controller 56 switches out automatically the finger bit 52 with at least one finishing tool 53 for forming the edge profile and edging and polishing the sides of the substantially finished slab. In the example shown in FIGS. 12A and 12B, the spindle 50 may receive a finishing tool 53 that supports two vertically spaced finishing tools 53*a*, 53*b* for a dual tool configuration on a single mounting cone 51 to reduce the amount of finishing time and reduce spindle and finishing tool changes.

Any outside edge trim relief strips formed during cutting may be supported by the relief supports 104 (FIG. 5), e.g., foam blocks, during cutting adjacent to the final cut slab and prevent chipping or damage to the exterior side of the substantially finished slab. The foam blocks or vacuum clamps 108 (FIG. 6) in this example address the issues where the slabs 24 of stone or engineered stone do not come in shapes of perfect rectangles having 90 degree corners on all four corners. When a slab 24 is cut by a manual bridge saw by hand or by a CNC saw or CNC saw jet, the largest perfect rectangle is cut inside of the slab. The four sides of the slab 24, often referred to as north, south, east, and west, are cut at the slab edges.

Figure 6:
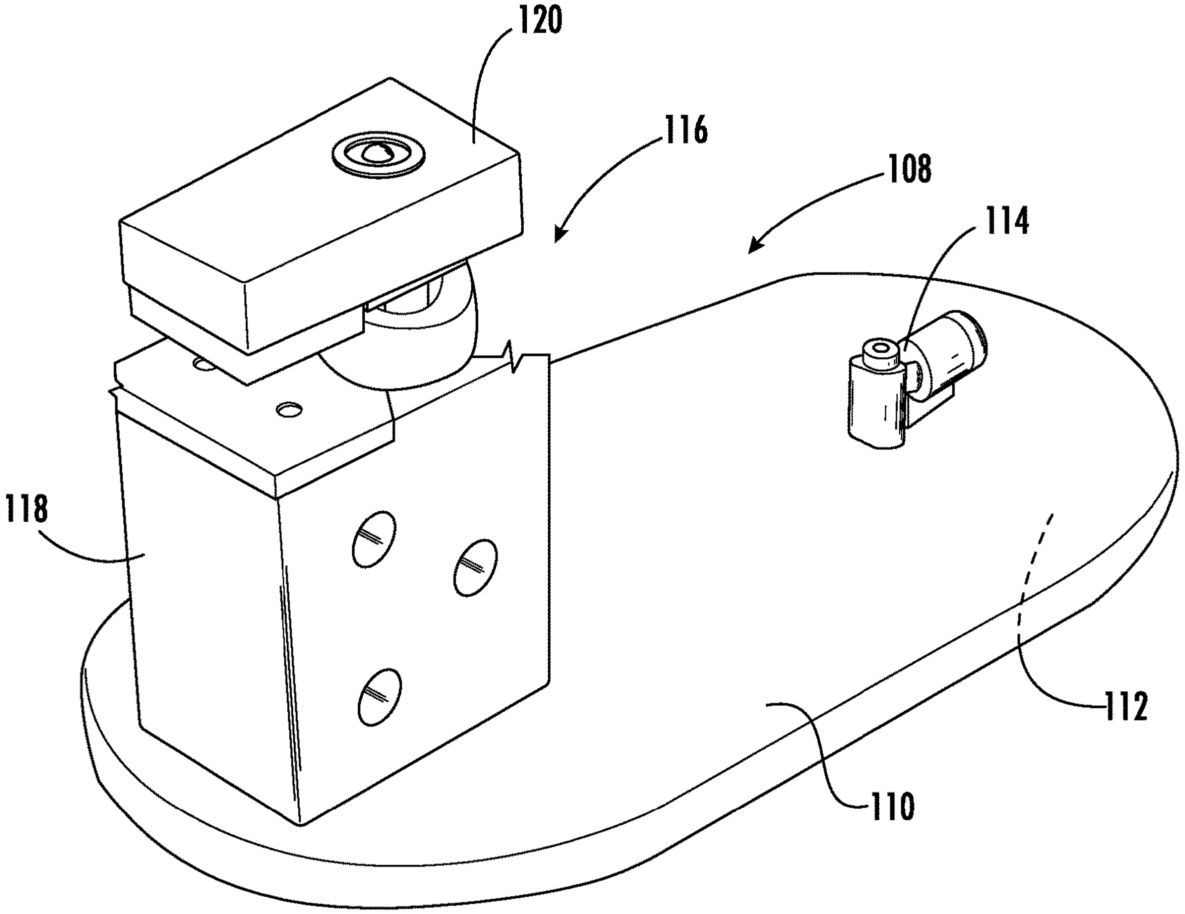
FIG. 6 is an isometric view of a relief support formed as a vacuum clamp.

There are small strips left over from this "trim" procedure also referred to in the industry as "relief" cuts. The relief supports 104 such as foam blocks that are positioned on the work table 78 under the rough cut side edges will support the outside edge trim relief strips during cutting and prevent the chipping or damage to the exterior side of the substantially finished slab 24. The strips do not fall during the cutting process and are held by the foam blocks 104 as shown in FIG. 5, or by an example vacuum clamp 108 as shown in FIG. 6. Foam blocks are preferred in an example since the circular saw blade 80 that is cutting in the air because the slab 24 is raised on the vacuum pods 26 may easily cut through the foam blocks while the edge strips are supported by the foam blocks. Any chipping or damage to the exterior side of the substantially finished slab is prevented.

Different finishing and edging tools 53 such as the example tools shown in FIG. 12 may be used and interchanged into the spindle 50. The finishing and edging tools 53 are formed as dual finishing tools, i.e., two stacked tools 53*a*,53*b* per mounting cone 51. When one mounting cone 51 is received in the spindle 50, two vertically spaced finishing and edging tools 53 are in stacked relation to each other, and during finishing, time is saved on the interchange of the finishing and edging tools and mounting cones 51. As shown in FIG. 12A, a finishing tool 53 is received within the spindle 50 of the machining head 46 and the machine 20 is finishing the inside edge of the sink hole 70.

Figure 12B:
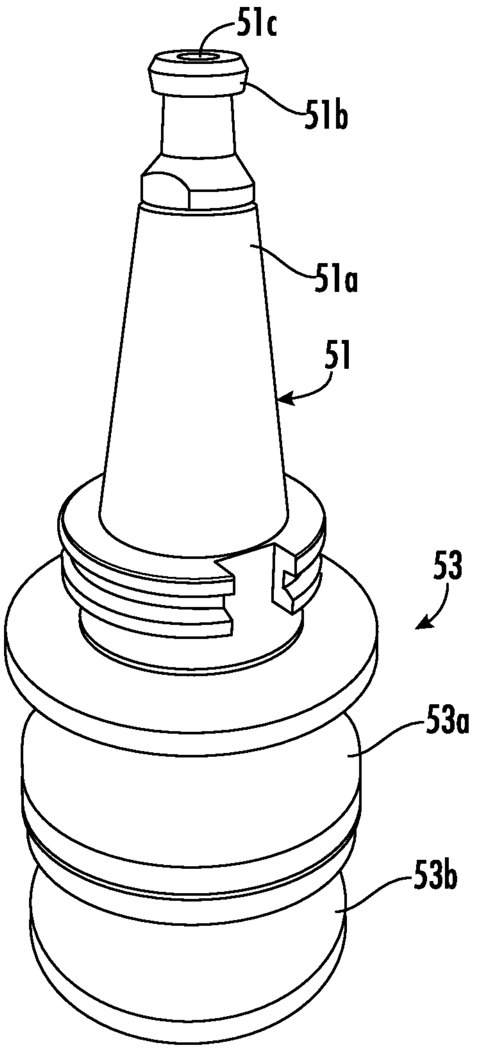
FIG. 12B is a front, isometric view of a mounting cone holding two finishing and edging tools that may be received within the spindle of the machining head.

An example mounting cone 51 with a finishing tool 53 and two vertically spaced finishing and edging tools 53*a*,53*b* is shown in FIG. 12B showing how the mounting cone includes a tapered cone section 51*a* ending in a spindle lock member 51*b* at the upper vertical end so that the spindle 50 may be received over the mounting cone and locked onto its end. Besides the finishing and edging tools, a circular saw blade may be mounted on a mounting cone 51 and received within the spindle 50. In the dual work table 78*a*,78*b* configuration of FIG. 12A, the different finishing and edging tools 53 are stored on a tool rack 53*c* shown positioned between dual work tables 78*a*,78*b* and in FIG. 12A. The stacked finishing and edging tools 53*a*,53*b* in the example of FIG. 12B each have a concave surface for finishing edges of a slab, and also orifices through which water or other fluid may be passed for cooling. The mounting cone 51 includes a central orifice 51*c* through which water or other fluid flows and is passed outward through the orifices.

The machine 20 as illustrated in FIG. 13 shows an example slab 24 positioned on the vacuum pods 26 and on the slab a diagram of a mirror imaged slab cut layout with different sections to be cut labeled A, B and C, which in an example may be laser projected towards the slab as will be described in greater detail below. Reference is further made now to FIGS. 13-21 with greater details describing the mirror image slab cut layout and the controller processing.

Figure 14:
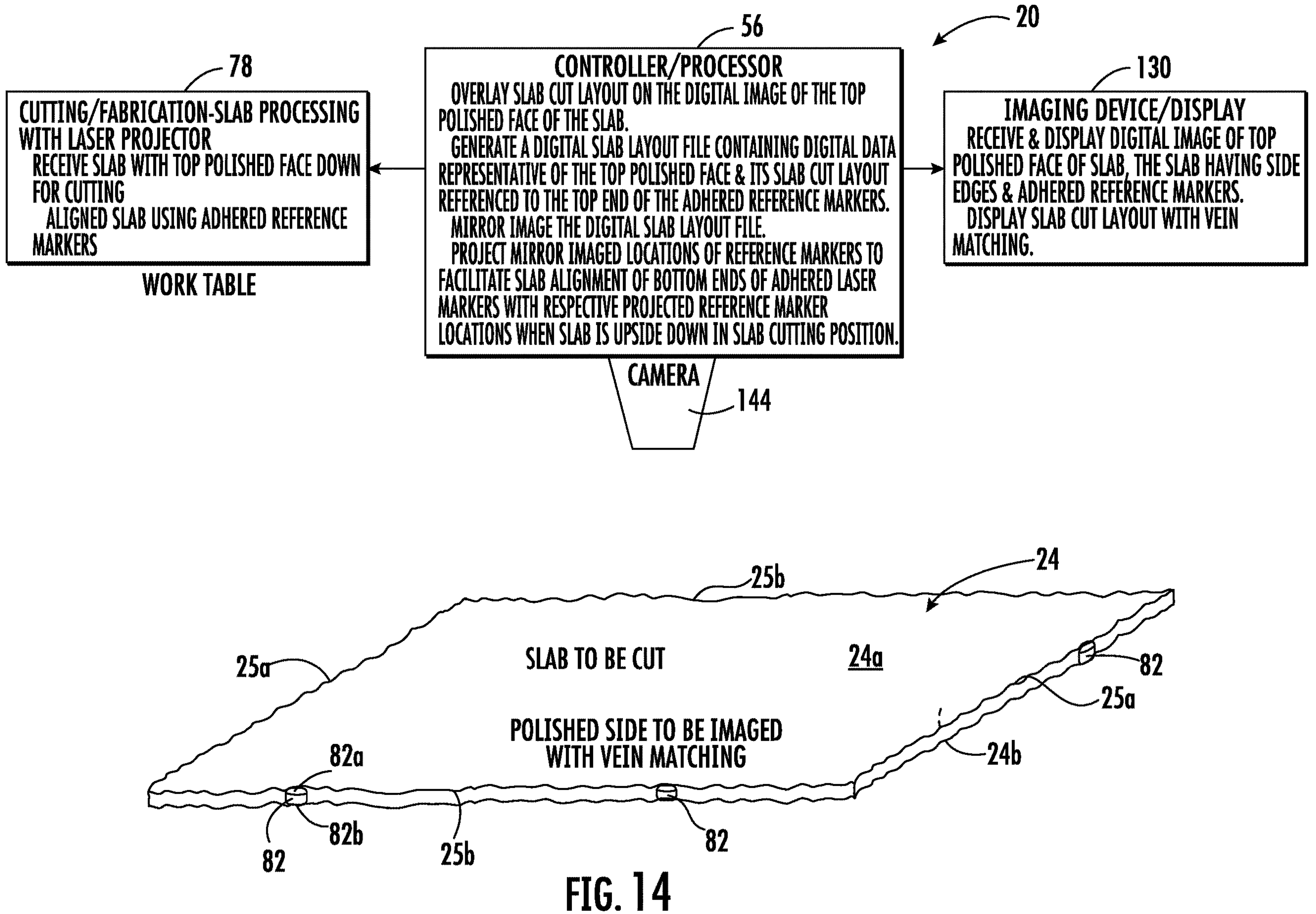
FIG. 14 is a schematic block diagram of the system of processing a stone slab by mirror imaging a digital slab layout file.

As noted above, the slab 24 is positioned upside down for cutting and positioned on the vacuum pods 26. Mirror images are used to position the slab for correct cutting and routing. The slab 24 has a top polished or finished face 24*a* and a bottom surface 24*b* with the bottom surface facing up and finished face down as shown in FIGS. 7, 13 and 14. Reference is made to the process described in U.S. patent application Ser. No. 18/327,101 filed Jun. 1, 2023, the disclosure which is hereby incorporated by reference in its entirety.

As shown in FIG. 14, an imaging device 130, such as a display of a computer or other processing device, including a display connected to the controller 56, may be configured to receive and display a digital image of the top polished face 24*a* of the slab 24. When first processed, the slab 24 normally has rough uncut side edges, and in an example, is a quarried slab roughly cut into a substantial rectangular pattern, which is to be cut, and has opposing short sides 25*a* and opposing long sides 25*b*. The slab 24 in this example may be about 2.0 to 3.0 centimeters thick, and in another example, about 1.25 to 1.5 inches thick and some slabs about 1.375 (1⅜) inches thick as a commercial grade slab for a countertop. A plurality of reference markers 82 may be adhered on at least one side edge of the slab 24 and shown as cylindrically shaped markers in FIGS. 13 and 14.

In the example of FIG. 13, at least one long side 25*b* includes at least two adhered reference markers 82 and at least one short side 25*a* includes at least one adhered reference marker, but may include two adhered reference markers 82 on each side. Each of the adhered reference markers 82 are the thickness of the slab 24 and each have a top end 82*a* and a bottom end 82*b* flush with the respective polished face 24*a* (facing down) and bottom unpolished surface 24*b* (facing up). Each reference marker 82 may be formed as a cylindrically shaped foam element to allow contraction and expansion back to normal size if the markers are pressed when the slab is moved.

Figure 15:
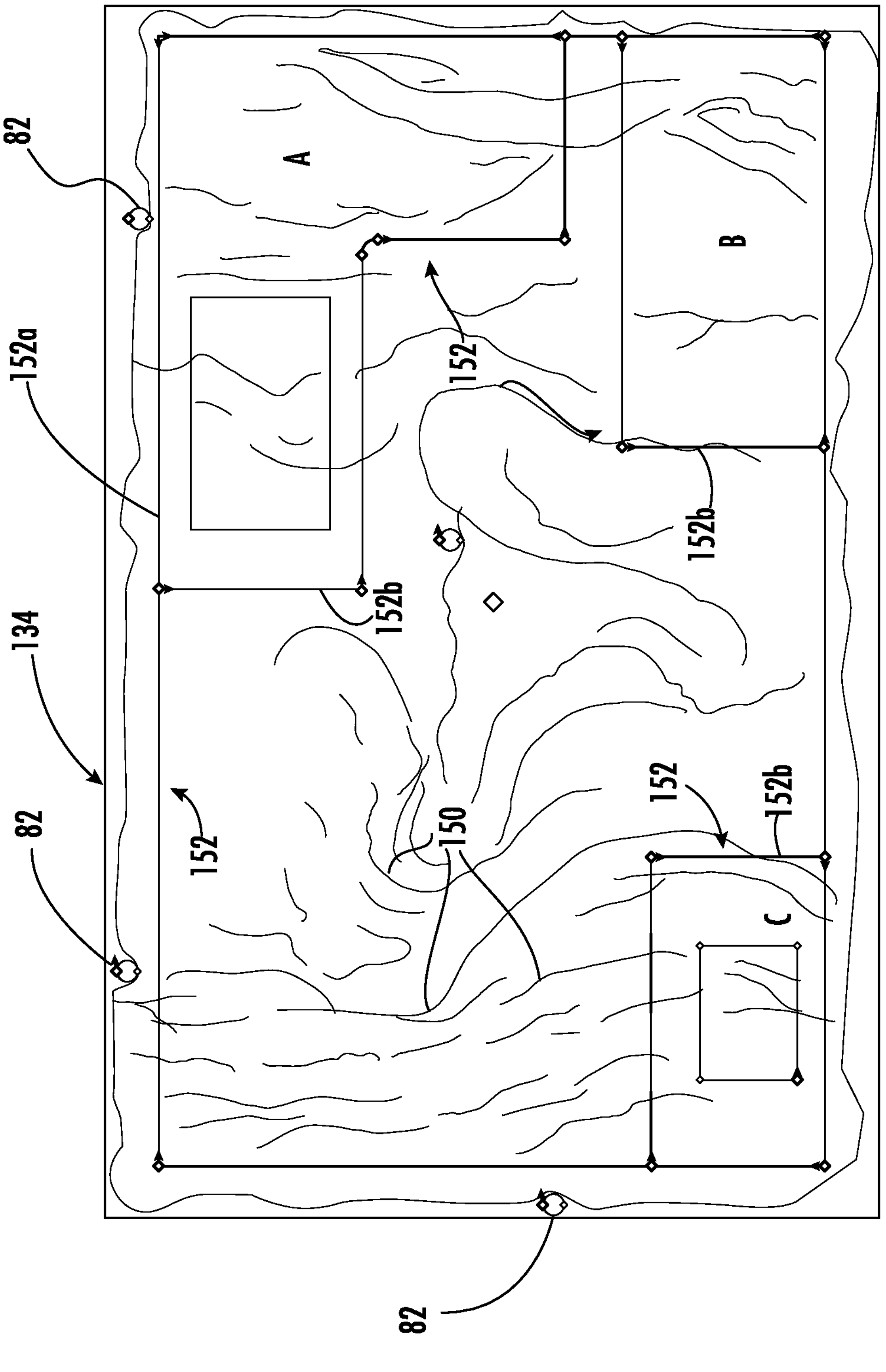
FIG. 15 is a digital image of the stone slab showing the top polished face and a location of adhered reference markers.

A slab digital image 134 (FIG. 15) may be obtained from a camera 144 connected to the controller 56 or other processor, which takes a photographic image of the slab 24 to be laid out and cut. The reference markers 82 may be adhered by a preferred waterproof adhesive to the edge of the slab 24 as illustrated before the camera 144 generates the image in order to obtain a digital image 134 of the top polished face 24*a* of the slab, together with the reference markers 82 (FIG. 15). The digital image 134 will show the locations of the adhered reference markers 82 on the long side 25*b* and short side 25*a* based upon the configuration of the rough generally uncut side edges. It should be understood that the machine 20 with its associated system as described for slab alignment may be used even when the slab 24 and side edges 25*a*,25*b* are accurately cut straight edges to permit other cutting, routing, or finishing operations on the slab.

The slab 24 may include a surface appearance as a grain pattern produced by veins 150 (FIG. 15) that are matched when the slab cut layout 152 is generated, such as by a CAD program, e.g., Slabsmith, which is based on how the slab will be cut, e.g., a countertop, table, floor, or other slab component. The outer rectangular line 152*a* represents the outer cut line for producing the large rectangular slab, and the other lines 152*b* are for a sink cutout, kitchen tabletop, and other slab components that are matched together and indicated by the designators A, B and C.

The slab 24 may be formed from different slab materials including granite, marble, quartz, soapstone, and other quarried materials or engineered stone and hybrid or combinations of synthetic and stone material held together by a resin binder, for example.

The controller 56 receives the digital image 134 (FIG. 15) of the slab 24 and its top polished face 24*a* and forwards the digital image data to the imaging device 130 as a display, and via user or operator input on a keyboard, mouse, etc., the controller 56 and associated software program overlays the slab cut layout 152 on the digital image 134 of the top polished or finished face 24*a*. For example, in the diagram of the digital image, there is a large rectangular outline 152*a* corresponding to the rectangular slab to be cut from the rough cut slab 24, and the other lines may correspond to the kitchen components such as a sink hole cutout 70 as shown conceptually in FIGS. 13 and 19. Other components can be laid out and cut from the slab.

Figure 16:
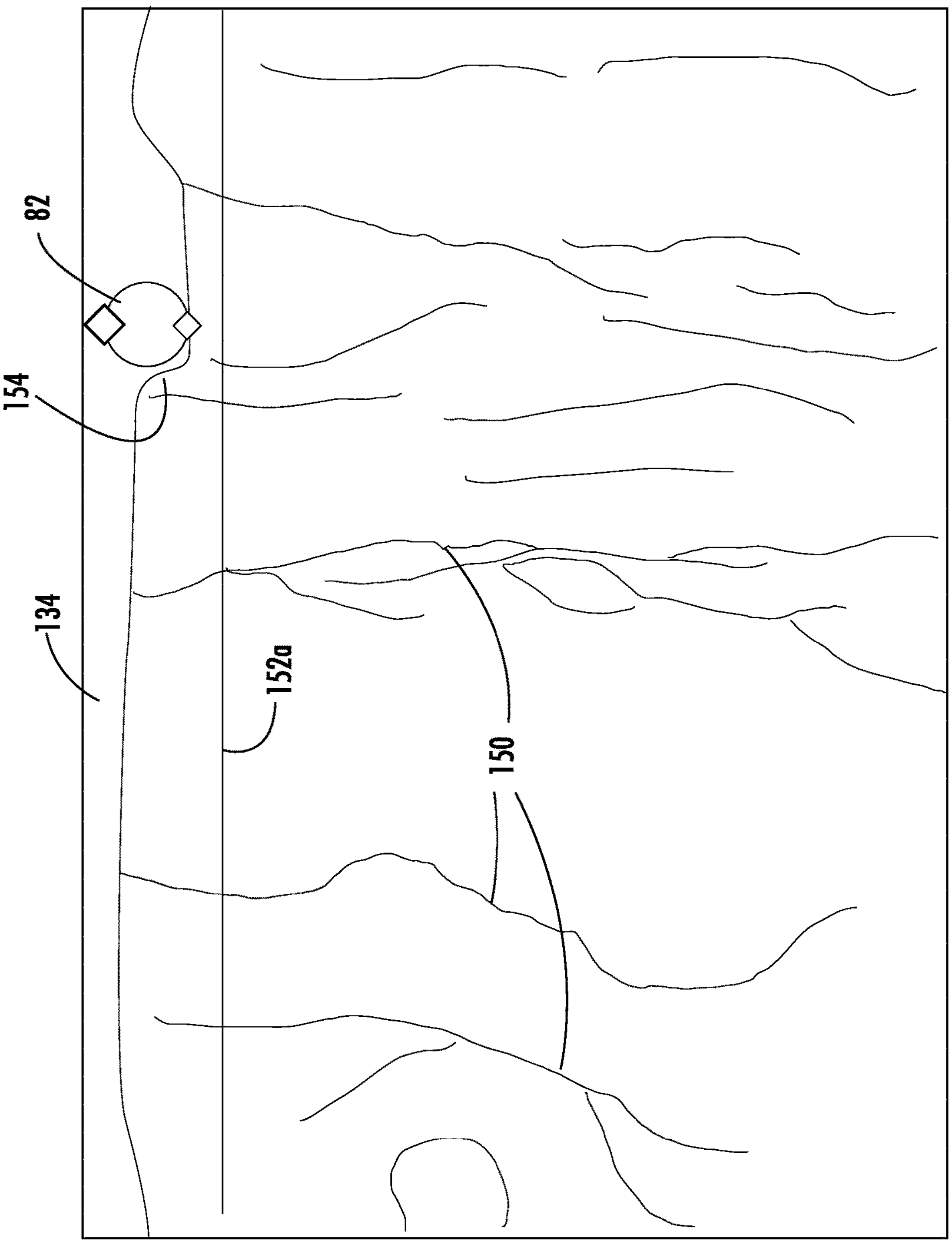
FIG. 16 is an enlarged section of the image of FIG. 15 showing a reference marker location relative to the uncut slab edge.

FIG. 16 is an enlarged image of a portion of the slab digital image 134 of FIG. 15, and showing a rough crevice 154 on the slab edge and adhered reference marker 82 depicted by the software as in a circle at that location. The controller 56 via its CAD or other software or even firmware program may generate a digital slab layout file that contains digital data representative of the top polished face 24*a* and the slab cut layout 152, which are referenced to the top end 82*a* of the adhered reference markers 82. The digital slab image file may be a vector file such as a CAD file, and in an example, a Drawing Exchange Format (DXF) file.

Figure 17:
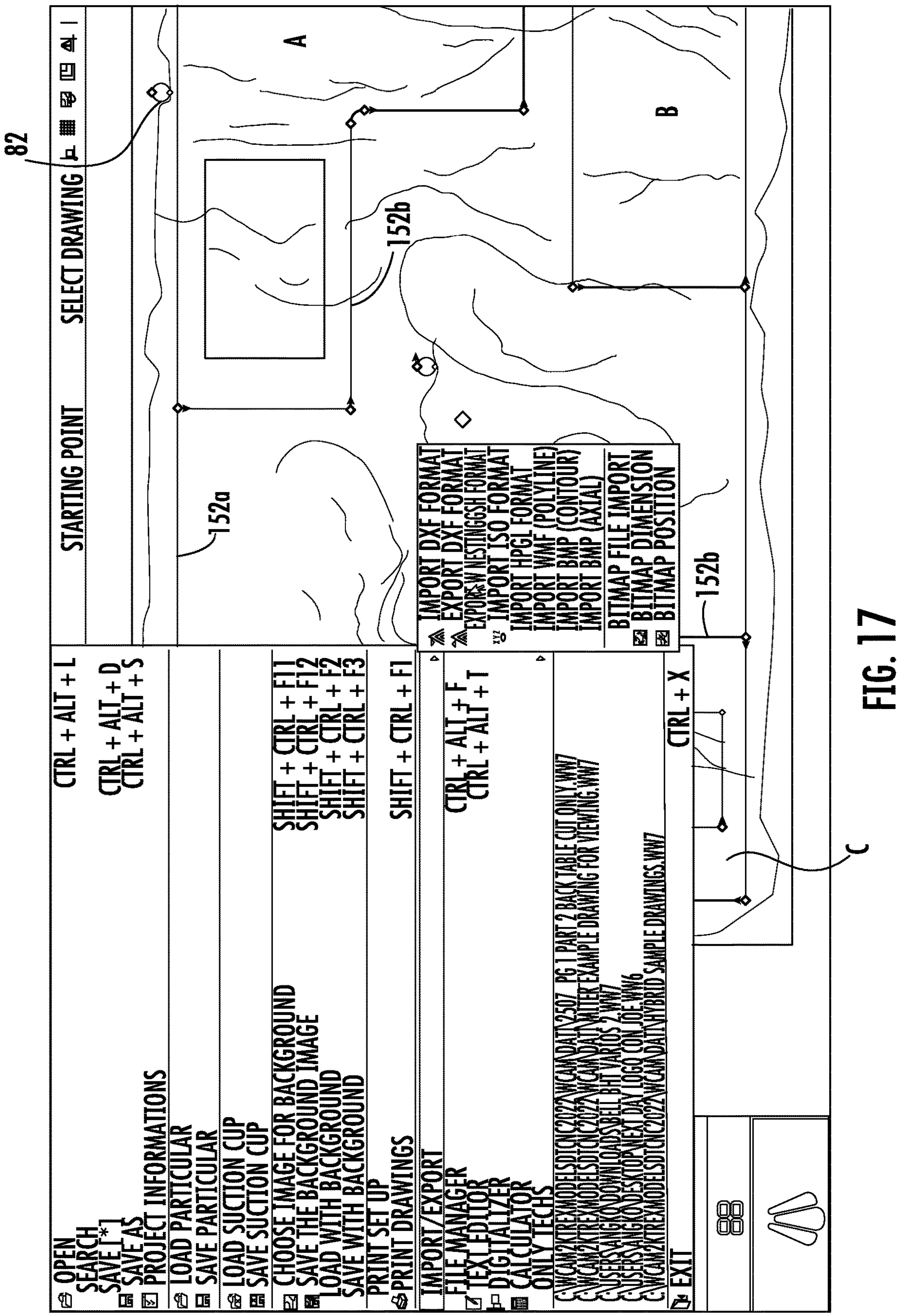
FIG. 17 is an example schematic screenshot showing user manipulation at a computer workstation by exporting a digital slab image file.
Figure 18:
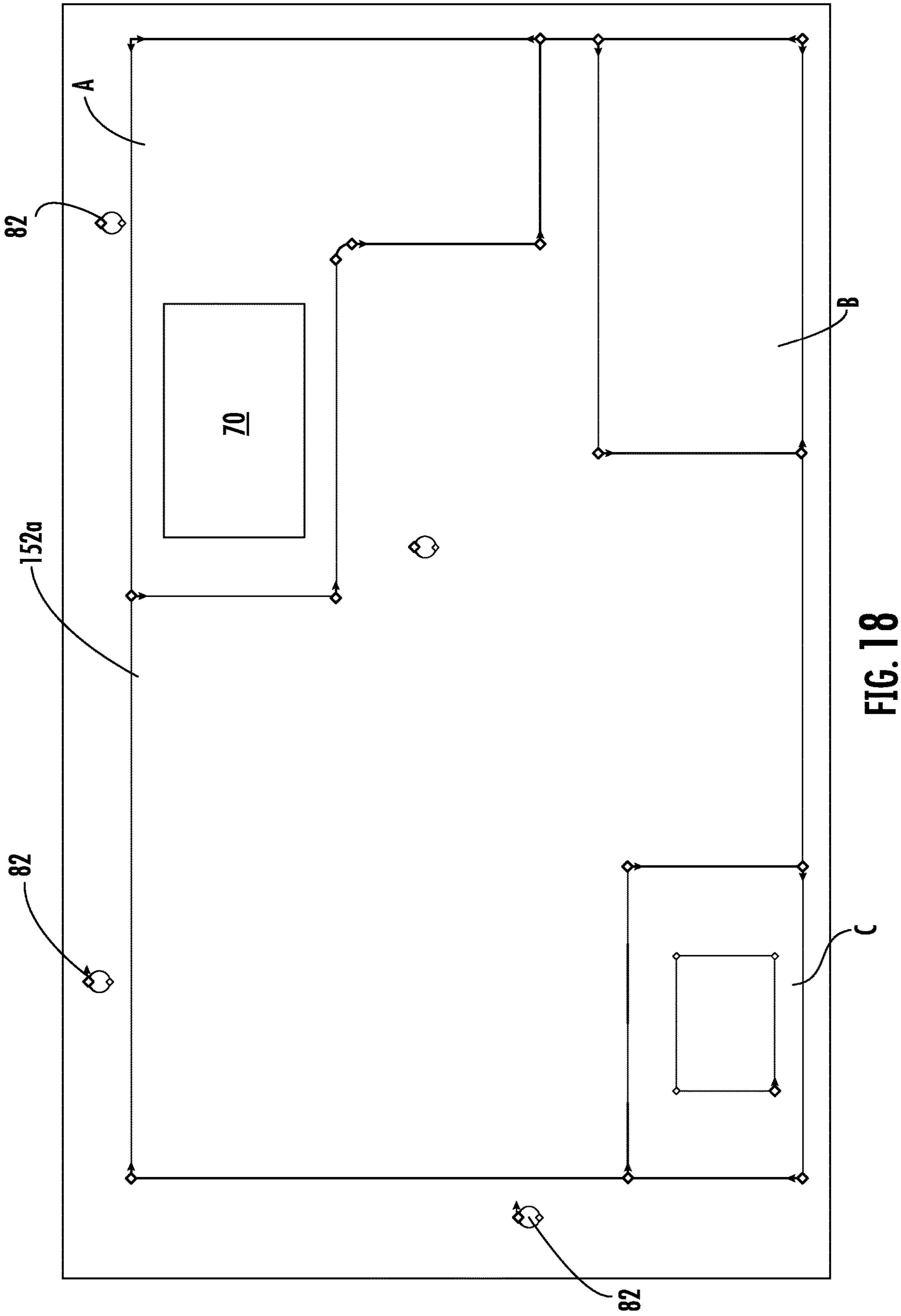
FIG. 18 is a schematic image of the digital slab layout file of FIG. 15.

The reference markers 82 may be traced by the CAD feature of the layout software and show up as a DXF file layout as shown in FIG. 18. As shown in the image of FIG. 17 illustrating user input of the file, the DXF format may be exported and mirror imaged (FIG. 19) so that the reference markers 82 are positioned in mirror imaged locations corresponding to when the top polished face 24*a* of the slab 24 is in a reverse or upside down position for cutting with the top polished face down and cutting occurring on the bottom surface 24*b*.

Figure 19:
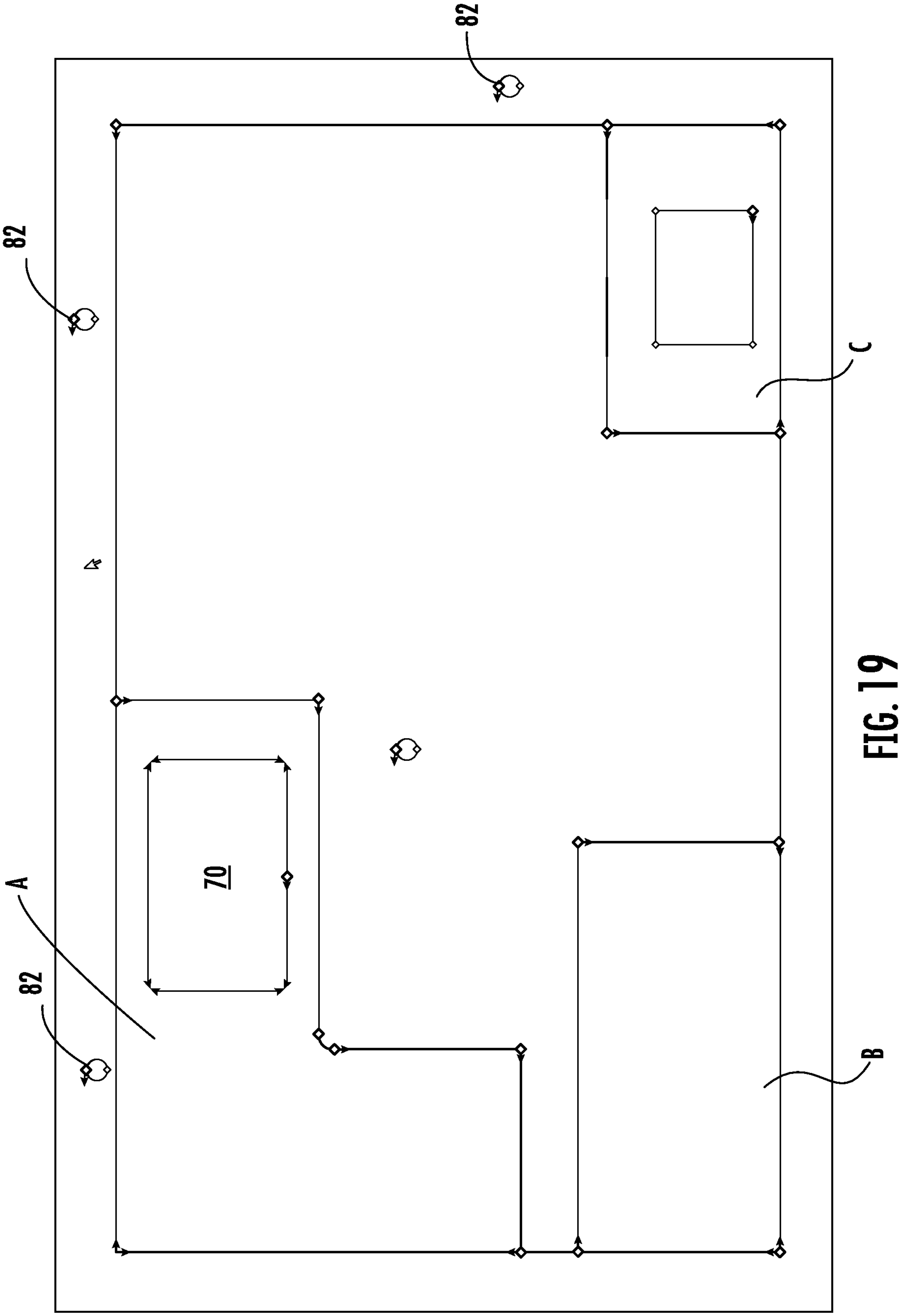
FIG. 19 is a mirror image of the digital slab layout file of FIG. 18.

The sink cutout or sink hole 70 and labeled sections A, B and C are reversed and are shown in FIG. 19. In the example of FIG. 13, a different mirror imaged layout is shown with different cut sections A, B, C on different sections of the slab as a non-limiting example. Once a slab 24 is correctly positioned, the CNC programming may be used to cut, route and finish the slab based upon the original cut layout that is mirror imaged.

The controller 56 is connected to the laser projector 84 (FIGS. 7 and 13) showing the CNC slab processing machine 20 as a cutting/fabrication machine. The mirror imaged locations of the reference markers 82 are projected as digital data by the controller 56 to the laser projector 84, which projects as green light, in an example, the mirror imaged cut layout and importantly the location for the adhered reference markers 82. The bottom ends 82*b* of the adhered reference markers aligned with respective projected reference marker locations when the slab 24 is upside down for cutting in a slab cutting position on the vacuum pods 26 positioned on the work table 78 (FIG. 20).

It should be understood that the reference markers 82 formed from the cylindrically shaped foam elements in this example may be any diameter, but typically are the same length as the thickness of the stone slab 24 so either end of the foam piece is flush with the respective surfaces 24*a*,24*b* of the stones slab. At the very least, there should be two reference markers 82 on one of the long sides 25*b*, such as the top long side, and one reference marker on either of the short sides 25*a*. The reference markers 82 as foam elements may be adhered to the side edges by a waterproof adhesive or similar adhesion technique, and are adhered before a photo image of the slab is taken to generate any slab cut layout. The reference markers 82 will appear in any images as circles and may be traced by a CAD feature of any layout software.

In this example, the reference markers 82 may show up on a DXF file layout (FIGS. 18 and 19) produced from the Slabsmith-type software and CAD features. When these files are used for execution on the machine 20 as a cutting/fabrication machine, the location of the reference markers 82 are mirror imaged and their locations are highlighted and projected via the laser projector 84. Because the slab 24 is upside down with the top polished face 24*a* down and bottom surface 24*b* up for cutting, the only visible references for positioning the slab correctly based upon a desired cutting layout and subsequent sink hole routing and later finishing will be the laser indicating the proper location where the bottom surface of the cylindrical foam reference marker 82 on the actual physical slab are to be located, and thus, enable exact positioning of the slab for cutting upside down in the proper slab cutting position.

As noted before, the machine 20 includes its work surface as the work table 78 on which the slab 24 is positioned upside down on the vacuum pods 26 with respect to the mirror imaged digital slab layout file. In this example, the work surface as a work table 78 supports the vacuum pods 26 on which the top polished face 24*a* of the slab 24 is positioned for upside down cutting. The upside down cutting of the slab 24 occurs on the vacuum pods 26 and exact positioning is required.

The work surface as a work table 78 may be formed as a polished or engineered stone slab such as a quartz slab that has been milled to a flat polished surface and a precise dimension on its surface for CNC cutting and fabrication of a stone slab 24 as will be explained in greater detail below. In an example, the work table 78 may be formed from a quartz slab having a top surface that is substantially level in height along the Z axis. The vacuum pods 26 are positioned on the work table 78 and the vacuum pods provide a safe and secure holding system for the stone slab, and thus, do not require a fabricator to drill into the slab 24 or work around the edges of a countertop.

In this example, the vacuum pods 26 are rectangular configured and include vacuum ports and vulcanized rubber fused onto an anodized aluminum surface with a tolerance of +/−0.02 millimeters. In an example, the vacuum pods 26 project 150 millimeters above the work table 78, which may be a reference for vertical positioning and height, also corresponding to about 5.90551 inches. The slab 24, which may be about 1⅜ inches, is raised from the work table 78 on the vacuum pods 26 in order to cut, rout, drill, machine and polish edges. The friction pads on the vacuum pods 26 as noted before may be made from hot vulcanized rubber fused onto an anodized aluminum surface to endure the harsh and demanding industrial requirements of stone slab cutting. The heights of the vacuum pods 26 may vary, but generally will raise the slab 24 150 millimeters, and in an example, at least a few inches off the work table 78. This permits better cutting either straight or as a bevel and the "deep plunge" with minimal waste (FIGS. 1 and 2) as compared to the cutting directly on a substrate (FIGS. 3 and 4). The term vacuum pods may refer to other support structures that raise the slab off the work table and hold the slab for preferred upside down cutting with the face down. This may include supports with clamps or other hold down mechanisms, including foam supports. However, the structure as illustrated with the vacuum draw has been found efficient and beneficial.

For cutting stone as in the example of FIGS. 1, 2, 5 and 13, the cutting blade as a circular saw blade 80 may be formed from ceramic or similar materials. The mounting cone 51 may be configured to mount or couple the circular saw blade 80 to the spindle 50, which receives the mounting cone in a locking relationship (FIG. 20). Tools for cutting, routing, polishing, etc. may be interchanged as the different tools may be mounted on different coupling or mounting cones 51, with examples of the finishing and edging tools 53 shown in FIG. 12 and contained on a tool rack 53*c* shown positioned between dual first and second work tables 78*a*, 78*b* in FIG. 12A.

The machine 20 may be formed as a slab cutting and fabrication machine, such as a five axis CNC machine sold by Poseidon Industries, Inc. as the T-REX. This CNC fabrication center may operate as a 5 or 4 axis CNC bridge saw. Slabs and slab pieces may be moved around with vacuum lifters or other slab lifting mechanism, such as mounted on a side jib or crane at the machine 20. The machine 20 may also operate as a 5-axis CNC profiling machine and sculpting machine.

The machine 20 may have an automatic tool changer operative with the machining head 46 and spindle 50 to interchange different tools, e.g., profile or finishing and edging tools 53 as shown in FIGS. 12 and 12A, a circular saw attachment as a circular saw blade 80 as shown in FIG. 1, or a routing tool, such as a finger bit router as in FIGS. 8-11. The machine 20 may include a 25 horsepower to 35 horsepower spindle drive depending on configuration and operate with an 18 inch to 20 inch circular saw blade (FIGS. 1, 2, 5 and 13) with a blade attachment for a 20 inch blade diameter. The machine 20 may include a 20 tool magazine as part of a tool rack (FIG. 12A) with two tools on one mounting cone 51 (FIG. 12B) for dual tool finishing without requiring the spindle 50 to interchange tools every time a different tool is required.

Figure 26:
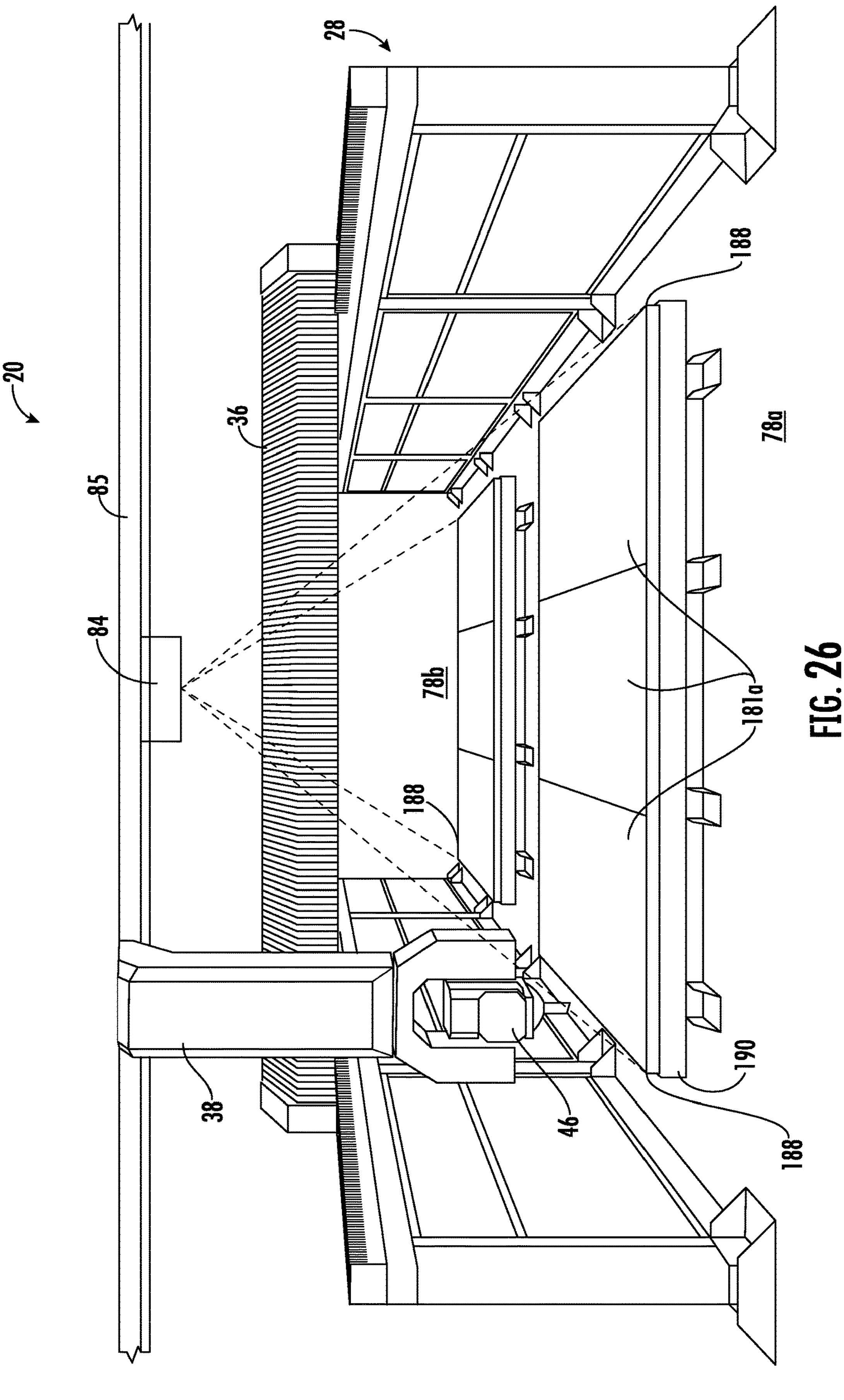
FIG. 26 is a schematic, isometric view of the dual table machine in a fifth stage of installation showing the laser calibration of the height of the first and second work tables using the crystals.
Figure 27:
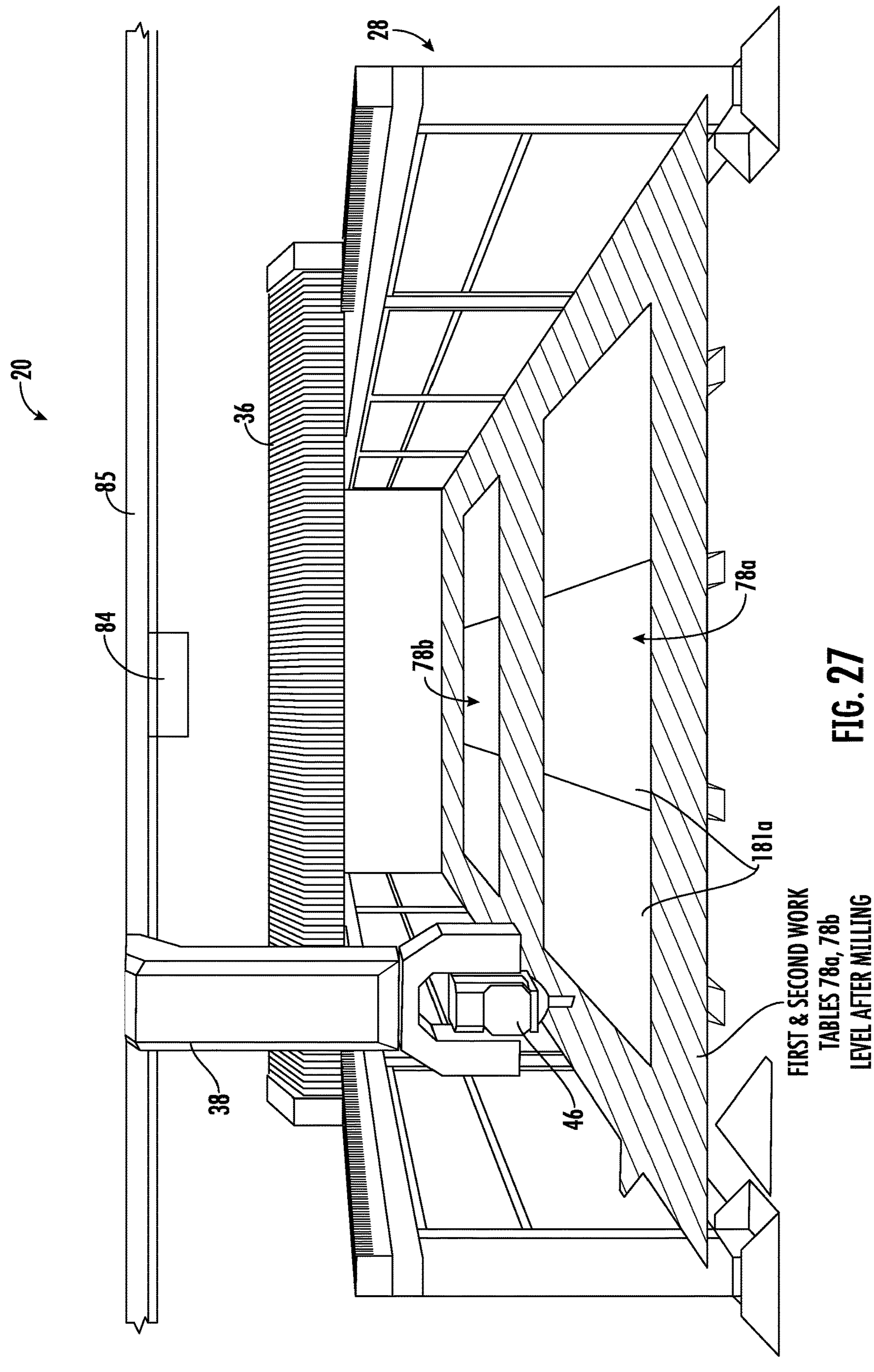
FIG. 27 is a schematic, isometric view of the dual table machine showing the first and second work tables level with each other.

The machine 20 is available in single and dual table models. In FIGS. 12A, 26 and 27, dual first and second work tables 78*a*,78*b* are illustrated in greater detail. In the configuration with a 35 horsepower motor and 20 inch blade, the work table 78 X-axis may be about 160 inches and the Y-axis may be about 100 inches. The compressed air flow may have continuous 125 pounds per square inch at about 10 cubic feet per minute flow rate. Water line capacity for clean water to aid in cutting and cooling is 1 to 2 gallons per minute to aid in cooling and debris removal during cutting via water spray nozzles 86 as shown in FIGS. 8-12. A capacity water line ready with recycled water may be 4 to 6 gallons per minute. The machine weight is about 17,000 pounds and uses 400 volts with mutual 80 amp three-phase power. Different cooling options may be available such as an air hose or water cooling system to help keep the finishing and edging tools and the slab cooler during processing.

All cuts, routing and subsequent sink hole and edge finishing and polishing in the finishing process as described above may occur while the slab 24 is positioned on the vacuum pods 26 or other suction pad or suction system to hold the slab 24 in an upside down position. A slab 24 clamping system using clamps or other holding mechanism may also be used. The laser projector 84 (FIGS. 13, 26 and 27) not only projects the locations for alignment of the reference markers 82 and the slab 24 towards the work table 78 in an upside down position for correct positioning of the slab and subsequent cutting, routing and polishing, but may be used in an example to help guide the machining head 46, also referred to as a cut head using a vision system that permits the machine 20 to follow the laser lines.

The CNC controller 56 typically will incorporate the mirror imaged slab cut layout based upon exact positioning of the slab 24 based upon the projected laser lines from the laser projector 84 to control and guide the machining head 46 after the slab 24 is correctly positioned. The laser projector 84 may be mounted above the work table 78 and may employ a green or red light laser that is controlled via the controller 56. In the example shown in FIGS. 26 and 27, the laser projector 84 is mounted on a ceiling mount, such as a ceiling support 85, and over a central part of the machine 20, such as located between the dual first and second work tables 78*a*,78*b*.

The laser projector 84 may include thermal temperature management for temperature stability and include fiber-coupled lasers with red and/or green laser source having an output power that varies and may range up to 14 milliwatts and a conventional output power of about 7 milliwatts. It may have a focus range from about 0.5 meters to 7.0 meters and a working distance using a tele-optic up to about 14 meters. The green light laser, which is preferred, has greater variability than the red light laser. The fan angle, in an example, can range from 80° by 80° and with tele-optic in an example of about 60° by 60°. Accuracy may be about 0.25 millimeters per meter with the focus range from about 0.5 meters up to about 7.0 meters as a standard focus, and in an example, about up to 14 meters in some examples. Operating voltages may vary, and in an example, may be about 24 volts DC. The laser projector 84 may include different interfaces such as Ethernet TP, 100 based TX or RS-232 or other interfaces.

The laser projector 84 provides for quick and accurate alignment of a slab 24 and the laser projector may show the cut edges of a slab on the basis of complex construction files on the original scale with slabs optimally aligned on the vacuum pods 26 or other holding mechanism and work table 78 using slab contours. The laser projector 84 may be used with dual first and second work tables 78*a*78*b*, such as shown in FIGS. 12A, 26 and 27. The contours of a finished workpiece may be projected on the slab 24 via the laser projector 84.

An example laser projector 84 is a laser projection system produced by SL Laser of Traunreut, Germany that operates as an optical laser guidance system used on the CNC machine 20. Examples include the Pro Director 7 or Pro Director 7LR. Using laser projection, the slab 24 set-up time is reduced and expensive positioning and resulting cutting, routing and finishing errors are avoided.

A control console that may be connected to the controller 56 of the slab processing machine 20 may work with the laser projector 84 as a complete laser projection system or convert the necessary data using an appropriately developed software, such as developed by SL Laser or other software developer. This allows not only the accurate positioning of any slab 26 work pieces, but also accurate positioning of the vacuum pods 26 or other suction or gripping/clamping mechanism and/or fixtures to be fast and precise. This eliminates the requirement for inspection runs with the different tools in place and prevents damage to any section cups, vacuum pods 26 or other hold-down or clamping mechanism. The laser projector 84 may display a drawing with all positions and contours, such as on a 1:1 scale on the surface of the slab 26 and receive data from the controller 56 as part of the control console or from the Computer Aided Design (CAD) software program.

A green light laser beam is clearly visible on the work table 78 and/or work piece as the slab 24. The time-consuming work associated with using templates may be replaced with the laser projector 84 system. Data from a first CAD drawing may be forwarded to the laser projector 84, which then projects the contour onto the stone slab 24. Another drawing with a corresponding contour can be added. By using the mouse and the software program, these two or more contours may be rotated and moved in relation to each other on a display screen of a control console so that the ideal division is achieved. The laser projector 84 projects the results onto the stone slab 24.

It is possible to use a Router Pilot software with an appropriate menu for a routing application, which may include different file types, such as generic G-code, .DXF, .DWG, and .IGES files, and direct inputs from different software packages, including AlphaCam, MasterCam, CAD code, and different software solutions. The different vacuum pods 26 and any support rails or jigs or fixture locations may be shown for fast placement. Different part outlines may be shown for accurate set-ups.

It is possible to use the laser projector 84 for placement of a virtual inventory of different vacuum pods, fixtures, and objects that may be moved, flipped, mirrored, and rotated for marking layouts on the stone slab. The laser projector 84, in an example, is mounted on the ceiling as on a ceiling support 85 as illustrated in FIGS. 26 and 27 so that the laser beam may be projected across both work tables 78a,78b of the dual table machine 20. It is also possible to mount the laser projector 84 on an auxiliary support structure, cross-member, truss, cantilever beam, side support member as shown in FIG. 13, or other support.

In another example, the laser projector 84 may have a +/−0.014 inch or about 0.35 millimeter position accuracy at a distance of over 15 feet, over a 17 foot by 17 foot (4.5 meter by 4.5 meter) area with a 60° projection. The field of view may be horizontal at a maximum 80° and vertical at a maximum 70°. In an example, the laser is a green light laser of about 520 to 525 nanometers and incorporates an FC-laser module and uses a laser class of 5 milliwatts. The laser projector 84 may use 80 to 240 VAC at 50/60 Hertz. In an example, the housing for the laser projector 84, such as mounted on the ceiling as in FIGS. 26 and 27, may be about 18.9 inches (355 millimeters) long, 6.69 inches (120 millimeters) wide, about 11.42 inches (190 millimeters) high. The laser projector 84 may weigh about 5.8 kilograms and operate as a computer-controlled laser projector system in tandem with any CAD or machine 20 control program.

The first and second work tables 78a,78b each may include a respective first and second concrete table base 181a,181b (FIG. 22) on which one or more quartz or stone slab pieces 182a,182b are secured, such as by a thinset mortar to form a planar top surface (FIGS. 25-28). This is applicable to the dual work table machines 20, where their table bases 180a,180b may be constructed using concrete and an applied thinset to secure the stone slab pieces.

The surface of the first and second work tables 78a,78b may be constructed using 1¼ inch to about 1½ inch thick quartz slabs on the table bases 180a,180b. The quartz slabs 181a,181b may be applied on top of the table bases, e.g., two or three pieces for each work table, each quartz slab being about 3 centimeters thick, and in another example, about 1¼ inch. The levels of the first and second work tables 78a,78b are substantially equal in level with each other, which is important when uneven floors may create inconsistencies.

A thinset mortar mix 184 (FIG. 23) may be poured and the quartz slab pieces 181a,181b floated with thinset mortar in between. Each of the work tables 78a,78b for a dual table machine 20 may include three pieces of quartz slab making a work table of about 4,000 millimeters by 2,000 millimeters or about 157.6 by 78.5 inches. The two work tables 78a,78b making the dual table machine 20 are milled down to the exact same height within thousands of an inch. There is a tolerance to allow the milling of both first and second work tables 78a,78b in the dual table machine 20 level with each other because there is a 1¼ inch quartz slab.

A diamond finger bit used as a router or planing bit received in the machining head 46 may mill the first and second work tables 78a,78b faster than prior art aluminum and similar prior art tables. Unless there is a jumbo dual table construction, one laser projector 84 mounted at the ceiling, for example, may be used for both work tables 78a,78b. The tool rack 53c (FIGS. 12 and 12A) holding the finishing tools 53 or other tools is located between the first and second work tables 78a,78b in this example.

At the top and bottom outward corners on each first and second work table 78a,78b (FIG. 25), 1⅛ inch or 1⁵⁄₁₆ inch diameter holes 186 are drilled, and crystals 188 dropped into the holes. When the laser from the laser projector 84 is projecting from the top at the ceiling, the crystals 188 at the outer corners of each work table 78a,78b act as a calibration for the height of the work tables so that the controller 56 receiving input from the laser at the laser projector 84 calculates where the work tables 78a,78b are located and especially the height of slab pieces 181a,181b used for the final planar top surface that had been milled level.

In order for the laser projector 84 and controller 56 to tell the operator where any slab 24 to be processed is to be positioned, a height calibration is required. The crystals 188 in each hole 186 are used for that calibration and may be dropped into the holes for calibration in the morning and after lunch during the work day when slabs are processed on the dual table slab processing machine 20.

An operator may press a button on a control panel connected to the controller 56 and the laser from the laser projector 84 emits its optical beam at the crystals 188 and scans the first and second work tables 78a,78b (FIG. 26). When the optical beam from the laser projector 84 impacts the crystals 188, the optical beam reflects back into the laser projector 84 as part of its optical receiver and the controller 56 then determines exactly the height in the two directions for the first and second work tables 78a,78b.

This is a technical reason first and second work tables 78a,78b are required to be perfectly level to within thousandths of an inch. The level first and second work tables 78a,78b facilitate programming for the processing of first and second slabs 24x,24y on the work tables (FIG. 28), since there is one origin for both work tables, thus requiring only one calibration for the two work tables, and not two separate calibrations. It is possible to use four crystals 188 at the corner of each single work table 78a,78b of the dual table machine 20, which may be required on larger jumbo work table machines. In that case, each work table 78a,78b may require its own laser projector 84 positioned overhead to the respective work table.

In an example of processing on the work tables 78a,78b, the vacuum pods 26 (or other slab hold mechanism like clamps) are located on the work tables, and in an example, the vacuum pods have a top surface raised 150 millimeters. It is known where to place the vacuum pods 26 for slab processing because the crystals 188 are calibrated such that the work tables 78 are at the proper level. There may be a setting on the machine 20 that indicates 150 millimeters and the laser projector 84 will begin to project 150 millimeters above the work table 78, which is the reference. If a slab 24, e.g., a piece of granite is 1⅜ inches thick, then the 1⅜ inches thickness is added to 150 millimeters to change the projection position and accurately position the slab with reference to the 0, 0 point of the first and second work tables 78a,78b. In one non-limiting example, the laser projector 84 works with both work tables 78a,78b to position slab pieces, such as first and second slabs 24x,24y (FIG. 18) properly. While the machine 20 is processing a first slab 24x at a first work table 78a, the other second work table 78b is being set up for processing of the other second slab 24y.

Different CNC formats may be supported using different laser protecting software, such as DXF, where contours may be transferred directly to the laser projector 84 via the controller 56 and its machine control for cutting, routing, edging and finishing according to preprogrammed routines defined by the initial work cut-out and the mirror image slab cut layouts as described above. Interface communication connections may include the RS232, optical fiber, RS485, or other network connections such as IPX/XPF, TCB/IP with each session able to control multiple laser projectors 84, if needed.

The laser projector 84 may be mounted at different locations on the frame 28 and preferably at the ceiling support 85, such as shown in FIGS. 26 and 27. The laser projector 84 may also be mounted separate on a work stand, other than the preferred ceiling mount, to ensure the laser covers the entire work table 78, including dual work tables 78*a*,78*b* in the dual table machine. The laser projector 84 may also be mounted in some examples on a rotatable block mount as part of the machine frame 28 and even on the bridge 36 or carriage 38. Wavelengths for the laser may vary from about 635 nanometers to about 830 nanometers, and in another example, from about 405 nanometers to 830 nanometers or other ranges therebetween.

The controller 56 may incorporate a computer system that processes data in accordance with one or more instructions and includes one or more processors and memory such as both RAM and ROM for storing data. The controller 56 may be a personal computer, high end workstation, a mainframe, one or more servers, a cloud based system, or small handheld device in non-limiting examples. The controller 56 may incorporate several computers, on the other hand, controlling the at least one drive mechanism 100, such as respective individual motors, actuators, etc. The controller 56 not only controls the different electric motors, actuators, stepper motors, servomotors, and other machine components, but also processes any digital images (FIGS. 14 and 15) using an appropriate CAD program, including for example, Slabsmith, and may process image data and issue commands to the machine 20.

The controller 56 may include an image data conversion program as software that converts image data such as the CAD DXF file, in an example, into the appropriate control signals for instructing the CNC slab processing machine 20 and its different actuators, motors, etc. to move the machining head 46 in the appropriate directions along the five X, Y, Z, A and C axes. It is possible that externally-generated digital image files may be stored in a memory of the controller 56. Other image files may be transmitted to the controller 56 via a local area or wide area network and wired or wireless connections or via other network routes.

The CAD program may store data in layers and blocks of data that include not only a countertop outline, but an outline for a sink hole 70, i.e., opening, faucet cut-outs, sink anchor holes 127 (FIG. 7), and other structures and features in a countertop or other cut slab piece. In order to ensure proper positioning and cutting, the CNC slab processing machine 20 includes smooth planar top surfaces on which the respective first and second slabs 24*x*,24*y* are positioned upside down on the vacuum pods 26 or other slab holding mechanism, such as one or more accurately milled, engineered, and polished quartz or similar surface described above. Similar highly accurate milling and polishing used for processing a slab 24 may be used to produce the flat and milled polished planar top surfaces of the work tables 78*a*,78*b*.

Digital images 134 of different slabs 24, including the top polished faces 24*a* with different aesthetic vein characteristics of different slabs may be stored within a database associated with the controller 56. Different slab cut layout 152 files may be stored with several files possible for an individual slab 24. The digital image 134 of a top polished face 24*a* of the slab 24 may include dimensional and material details about the stone slab and data related to its storage, including a unique identifier, the date/time it was stored, the dimensional relationships, including the thickness, length and width as a rough cut slab, color characteristics, possible purchaser information, and other customer and commercial data related to the slab.

Many types of cameras 144 may be used to take a digital image 134 of the slab 24, including the top polished face 24*a* of the slab and any adhered reference markers 82. A camera 144 may be incorporated into a manufacturing line and images may be taken when the slab is positioned off-table from the CNC slab processing machine 20. The camera 144 may be a visible light camera, infrared camera, 3D scanning device, time-of-flight camera, structured light scanner, or stereoscopic scanner. The camera 144 may take 2D and 3D images depending on configuration.

Any imaging device 130 as a display may include a user interface menu that allows user selection via a mouse or other input device, including a keyboard, to toggle between different viewing angles or vantage points and input data related to the slab and cut layouts. The stone slab 24 may be a molded stone slab or formed from particulate mineral material that may be mixed with pigments and a resin binder and compressed to form a hardened slab.

The stone slab may be cut to specific shapes for a countertop, table, floor, or similar end uses. The aesthetic effect of the top polished face 24*a* of the stone slab 24 includes the veins 150 (FIGS. 15 and 16) that may extend the complete length of the stone slab and through all or part of the thickness of a stone slab, and provide the natural vein appearance even when the slab is cut and edged to specific shapes. The initial digital image 134 of the slab 24, such as its top polished face 24*a*, will show the perceptible characteristics and veins.

Different unique identifiers for a stone slab may include a label, bar code, RFID tag, QR code, or etching and writing directly on the stone slab an identifier. Any digital image 134 of the stone slab 24 may have a predetermined dimensional relationship and the ratio of stone slab unit lengths per image pixel may extend less than 0.001 inch per pixel up to 0.02 inch per pixel. This small pixel ratio may allow a distortion free image to be shown. Thus, a digital image 134 of the top polished face 24*a* may provide a reliable image and tool to overlay a slab cut layout on the digital image and provide a known relationship that facilitates a high degree of precision for slab visualization when generating the slab cut layout.

Figure 21:
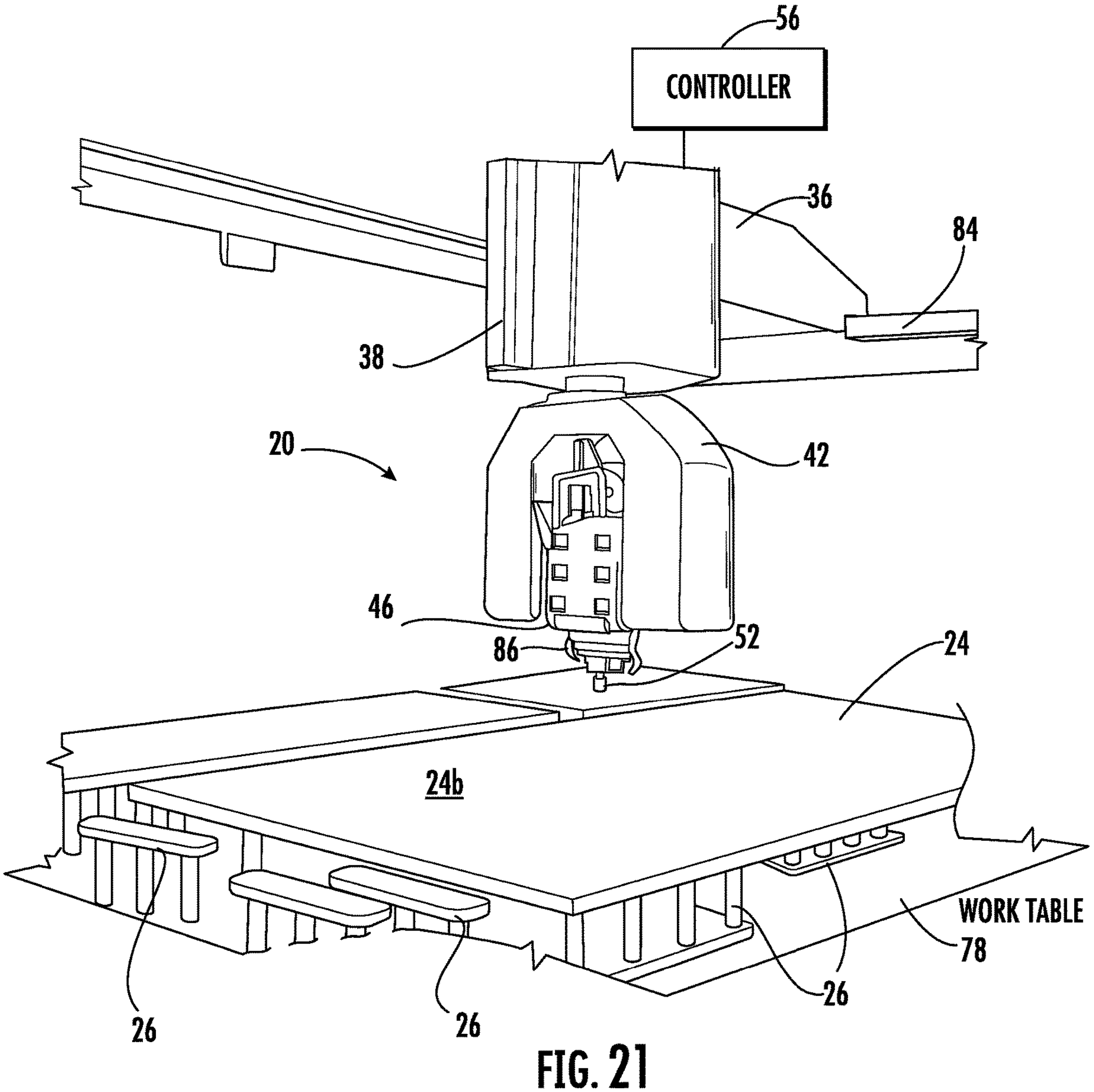
FIG. 21 is another view of the machine of FIG. 20 showing the cut stone slab with a finger bit inserted within the spindle of the machining head.

Referring now to FIGS. 20 and 21, schematic, isometric diagrams of the machine 20 are illustrated showing an example of cutting the side edges of a slab 24 with a circular saw blade 80 (FIG. 20). A coupling for receiving a mounting cone 51 is configured in the example of FIG. 20 to mount the circular saw blade 80 to the spindle 50. In the example of FIG. 21, the circular saw blade 80 has been switched out and a new mounting or coupling cone 51 inserted that supports a finger bit 52 for routing. The machining head 46 has been rotated back on the "A-axis" and the spindle 50 is vertically oriented. The cutting tool such as the finger bit 52 may be inserted for cutting out a sink hole 70 or cutting the edges of the sink or another finishing tool mounted for finishing.

In the example in FIG. 21, the slab has been cut into three pieces, which may be further processed. The three pieces of slab 20 may have been cut using the circular saw blade 80 as shown in FIG. 20 or cut by a finger bit 52. This view helps illustrate the diversity of the machine 20. It is possible that a circular saw blade 80 may be used to cut large radius circles or curves for a sink hole 70 or other features, or a finger bit 52 used. The machine 20 is versatile as described.

The dual work table slab processing machine 20 offers several benefits. To maximize machine processing time, the dual work table slab processing machine 20 using the laser projector 84 for set-up allows a second work table 78*b* to be set-up as the machine is working on the other or first work table 78*a*. This allows the operator to eliminate any down time of a single table fabrication machine corresponding to Phases 2 and 3 as described above. A single table CNC machine or router to perform Phase 2, on the other hand, is the industry standard and the design of most prior art machines. This allows the current dual work table slab processing machine 20 to save about 2 to 3 hours of daily down time of the current competitor machinery. This means machines are more productive overall as well as requiring only one operator to perform the whole process instead of having two operators as in prior art machines.

Figure 29:
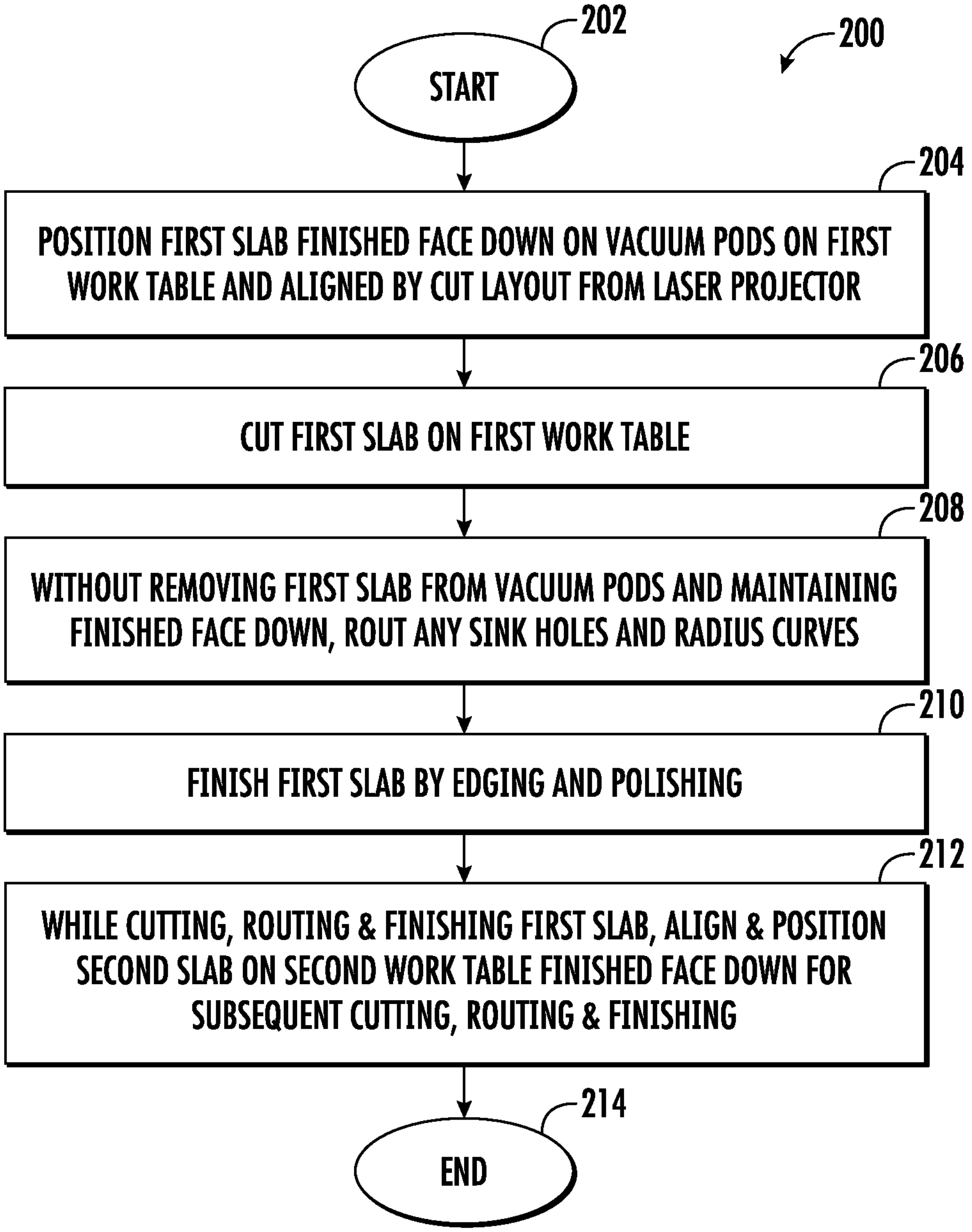
FIG. 29 is a high-level flow sequence showing first slab processing at a first work table followed by second slab processing at a second work table.

Referring now to FIG. 29, there is illustrated generally at 200 a flow sequence showing a first slab 24*x* processing on a first work table 78*a* followed by a second slab 24*y* processing at a second work table 78*b*. Each slab has a finished face and bottom surface. The process starts (Block 202) and the sequence includes positioning a first slab 24*x* upside down with the finished face down on vacuum pods 26 positioned on a first work table 78*a*. The slab is aligned by a slab cut layout projected from the laser projector (Block 204). The method includes cutting the first slab 24*x* while positioned upside down with the finished face down (Block 206).

Without removing the first cut slab from the vacuum pods 26 and maintaining the finished face down, any sink holes and radius curves are routed on the first slab (Block 208). The first slab 24*x* is finished by forming an edge profile on the inside of any sink holes and edging and polishing the sides of the finished first slab (Block 210). While cutting, routing and finishing the first slab 24*x* on the first work table 78*a* and projecting from the laser projector 84 the slab cut layout, the second slab 24*y* is aligned upside down with the finished face down on vacuum pods 26 positioned on the second work table 78*b* for subsequent cutting, routing and finishing of the second slab (Block 212). The process ends (Block 214).

As noted before, the first and second slabs 24*x*,24*y* may be oriented finished face down based upon first and second mirror image slab cut layouts that are projected from the laser projector 84. The first and second slabs 24*x*,24*y* may be oriented with respective first and second mirror imaged slab cut layouts that are based upon a slab cut layout on the finished face of the respective first and second slabs. The side edges of each of the first and second slabs may be cut upside down by following the mirror imaged slab cut layout to form a slab corresponding substantially to the shape of a countertop. A circular saw blade 80 mounted on the spindle 50 of the machining head 46 may be used for the cutting followed by routing using a finger bit 52 that has been switched onto the spindle after removal of the circular saw blade.

The dual work table slab processing machine 20 is capable of processing first and second slabs 24*x*,24*y* while working on one work table, while the other work table is being set-up via the laser projector 84 in order to perform a "cut and move" process without losing time, nor using a waterjet to complete a cut. If there is a first stone slab 24*x* on the first work table 78*a* and second stone slab 24*y* on the second work table 78*b* when the dual work table machine cuts the first slab, it can perform all cuts before the "move." Then, when the machining head 46 moves to the second work table 78*b* to cut the second work slab 24*y*, while it is cutting this slab, the laser projector 84 can show the operator on the first cut slab where to move the pieces that must be "moved" in the "cut and move" process to their exact position. This may be performed cleanly, accurately, and without any loss of time or need for a costly waterjet to complete the cut process.

Figure 30:
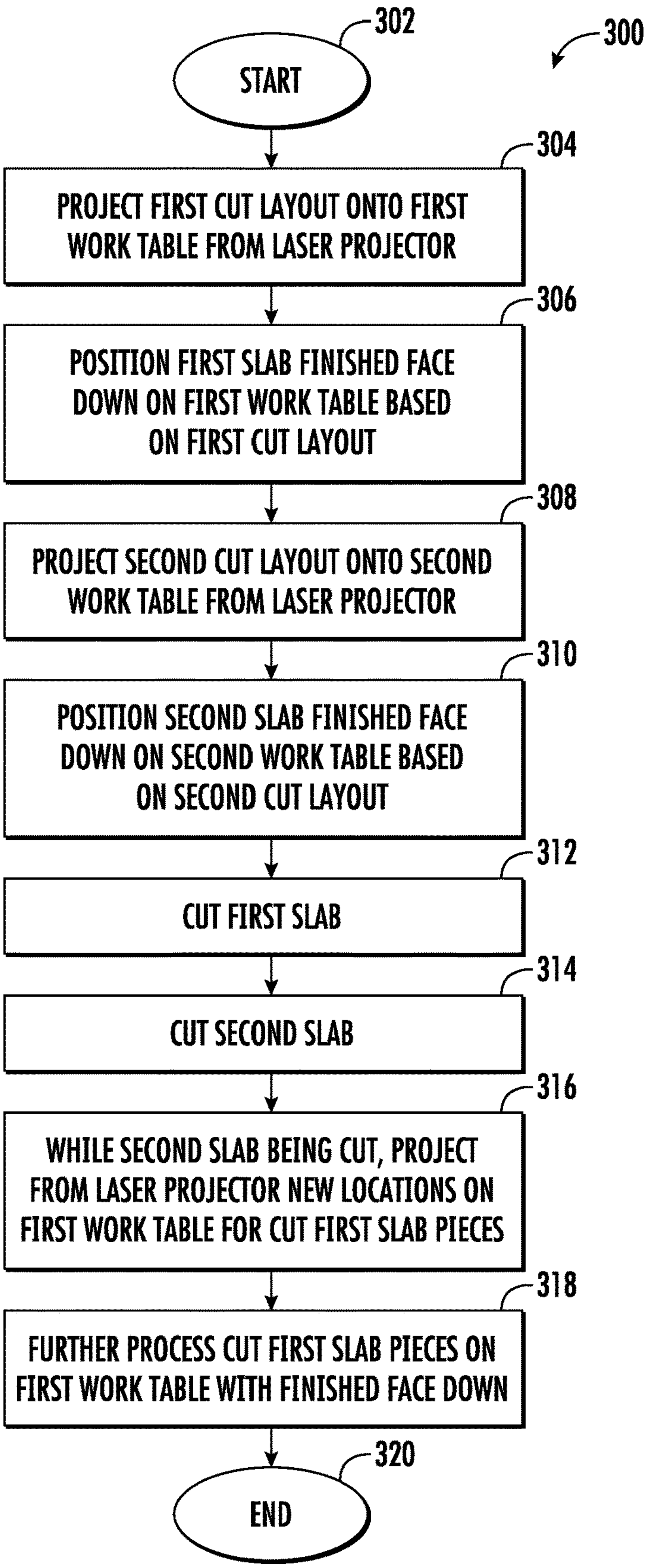
FIG. 30 is a high-level flow sequence of a "cut and move" of a first slab on a first work table, while a second slab on a second work table is being cut.

Referring now to FIG. 30, there is shown generally at 300 a high-level flow sequence of a "cut and move" of a first slab 24*x* on a first work table 78*a*, while a second slab 24*y* on a second work table 78*b* is being cut. The process starts (Block 302) and a first cut layout is protected onto the first work table 78*a* from the laser projector 84 (Block 304). The method includes positioning a first slab 24*x* upside down with the finished face down on vacuum pods 26 positioned on the first work table 78*a* in the slab processing area 34 of the slab processing machine 20 and based on a first cut layout (Block 306). A second cut layout is projected onto a second work table from the laser projector 84 (Block 308) and a second slab 24*y* is positioned upside down with the finished face down on vacuum pods 26 positioned on the second work table 78*b* within the slab processing area 34 (Block 310).

A 5-axis machining head 46 is operated to cut the first slab 24*x* while positioned upside down with the finished face down on the first work table 78*a* (Block 312). The machining head 46 is moved to the second work table 78*b* and the second slab 24*y* is cut upside down with the finished face down on the second work table (Block 314). While the second slab 24*y* is being cut, the laser projector projects onto the first work table 78*a* new locations where cut pieces from the first slab 24*x* are to be positioned on the first work table 78*a* for further processing of cut pieces from the first slab 24*x* (Block 316). Further processing of the cut first slab pieces on the first work table 78*a* with the finished face down occurs (Block 318). The process ends (Block 320).

Referring once again to FIGS. 22-28, the different stages of constructing the first and second (dual) work tables 78*a*,78*b* used in the dual table machine 20 are illustrated as non-limiting examples. To form the two work tables 78*a*, 78*b*, an example list of supplies may include about 16-18 bags of 65-pound cement and a Quickset Cement such as Greencore 65 equals to 80 Type S mortar. Six bags of multi-purpose thinset used for large pieces of stone heavy duty, such as recommended for porcelain tile white 50 pounds of fortified thinset mortar may be used. A 1×11 inch by 0.5 inch by 0.5 inch square notch pro-flooring trowel with a wooden handle may be used and a 1×14 inch by 4 inch finishing trowel may be used. A straight piece of 8 foot 2×4 with a 75 inch, ¾ inch notch may be used. Concrete may be poured in a form that includes an aluminum channel 190 as a side channel acting as a side or peripheral edge.

Figure 22:
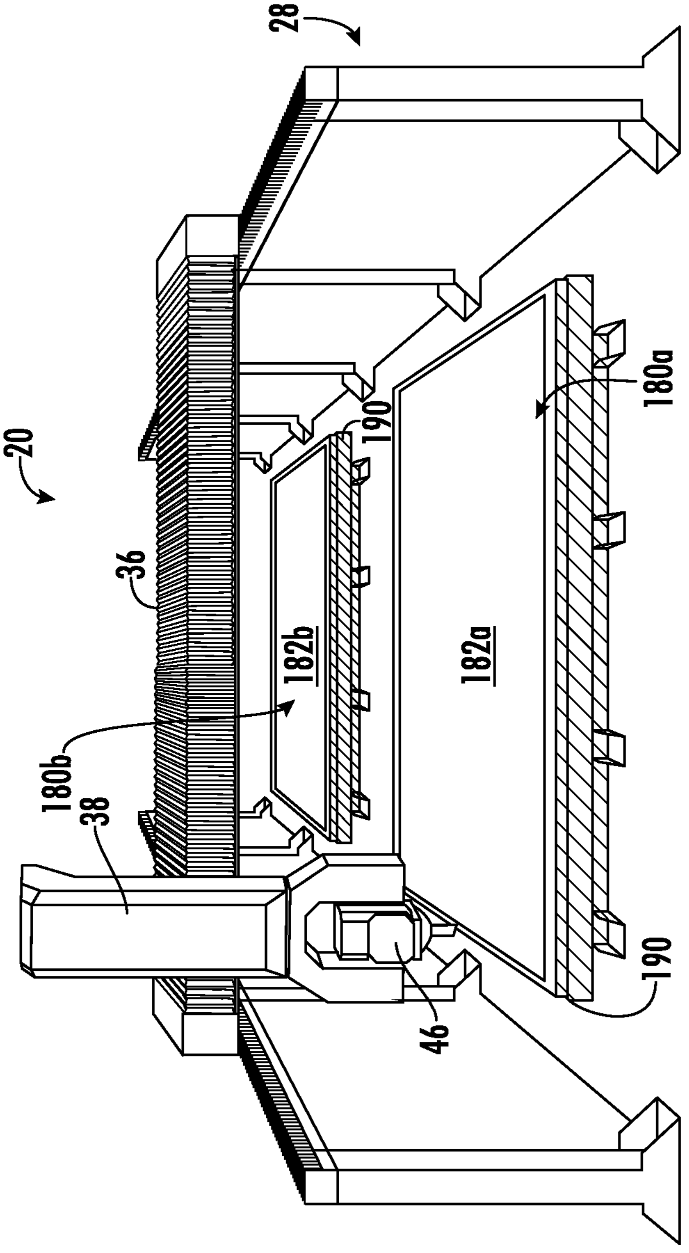
FIG. 22 is a schematic, isometric view of the dual table machine in a first stage of installation showing the first and second concrete table bases each having an aluminum channel.

For example, the wood may be used when pouring the concrete for first and second concrete table bases 180*a*,180*b* with the notched wood to the correct height allowing the poured concrete to be 1¼ inch to 1½ inch thick on the table base where the notch should be about ¾ inch to keep the concrete level. When the concrete is level, the clean aluminum channel 190 is cleaned of any excess concrete as shown in FIG. 22, showing the first and second concrete table bases 180*a*,180*b* and aluminum channel as a side channel. The concrete is dried for about 36-48 hours depending on the type of concrete used. The table bases 180*a*,180*b* are formed and are substantially level to have substantially planar top surfaces 182*a*,182*b*.

Figure 23:
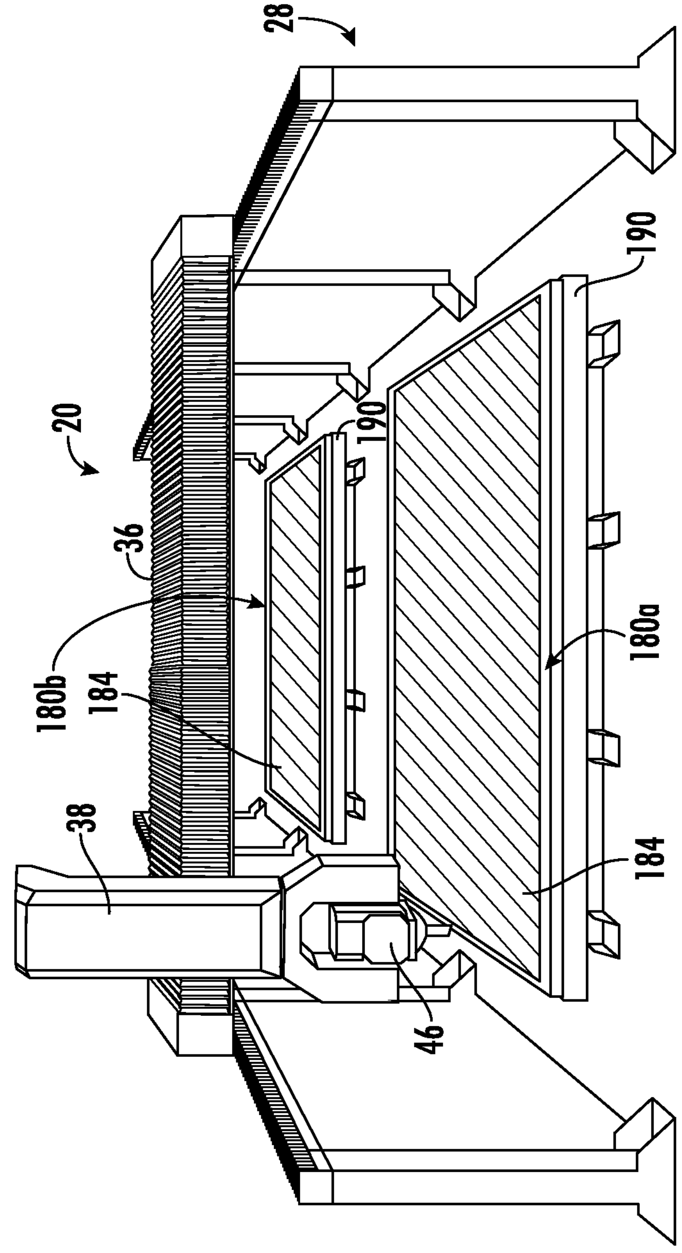
FIG. 23 is another schematic, isometric view of the dual table machine showing a second stage of installation where thinset masonry is applied on the first and second concrete table bases.
Figure 24:
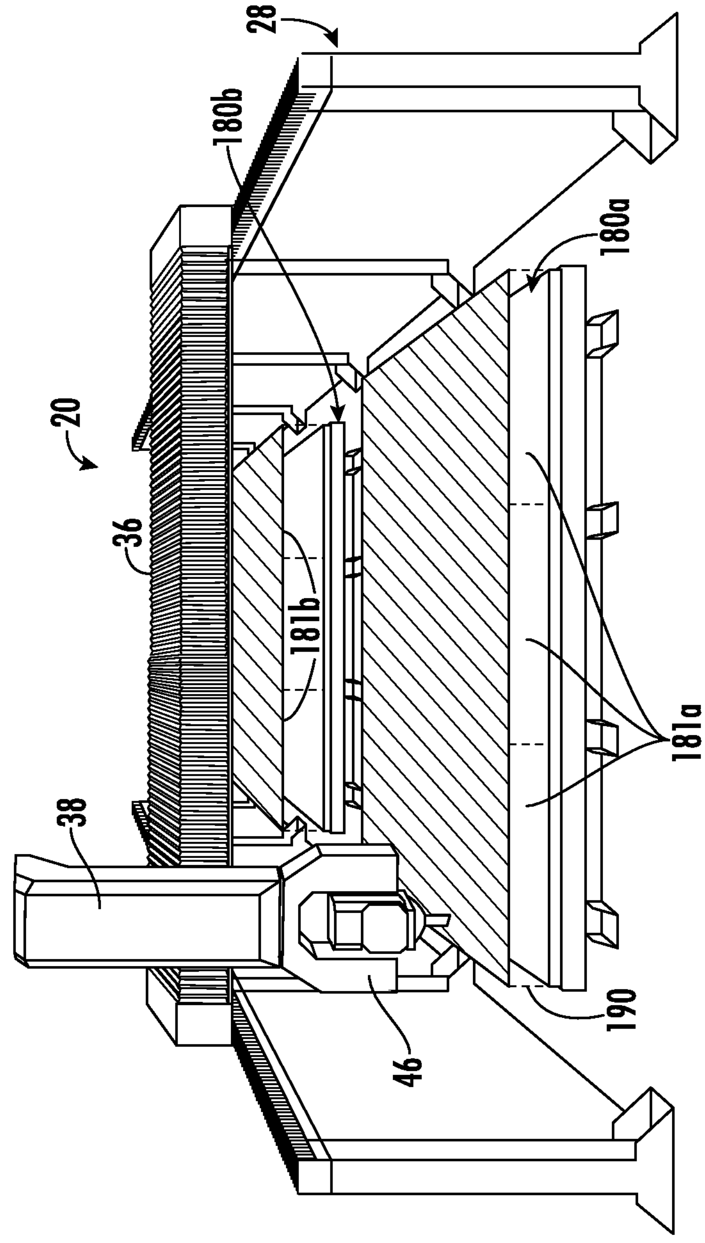
FIG. 24 is a schematic, isometric view of the dual table machine in a third stage of installation showing three cut-to-size quartz slabs placed on the thinset masonry of each concrete table base to form the top planar surfaces of the work tables, which are then milled level to each other.

The thinset 184 is mixed and poured on planar top surfaces 182*a*,182*b* of the dry concrete table bases 180*a*, 180*b* using the ½ inch square notch pro flooring trowel, in the example shown in FIG. 23. As shown in FIG. 24, three equal pieces of 3 centimeter slabs 181*a*,181*b* that are cut for each of the table bases 180*a*,180*b* are placed on the thinset. In this example, they are about 3 centimeters thick, where the thickness of the slab should not vary by more than 1/16th inch and should not be warped or bowed. The standard table dimension may be about 4,000 millimeters by about 2,000 millimeters, corresponding to about 157.6 by 78.5 inches with a ¼ inch play around the table. A 1/16th inch gap between the slab pieces 181*a*,181*b* may be filled with liquid glue after one day of curing, and the openings between the exterior edge of the slabs and the metal edge as the aluminum channel 190 may be filled.

Figure 25:
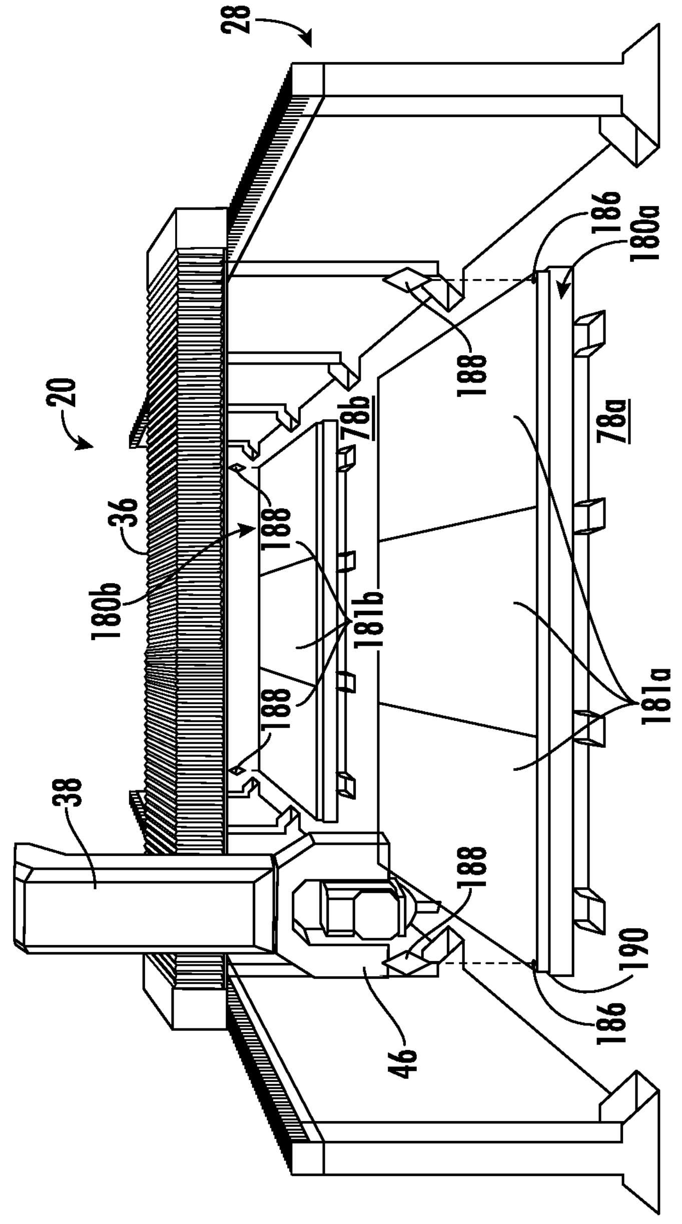
FIG. 25 is a schematic, isometric view of the dual table machine in a fourth stage of installation showing crystals placed in drilled corner holes of the first and second work tables.
Figure 28:
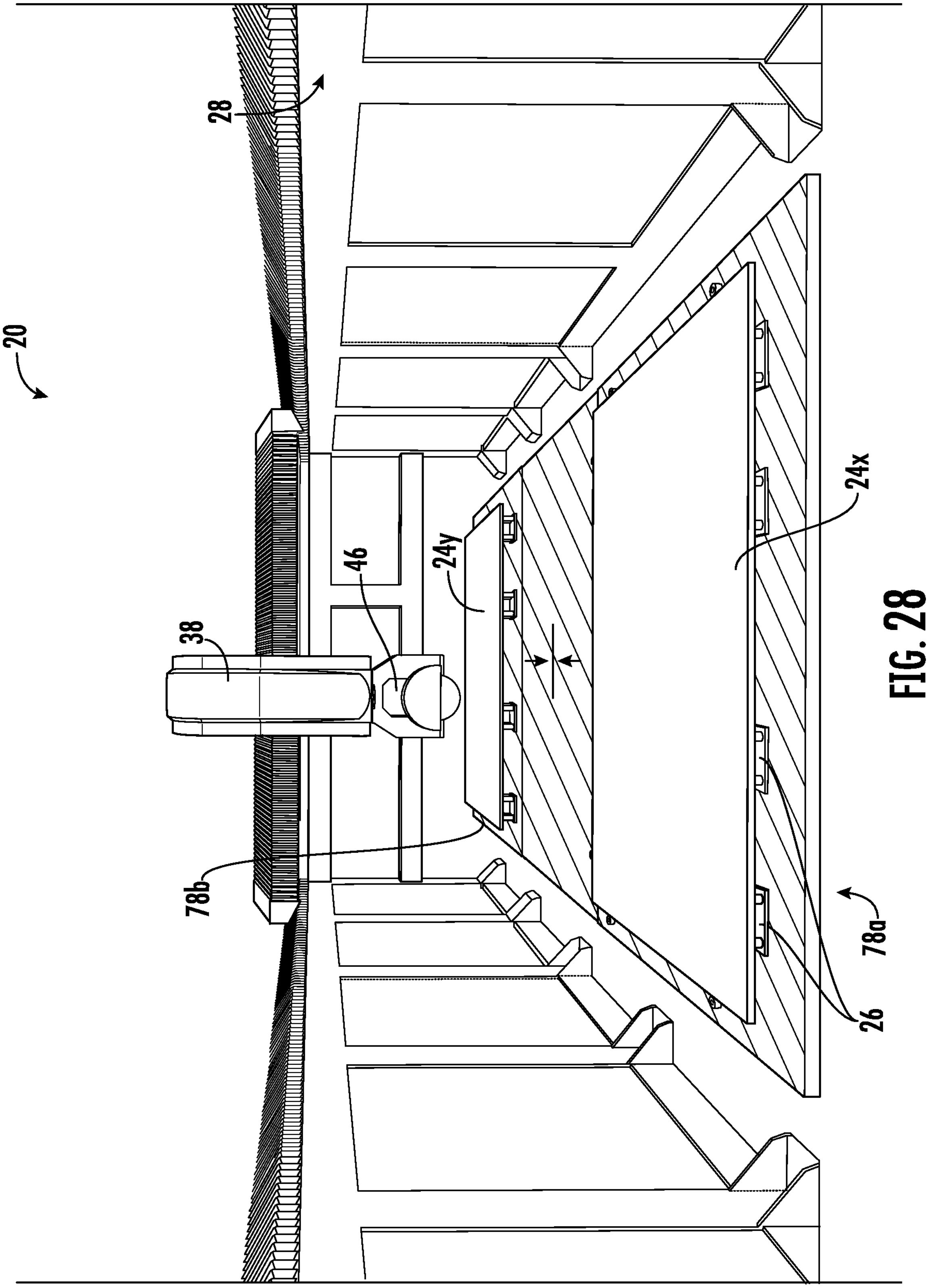
FIG. 28 is another schematic, isometric view of the dual table machine showing first and second stone slabs positioned on vacuum pads on respective first and second work tables and substantially level with each other.

As shown in FIG. 25, the four holes 186 are placed at the outer corners of the first and second work tables 78*a*,78*b* top surfaces and the crystals 188 are placed inside to perform the laser calibration using the laser projector 84 as shown in FIG. 26, after the top surfaces had been milled to a perfect level. The perfect level within thousands of an inch is achieved (FIG. 27). First and second slabs 24*x*,24*y* are shown on the vacuum pods 26 and level with each other as shown in FIG. 28. In the example of FIG. 28, first and second slabs 24*x*,24*y* are shown supported by the work tables that are represented as level with each other.

Figure 31:
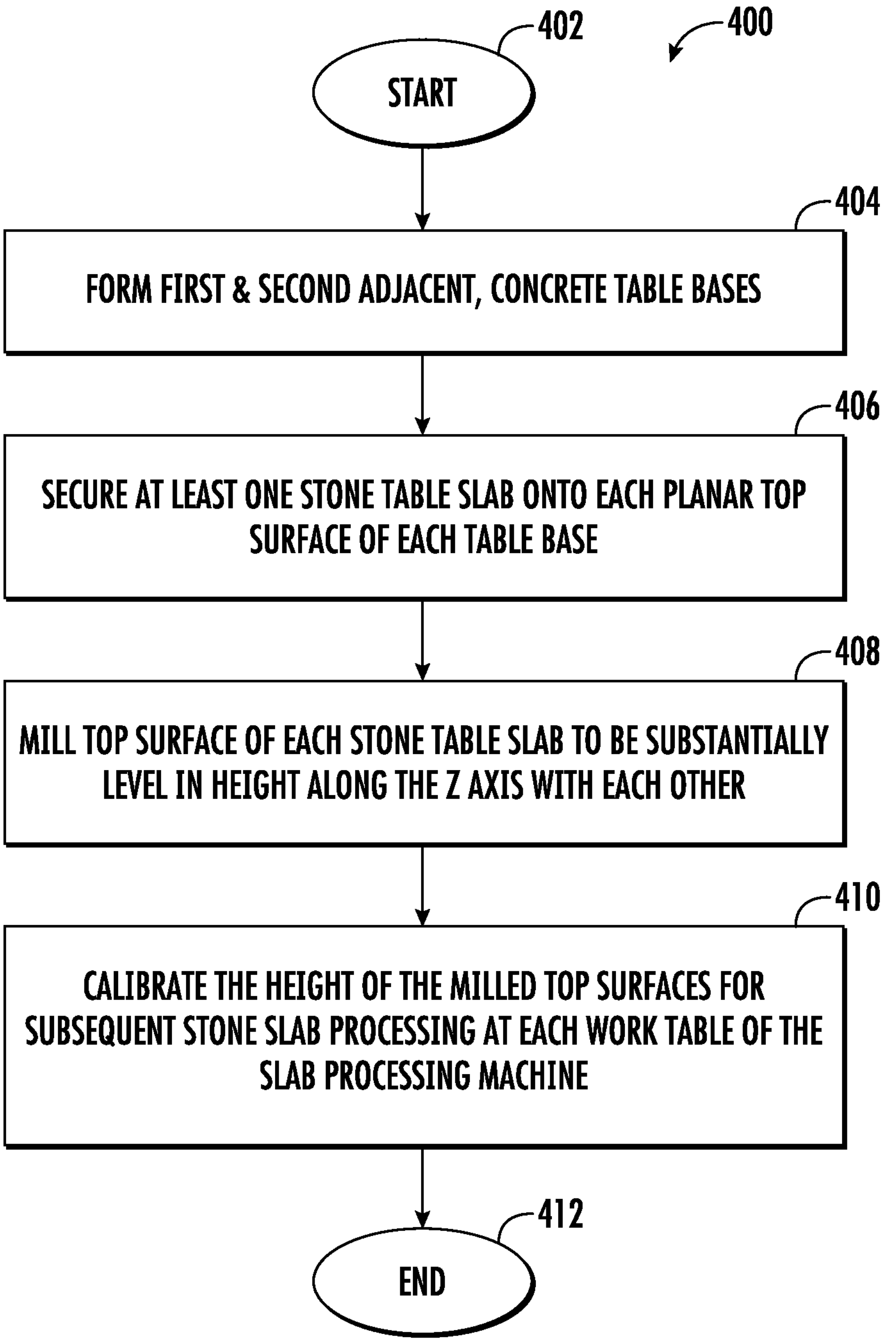
FIG. 31 is a high-level flow sequence showing the making of dual tables for the slab processing machine.
Figure 32:
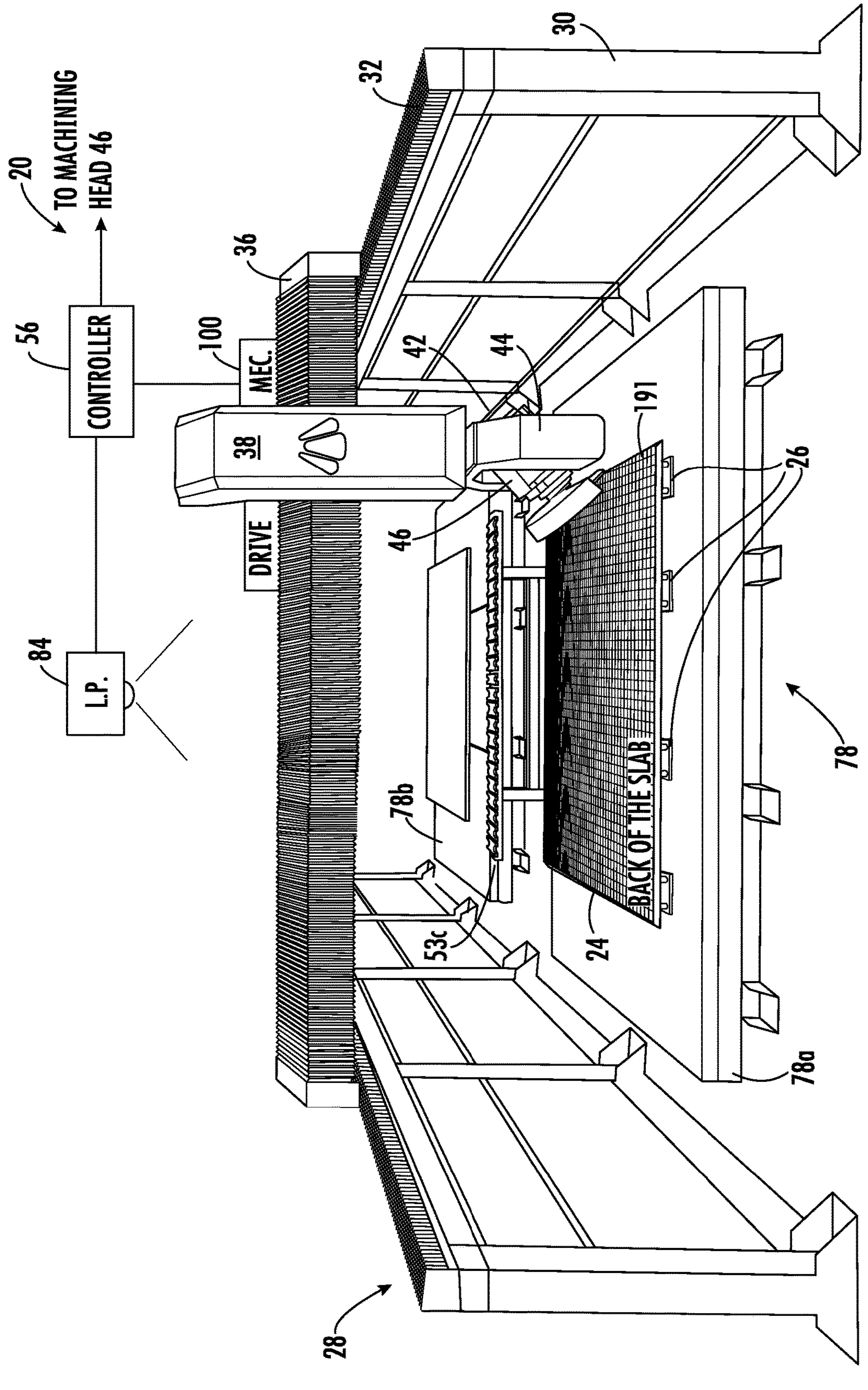
FIG. 32 is a schematic, isometric view of the machine showing the upside down slab with its finished face down against the vacuum pods being bevel cut using a circular saw blade.
Figure 33:
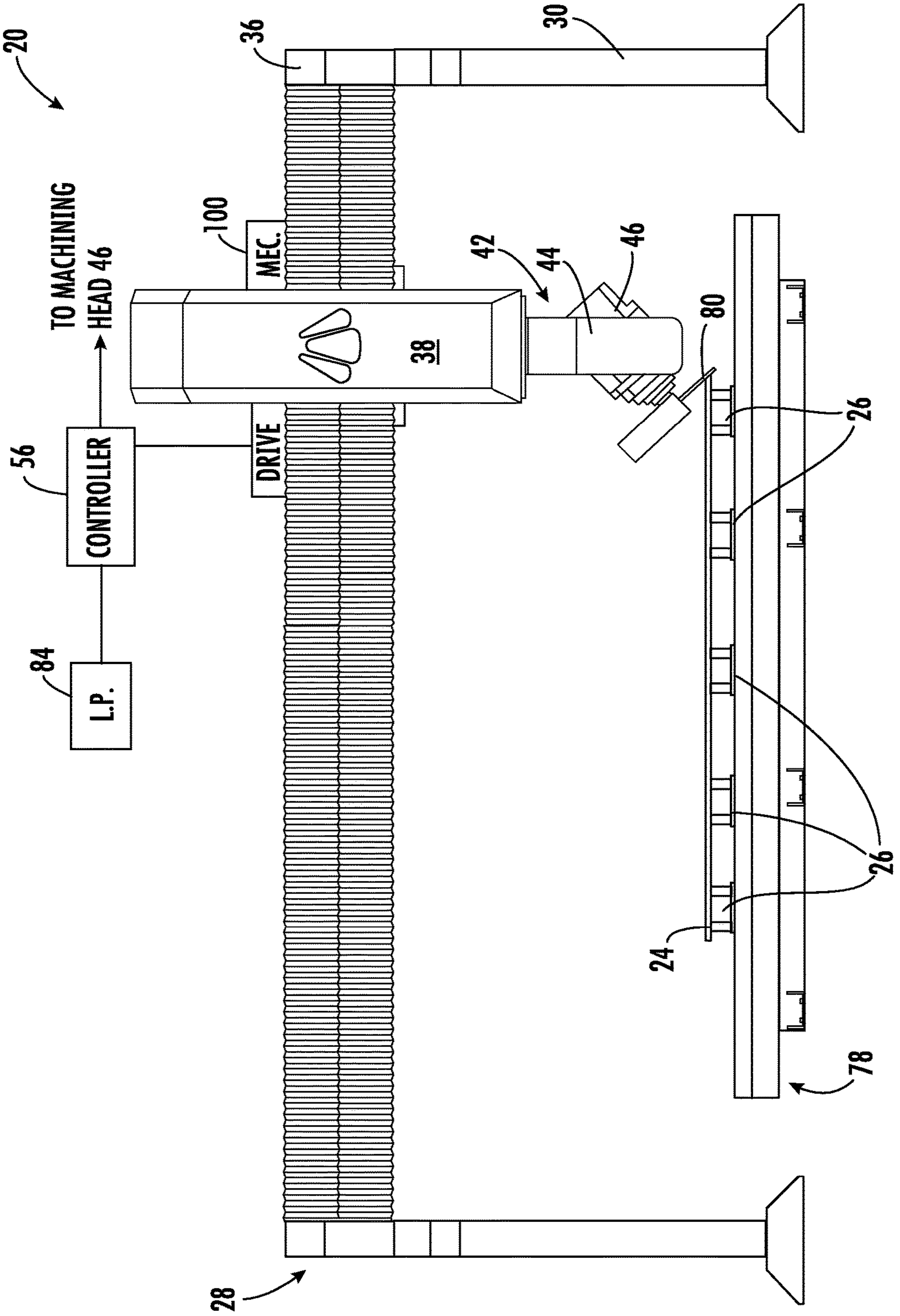
FIG. 33 is a side elevation view of the machine of FIG. 32 showing the machining head rotated on the A-axis for bevel cutting.
Figure 34:
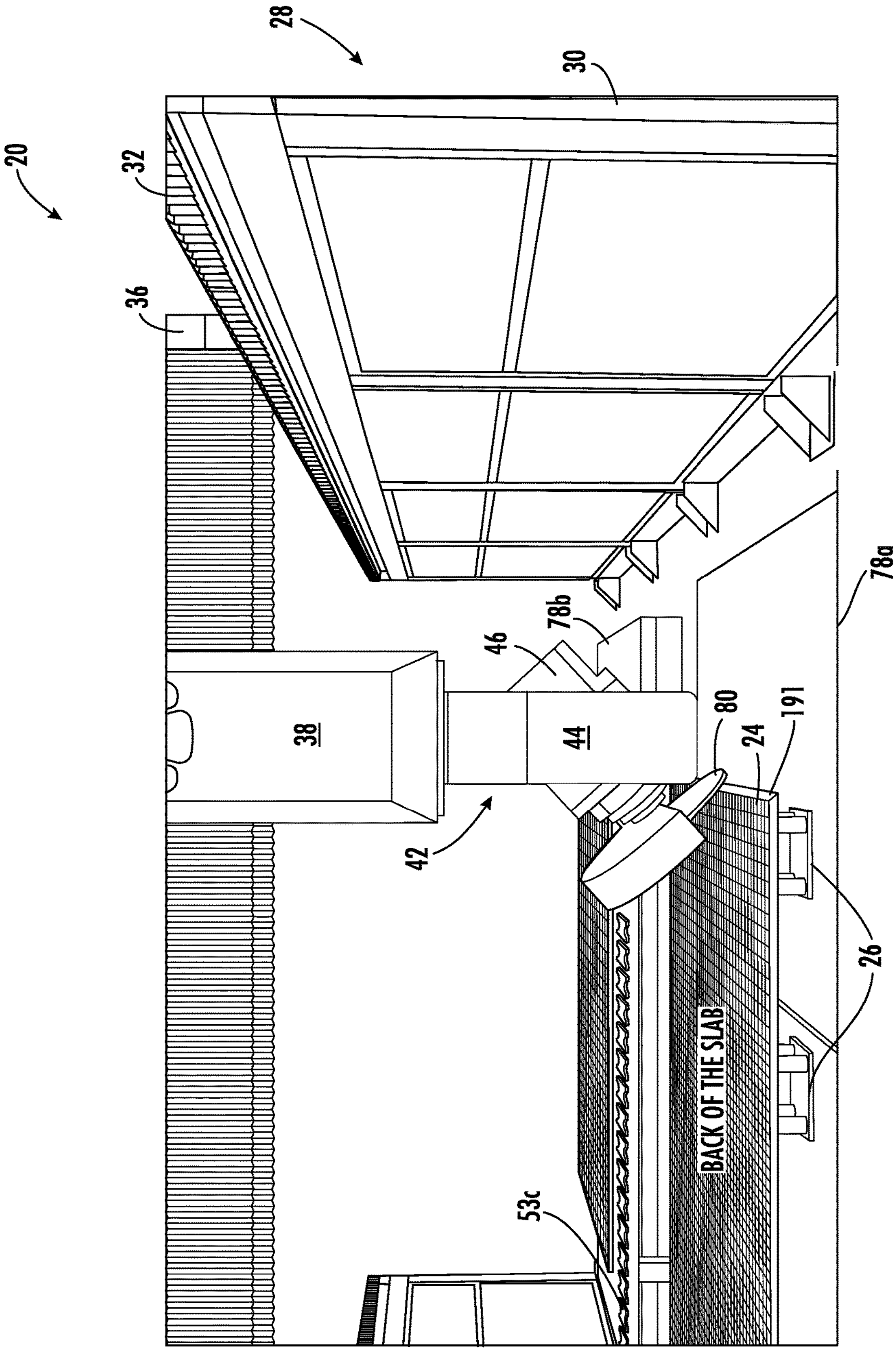
FIG. 34 is an enlarged, schematic isometric view of the machine of FIG. 32 showing the upside down slab with its finished face down against the vacuum pods being bevel cut using the circular saw blade.

Referring now to FIG. 31, there shown a flow sequence for the making of the dual work tables for the slab processing machine and illustrated generally at 400. The process starts (Block 402). First and second adjacent, concrete table bases 180*a*,180*b* are formed in a slab processing area 34 of the slab processing machine 20. Each first and second concrete table base 180*a*,180*b* includes a planar top surface 182*a*,182*b* being substantially coplanar with each other in the Z-axis extending along the X and Y axis (Block 402). At least one stone table slab 181*a*,181*b* is secured onto each planar top surface 182*a*,182*b* of each table base 180*a*,180*b* (Block 406). The top surfaces of each stone table slab are milled and polished to be substantially level in height along to Z-axis with each other, such as to within a few thousands of an inch, and more particularly, for example, about 0.001 inch to about 0.003 inches (Block 408). The height of the milled top surfaces may be calibrated for subsequent stone slab processing at each work table 78*a*,78*b* of the slab processing machine 20 (Block 410). The process ends (Block 412).

In the process, the crystals 188 may be positioned at outermost corners of the top surface of each work table opposite the adjacent work table and calibrated by the laser projecting an optical beam onto the crystals from the overhead laser projector 84 to establish an origin reference for both work tables. The metallic channel 190 that is formed as an aluminum side channel along the sides of each table base may have a top edge defining the top outer edge of each work table 78*a*,78*b*. At least two stone table slab pieces, and preferably three stone table slab pieces 181*a*,181*b*, are secured onto each planar top surface 182*a*,182*b* of each table base 180*a*,180*b* and secured by the mortar 184 applied between the bottom surface of the stone table slab and concrete table base. Each stone table slab piece may be about 2 centimeters to about 4 centimeters thick, and each stone table slab piece has a thickness that does not vary by more than 1/16 inch.

The machine 20 may have a cantilever construction that moves in an axis with fixed worked tables and a cantilever support with a Y movement realized by movement of the working spindle in the machining head 46. It possible for the vacuum pods 26 to have vacuum drawn through the individual vacuum pods or through air supply rails of the work table and having solenoid valves that can open when suction cups are placed above. Other mechanical clamping devices may be used. The vacuum pods 26 are located with optimum positioning using the laser projector 84 system.

An example control console may be supplied by a CNi module with a display for displaying the X, Y, Z, A and C movement together with the program sequences and processing stages and other parameters, including water flow and time. Different processing and operating parameter tabs may be selected such as automatic, service, information, worklist, and execution. Feed rates, spindle speeds, RPM and programming configurations and parameters may be displayed. The different drive mechanisms and actuators for the machine 20 may be formed from different machine types, including shaft driven mechanisms and chain driven mechanisms.

Referring now to FIGS. 32-48, there are illustrated figures showing the bevel cutting using the slab processing machine 20 of the current invention. This bevel cutting process is also referred by some skilled in the art as "miter" cutting (FIGS. 32-38), which as a form of bevel cutting is used to form a farm sink 192 from the slab 24 (FIGS. 39-48) showing a completed farm sink at FIGS. 45-47. The slab processing machine 20 overcomes the drawbacks of prior art slab processing machines that cut stone or stone-line countertops using a "miter" cut, where the blade is angled at 45° to form a bevel cut. In these prior art systems, a stone slab may be polished completely on one side in pieces and then "strips" or "aprons" are cut from the slab. The main countertop has sides that are bevel cut at 45°, also termed "mitered" by some skilled in the art, and the strip/aprons are also cut at 45°, so that both sides can be glued together.

In a technique using a manually controlled bridge saw or handsaw, the operator has the ability to position a diamond circular saw blade at a 45° angle. The slab is cut with the slab or stone positioned on the concrete, wood or waterjet work table with the polished face of the slab facing upwards. The imperfect level of a substrate causes deviations in the measurement of bevel cuts. This technical problem is overcome with the slab processing machine 20 and process of the current invention. Also, the problems that occur where stone or engineered stone materials used for countertops do not have consistent thickness throughout, causing imperfections in measurements with bevel cuts, are overcome with the slab processing machine 20 of the current invention.

Prior art techniques had added at least about 15 minutes before each cutting cycle. Some error measurements were improved, but there were still imperfect measurements. For example, when the bevel was cut, the blade appeared to cut in a rise and fall manner because of the imperfect level of the work table and its gaps. Previous machine operators had tried to alleviate this problem by running the blade over the material and measuring with a tape measure to determine the variation on one side compared to the other side. One side, for example, could be shimmed up, e.g., a quarter inch, to be level with the other side. If the blade, however, had been cutting across the slab and lowering and rising as it moved, this changed the sideways measurement on the bevel cut and was unacceptable.

This problem became even more acute when manufacturing "farm sinks," where the interior shape of a sink hole for the farm sink is cut on a bevel at a 45° angle, i.e., the "miter" cut. This may be accomplished by hand, which takes about one hour, or accomplished with a water jet cutter, which takes about 9 inches per minute to cut, plus about 3 minutes per inch to clean off water jet scuff marks by hand before laminating/gluing the beveled edges of the farm sink. As a result, the slab cutting for a farm sink may take at least 1 to 2 hours to prepare the slab pieces for gluing. This was time consuming and difficult because the cutting occurred when the slabs were positioned finished face up, and that polished face up orientation imparted measurement errors and quality-of-cut issues, because most substrate surfaces of a work table have an unlevel or uneven work surface. The current slab processing machine 20 as described overcomes these difficulties in cutting, and also separates side corners of slab cuts.

The slab processing machine 20 as shown in FIGS. 32-37 has a stone or stone-like slab 24 positioned on the work table 78, in this example, a first work table 78*a*, with the finished face 24*a* of the slab down on the vacuum pods 26. The machining head 46 has at least one drive mechanism 100 connected thereto. The controller 56 is configured to drive the machining head 46 over the work table 78 in an X, Y, Z coordinate axis, and rotate the machining head for C-axis rotation and A-axis rotation. The machining head 46 mounts a circular saw blade 80 for respective cutting of the slab 24 with the finished face 24*a* of the slab down on vacuum pods 26. The controller 56 is connected to the machining head 46 and the at least one drive mechanism 100 and configured to operate the machining head to rotate the machining head on the A-axis and bevel cut the slab 24 while positioned upside down with the finished face 24*a* down on the vacuum pods 26. As noted above, the at least one drive mechanism 100 is shown generally in FIGS. 32 and 33, but it should be understood that the drive mechanism may encompass different motors, actuators, and other drive devices located at different portions of the machine 20, including different portions of the frame 28, bridge 36, carriage 38, and machining head 46.

Figure 35:
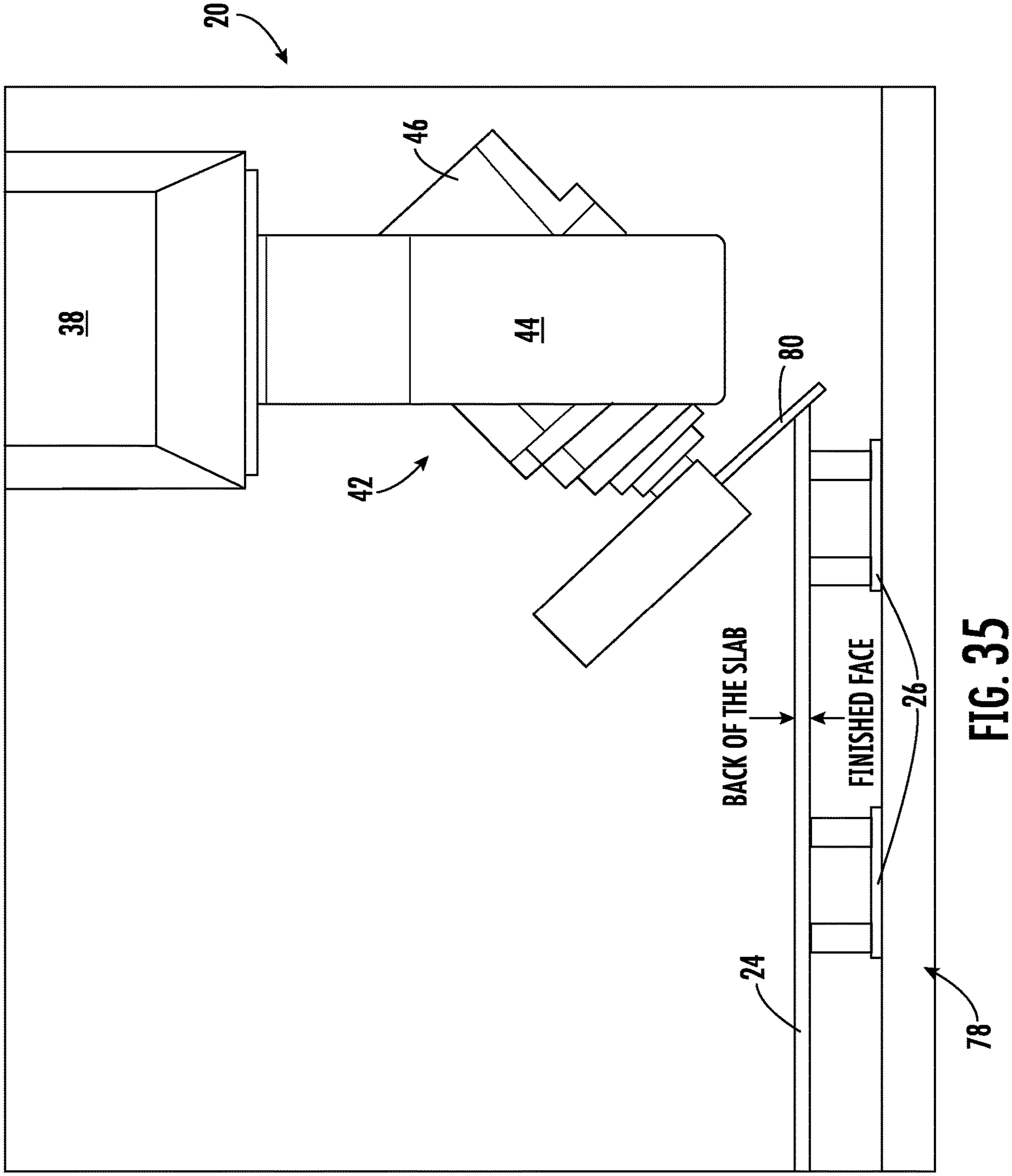
FIG. 35 is an enlarged, side elevation view of the machine of FIG. 33 showing the machining head rotated about the A-axis for bevel cutting.
Figure 36:
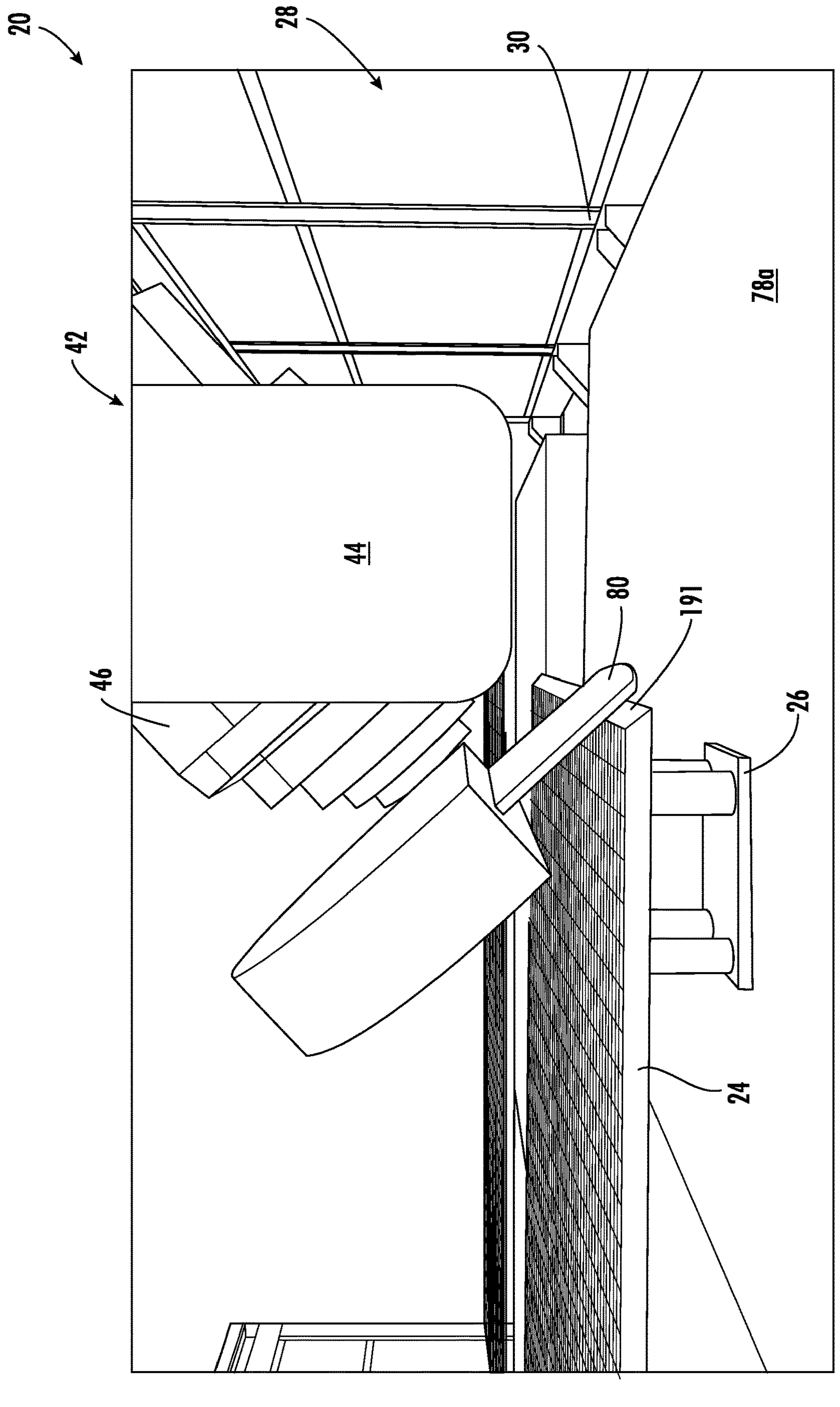
FIG. 36 is an enlarged, schematic, isometric view of the machine of FIG. 35 showing the upside down slab with its finished face down against the vacuum pods being bevel cut by the circular saw blade.

In the example best shown in FIGS. 33-36, the machining head 46 is rotated about 45° on the A-axis for bevel cutting at a 45° angle with the bevel cut edge shown at 191 most clearly in FIG. 36. In the example using the dual work tables 78*a*,78*b* shown in FIG. 32, the laser projector 84 is connected to the controller 56 and in an example, positioned such as on the roof or other support above the work tables. The controller 56 is configured to project a first slab cut layout from the laser projector 84 onto the work table 78*a* to aid in positioning the slab 24 upside down with the finished face 24*a* down on the vacuum pods 26 positioned on the work table, such as described above with reference to previous figures. The slab 24 may be oriented finished face 24*a* down based upon a first mirror imaged slab cut layout that is projected from the laser projector 84. The slab 24 may be oriented with the respective first mirror image slab cut layout that is based upon a slab cut layout on the finished face 24*a* of the slab 24.

As explained with reference to previous figures, the slab processing machine 20 includes a frame 28 having guide rails 32, a bridge 36 mounted for movement on the guide rails over the work table 78 along an X and Y coordinate axis, and a carriage 38 mounted on the bridge 36 and configured for vertical movement along a Z coordinate axis. The machining head 46 is supported at a lower end of the carriage 38 as illustrated. A machine yoke 42 (FIG. 37) is rotatably mounted at the lower end of the carriage 38 and configured for C-axis rotation. The machine yoke 42 includes opposing support arms 44 and the machining head 46 is rotatably mounted between the support arms and configured for A-axis rotation for bevel cutting. The machining head 46 is configured to mount the circular saw blade 80, a finger bit 52, a milling wheel 194 (FIGS. 49 and 51-54), or at least one finishing tool 53 for respective cutting, routing, milling, or finishing of the stone or stone-like slabs 24 positioned on vacuum pods 26 upside down with the finished face 24*a* down. Some of these tools as finger bit 52, milling wheel 194, and finishing tool 53 may be stored in the tool rack 53*c* to allow automatic access into and from the machining head 46.

Figure 38:
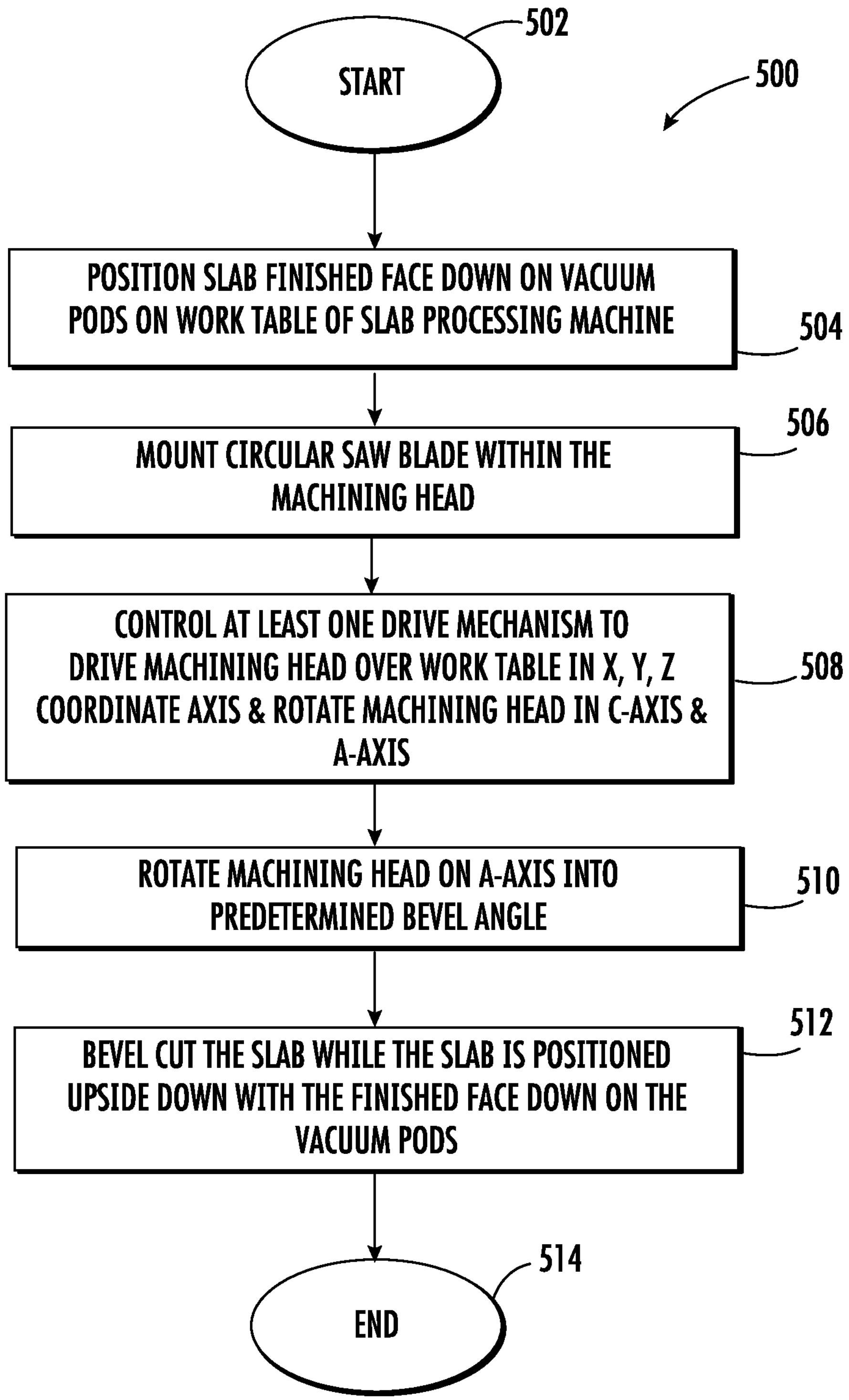
FIG. 38 is a high-level flow sequence showing the method of bevel cutting a slab positioned on the work table with a finished face of the slab down on vacuum pods of FIGS. 32-38.

Referring now to FIG. 38, there is illustrated generally at 500 a high-level flow sequence of a method of operating the slab processing machine 20 having the work table 78, machining head 46, at least one drive mechanism 100 connected thereto, and the controller 56 connected to the at least one drive mechanism. The process starts (Block 502). The slab 24 is positioned with the finished face 24*a* down on vacuum pods 26 on the work table 78 of the slab processing machine 20 (Block 504). The circular saw blade 80 is mounted within the machining head 46 (Block 506). The drive mechanism 100 is controlled to drive the machining head 46 over the work table 78 in an X, Y and Z coordinate axis and rotate the machining head in the C-axis and A-axis (Block 508). The machining head 46 is rotated on the A-axis into a predetermined bevel angle (Block 510). The slab 24 is bevel cut while the slab is positioned upside down with the finished face 24*a* down on the vacuum pods 26 (Block 512). The process ends (Block 514).

Figure 37:
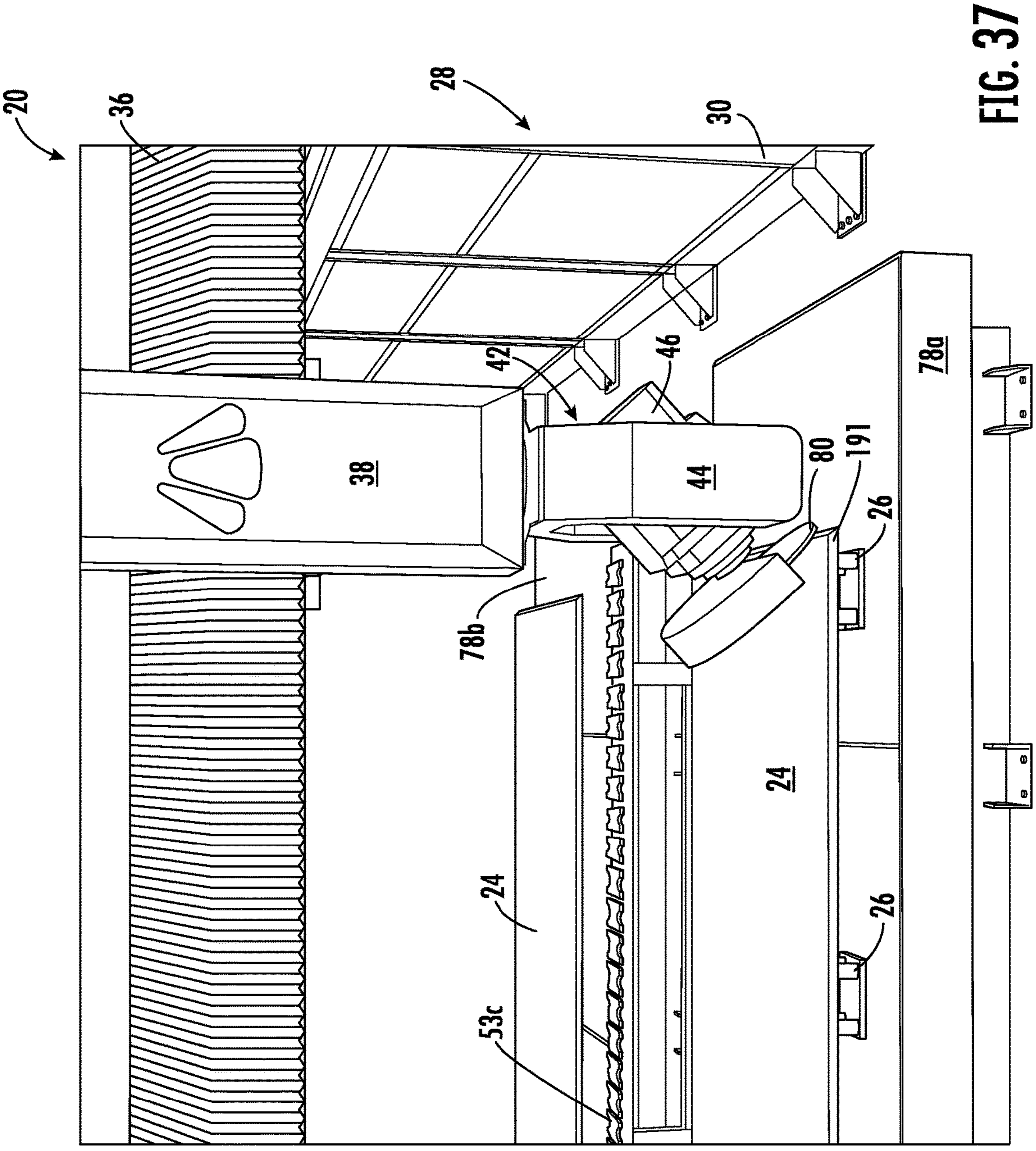
FIG. 37 is another enlarged schematic, isometric view of the machine similar to that of FIG. 36 showing the upside down slab with its finished face down against the vacuum pods being bevel cut using the circular saw blade.

As shown in FIGS. 35-37, details of the "miter" cut are illustrated with the circular saw blade 80 at about a 45° angle and cutting the bevel to form the beveled cut edge 191. As shown, the vacuum pods 26 have elevated the slab 24 about six inches in this example so that the blade 80 is not cutting into any substrate as in prior art techniques, thus permitting 100% accurate miter or bevel cuts, and allowing tighter "nesting" on layouts as the blade can plunge lower past the bottom surface of the material as the blade is cutting in the air, as opposed to cutting over the substrate in prior machines where the blade can only plunge below about ⅛th inch maximum. Also, separation is achieved that had heretofore only been accomplished with a costly water jet machine.

The slab processing machine 20 overcomes the technical problems associated with manufacturing "farm sinks" having the beveled sink hole at an example 45° angle, i.e., the "miter" cut as called by some skilled in the art. This cutting has been accomplished by hand in the past, which takes about one hour, or accomplished with a waterjet cutter machine, which takes about 9 inches per minute to cut, plus about 3 minutes per inch to clean off waterjet scuff marks by hand before laminating and gluing the beveled edges of the farm sink with the cut side pieces from the slab.

As a result, the prior art slab cutting for a farm sink may take at least about 1-2 hours to prepare the slab pieces for gluing. This is also time consuming and difficult because the cutting occurs on the prior art machines where the slab has its finished face up, and that polished face up orientation imparts measurement accuracy and quality of cut issues because most substrate surfaces of a work table have an uneven and unlevel surface, also making it difficult to cut and separate side corners of the cut slab.

Employing the "miter" or bevel cut on a slab 24 that is positioned upside down with its finished face 24*a* against the vacuum pods 26 positioned on the work table 78 permits cutting the "miter" or bevel at speeds faster than the industry standard speed. The slab processing machine 20 also allows tighter nesting on layouts because the blade 80 can plunge lower, past the polished or finished surface 24*a* of the slab 24 that is facing down. The blade 80 is cutting in the air when it cuts through since the slab is polished face 24*a* down on the vacuum pods 26, as opposed to cutting over a substrate used as a work surface, where the blade can only plunge below ⅛th inch maximum as in prior art machines and processes. The slab processing machine 20 avoids the requirement for continued maintenance of the work substrate, e.g., the cutting table, because cutting occurs in the air and the work table 78 of the current machine 20 is not constantly cut or impacted by the cutting blade. The slab processing machine 20 also allows the manufacture of farm sinks 192 to be faster than other prior art processes in the industry. The slab processing machine 20 achieves separation, which has previously been accomplished by a costly waterjet machine, and cuts cleanly with a diamond circular saw blade, which is ten times faster.

In an example, the slab processing machine 20 cuts upside down on the elevated vacuum pods 26 that are about six inches in the air, and in an example, cuts with a diamond circular saw blade 80 at a rate of about 100 inches per minute, which is about 10 times faster than a waterjet cutting machine that waterjet cuts the same type of slab. Use of the slab processing machine 20 also avoids the wasted waterjet cleanup time, in an example, saving about 30 minutes per farm sink 192. An additional benefit is the slab processing machine 20 may overcut in the corners to gain separation due to cutting the finished face 24*a* of the slab 24 down on the vacuum pods 26, which has not been accomplished before. Thus, the slab processing machine 20 may cut the farm sink 192 in close to 5-7 minutes with proper separation, and no cleanup is required before lamination/gluing.

Figure 39:
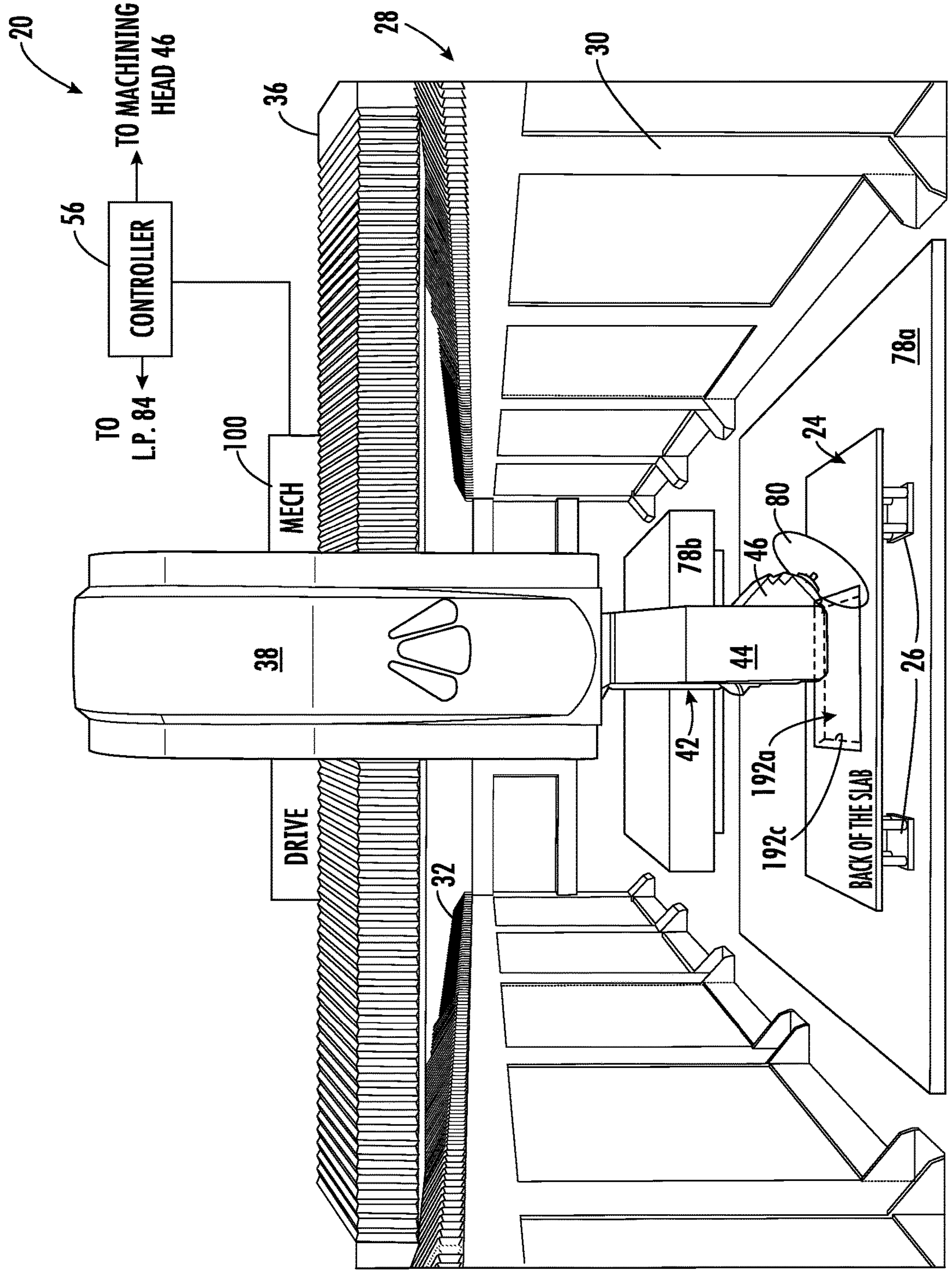
FIG. 39 is a schematic, isometric view of the slab processing machine cutting a sink hole for a farm sink.
Figure 40:
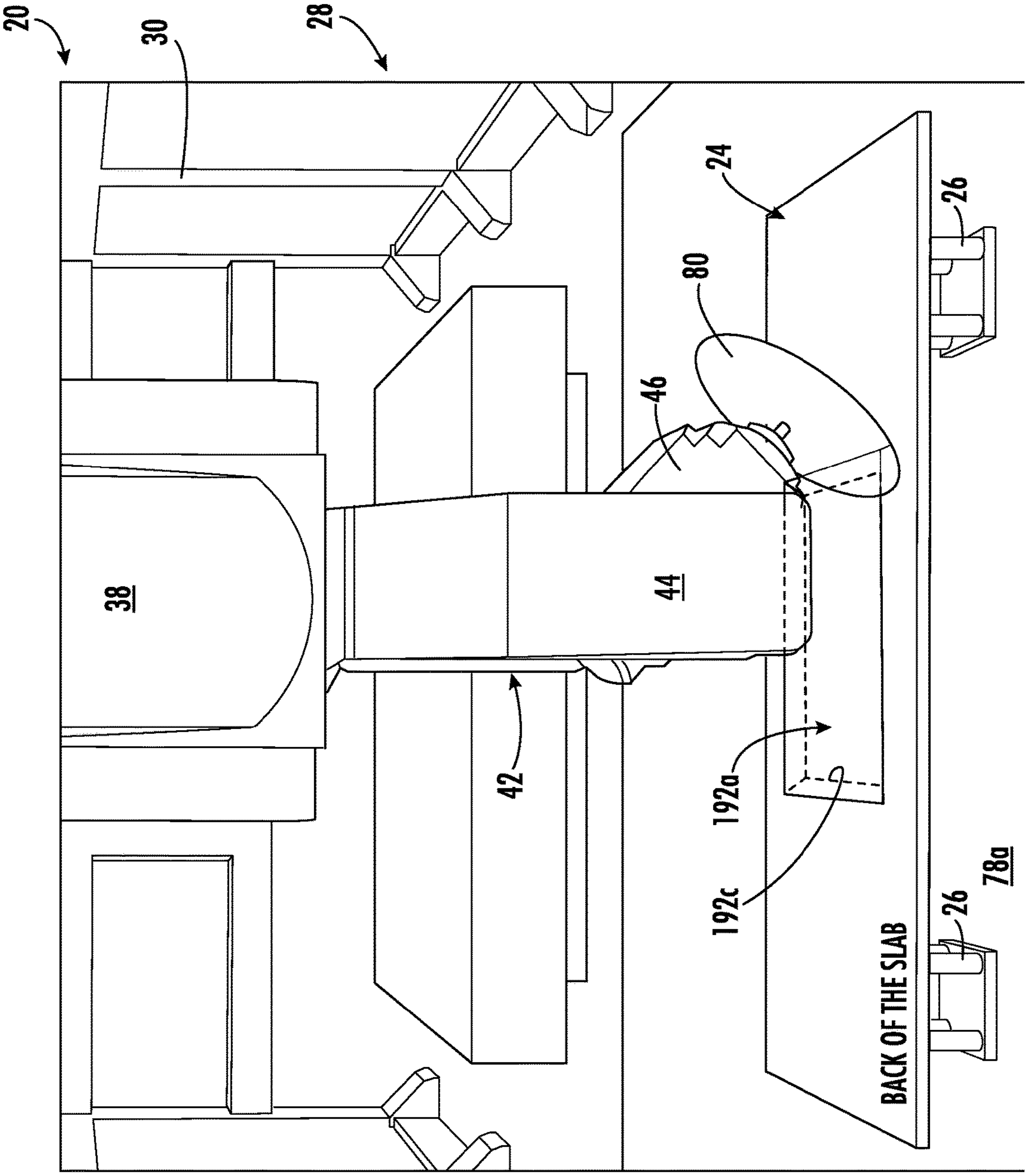
FIG. 40 is an enlarged schematic, isometric view of the machine of FIG. 39 showing the sink hole being bevel cut.
Figure 41:
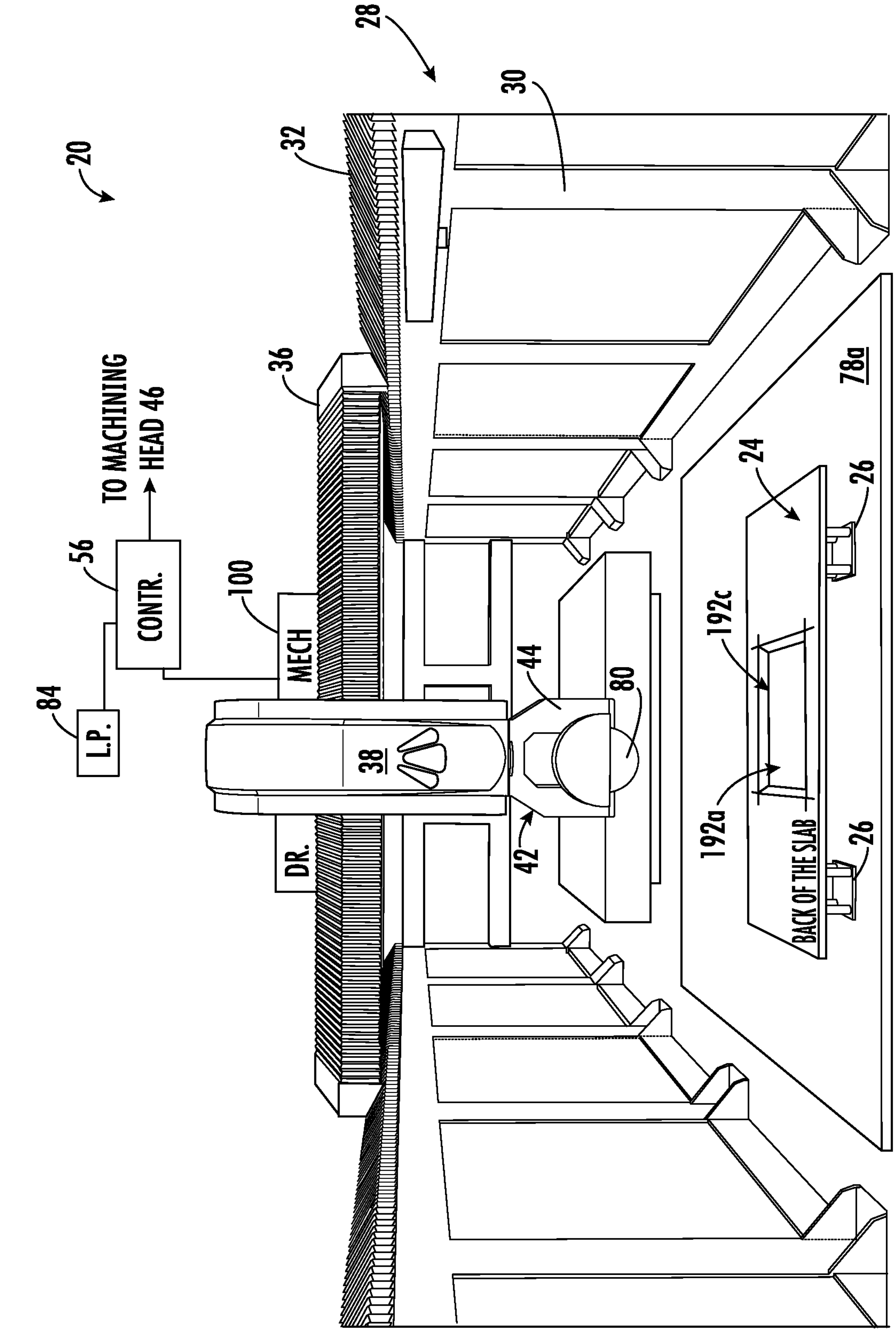
FIG. 41 is another schematic, isometric view of the machine in FIG. 39 showing the completed bevel cut sink hole.
Figure 42:
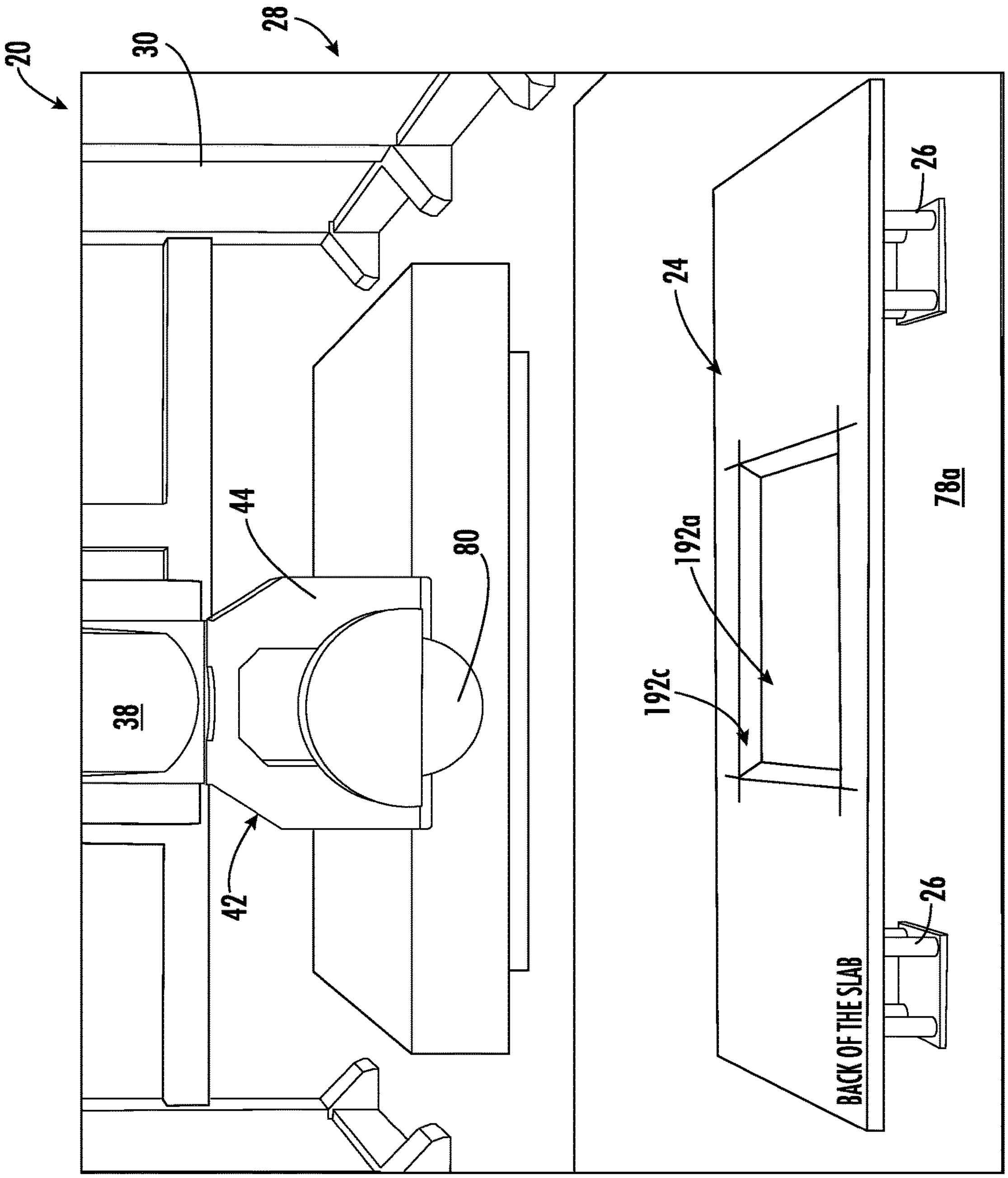
FIG. 42 is an enlarged schematic, isometric view of the machine of FIG. 41 showing the completed bevel cut sink hole.

As shown in FIG. 39, the current slab processing machine 20 includes the work table 78, the machining head 46, and at least one drive mechanism 100 connected thereto and configured to drive the machining head over the work table in an X, Y, Z coordinate axis and rotate the machining head for C-axis rotation and A-axis rotation. As noted before, the drive mechanism 100 may encompass different motors, actuators, and other drive devices located at different portions of the slab processing machine 20. The machining head 46 is configured to mount the circular saw blade 80 for respective cutting of the stone or stone-like slab 24 positioned on the work table 78 with the finished face 24*a* of the slab down on the vacuum pods 26. The controller 56 is connected to the machining head 46 and at least one drive mechanism 100 and configured to operate the machining head and rotate the machining head on the A-axis and bevel cut in the slab 24 a sink hole 192*a* (FIGS. 39-43) for a farm sink 192 while the slab is positioned upside down with the finished face 24*a* down on the vacuum pods 26.

Figure 43:
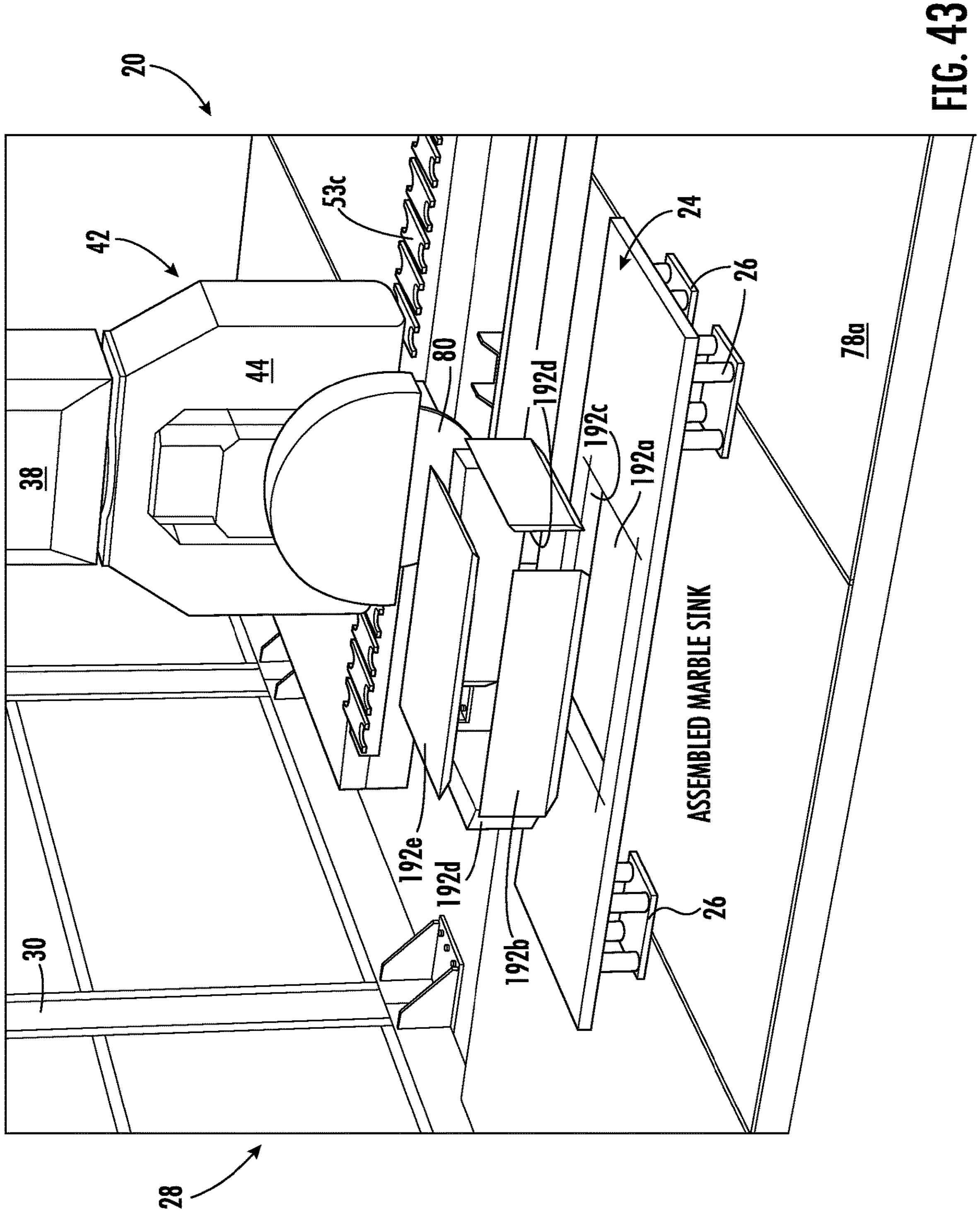
FIG. 43 is an enlarged schematic, isometric view of the machine of FIG. 39 showing the bevel cut slab pieces that will be glued together at the bevel cut sink hole to form the farm sink.
Figure 44:
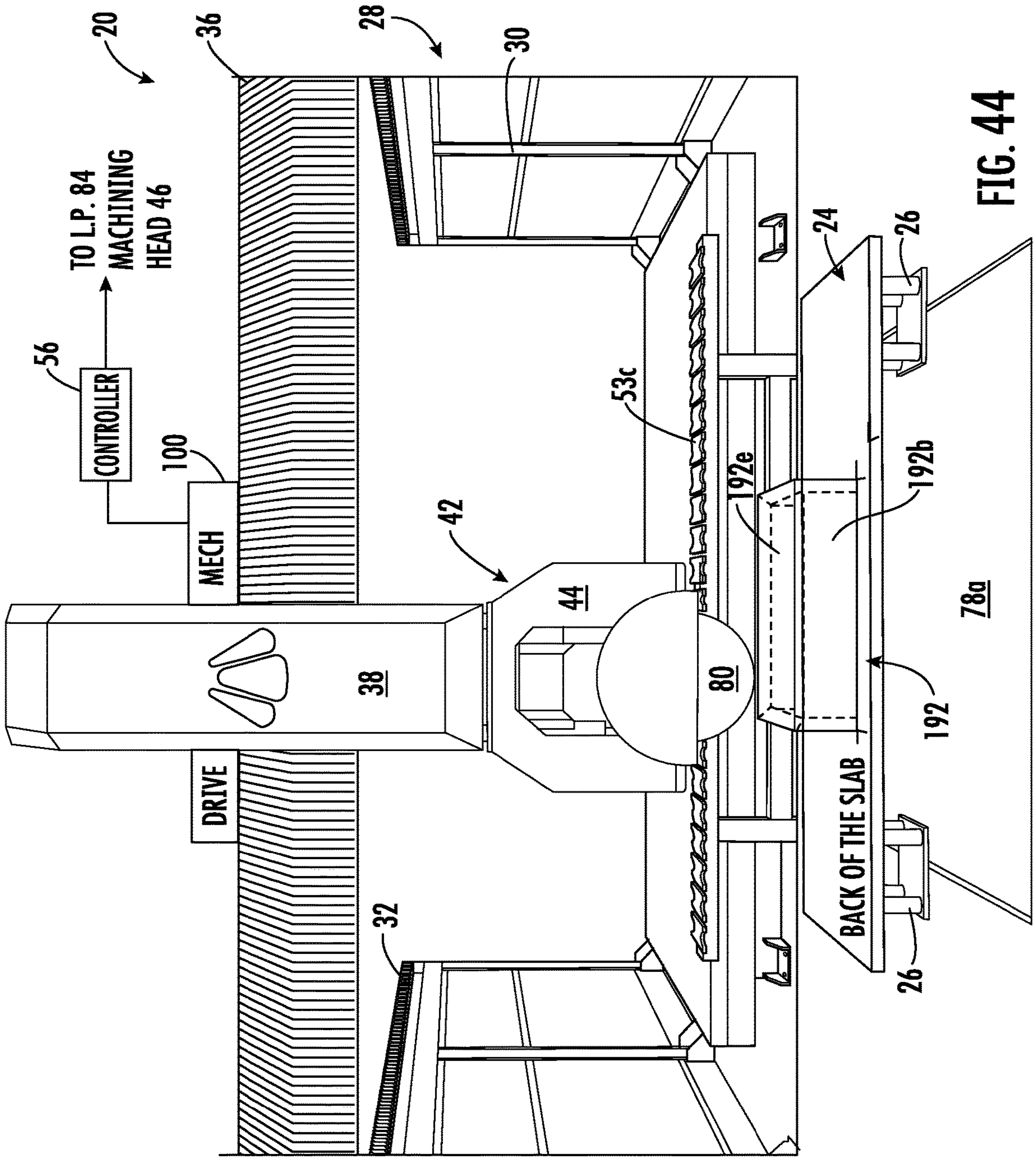
FIG. 44 is another schematic, isometric view of the machine of FIG. 39 showing the completed farm sink with the finished face of the slab down against the vacuum pods.
Figure 45:
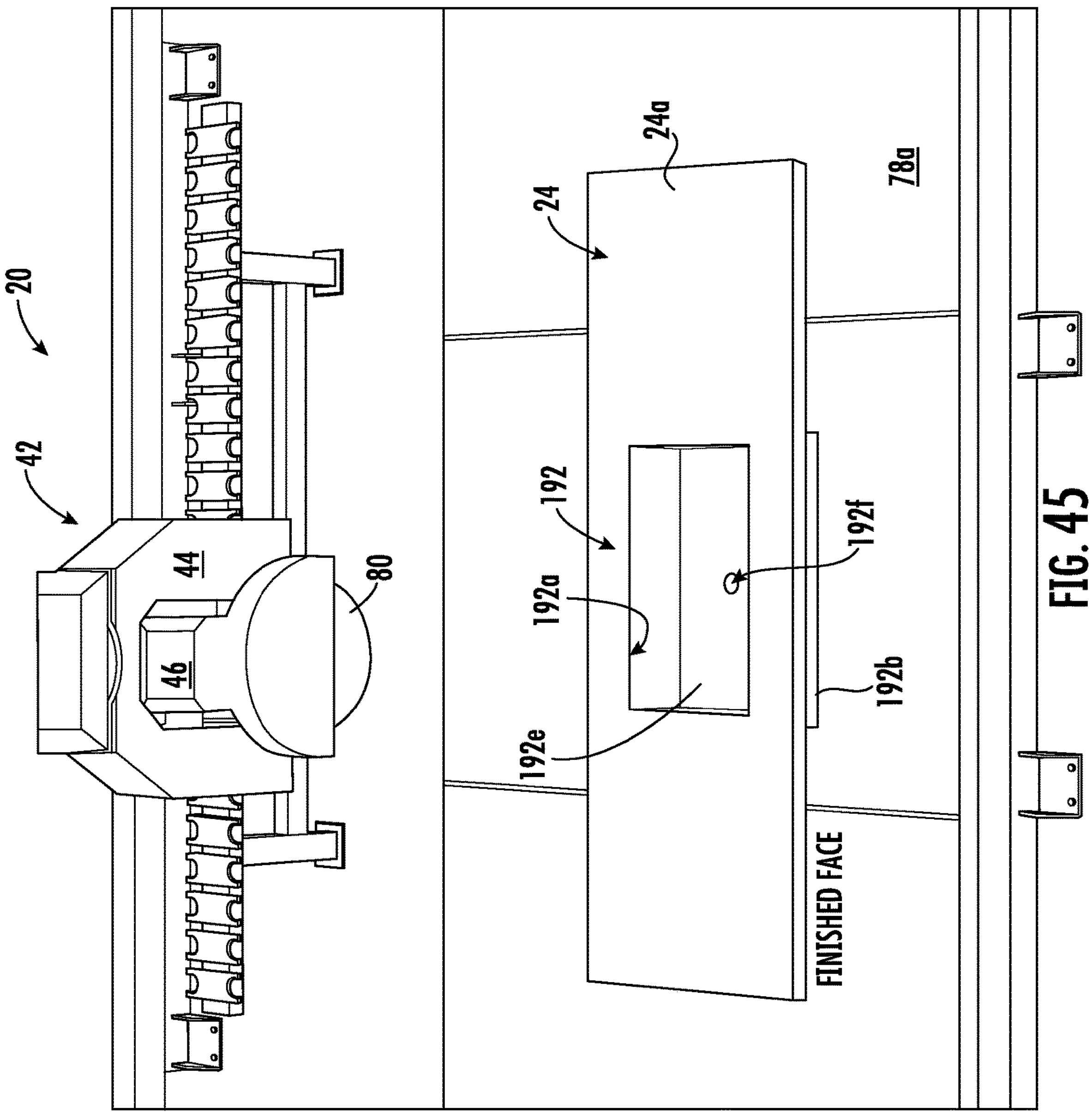
FIG. 45 is a top isometric view of the machine of FIG. 39 showing the completed farm sink and the finished face reversed to face up.
Figure 46:
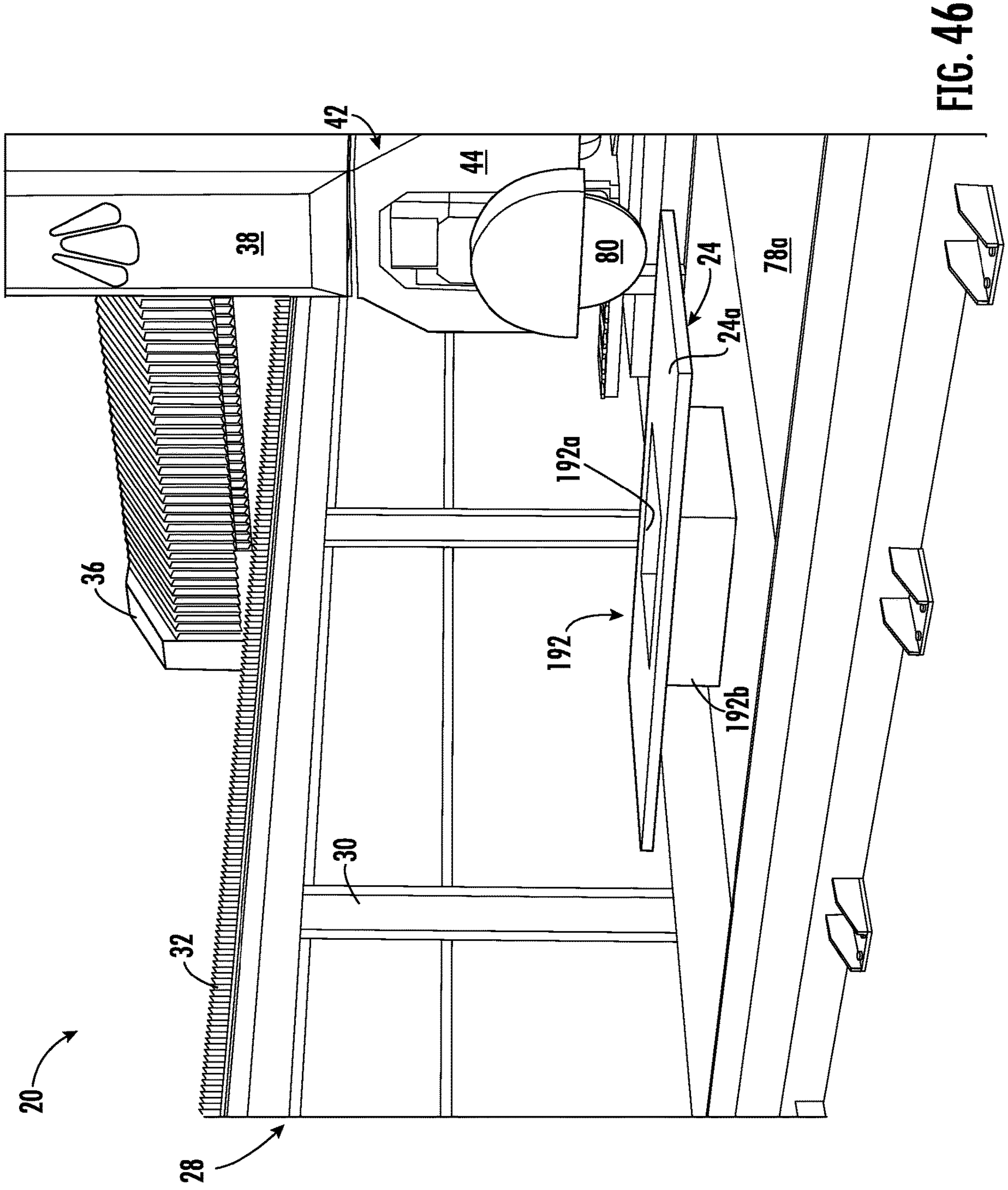
FIG. 46 is another schematic, isometric view of the machine of FIG. 45 showing the completed farm sink.

The controller 56 is configured to operate the machining head 46 to bevel ("miter") cut pieces from the slab 24 that form the side pieces 192*b* of the farm sink 192 and are configured in geometry to be adhered at an inside bevel cut edge 192*c* of the sink hole 192*a*. Each side piece 192*b* also has its own bevel cut edge 192*d* and the respective bevel cut edges may be adhered to each other as shown in FIG. 43, forming the sides of the assembled farm sink 192 as shown in FIGS. 44, 45 and 46. The slab piece 192*e* remaining from the bevel cut sink hole 192*a* may be configured in size to be adhered to the lower bevel cut edges 192*d* of the bevel cut side pieces 192*b*, forming the bottom of the farm sink 192. The finished face 24*a* of that piece is exposed to view as the bottom of the farm sink 192, which corresponds to the finish that the installer and subsequent user of the farm sink 192 would want to see. The finished face of the side pieces 192*b* are also exposed to view in the assembled farm sink 192.

During bevel cutting, the machining head 46 may be rotated about 45° on the A-axis for bevel cutting and the laser projector 84 used to project a first slab cut layout from the laser projector onto the work table 78 to aid in positioning the slab 24 upside down with the finished face 24*a* down on vacuum pods 26 positioned on the work table. This positioning also may include orienting the slab 24 finished face 24*a* down based upon a first mirror imaged slab cut layout that is projected from the laser projector 84 and orienting the slab on the work table 78 with the respective first mirror image slab cut layout that is based upon a slab cut layout on the finished face of the slab. The machining head 46 is configured to mount the circular saw blade 80, a finger bit 52, a milling wheel 194, or at least one finishing tool 53 for respective cutting, routing, milling or finishing of stone or stone-like slabs 24 positioned on the vacuum pods 26 upside down with the finished face 24*a* down. The tool rack 53*c* may store these tools. The slab processing machine 20 includes the bridge 36, carriage 38, and other components as explained before relative to FIGS. 32-37.

Figure 47:
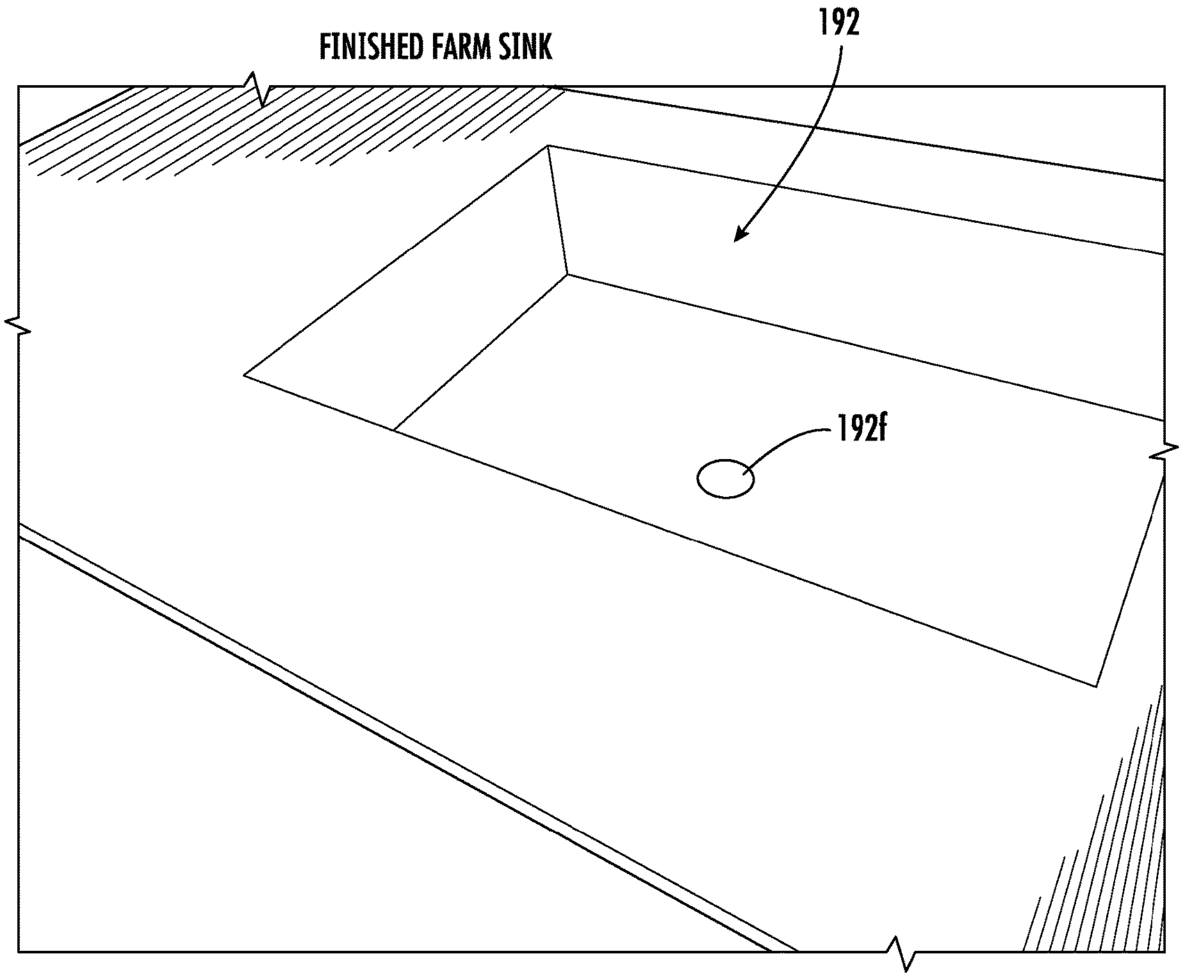
FIG. 47 is an image of a completed farm sink and slab set in place on a cabinet.

As shown in FIG. 45, the completed farm sink 192 includes the slab 24 with its finished face 24*a* up and the farm sink formed from the side slab pieces 192*b* that may have been cut preferably from the same slab to ensure an appearance match with vein and grain matching on the slab. A finger bit router 52 may be used to drill or route the drain hole 192*f* as shown in FIG. 45. Various edges may be polished or buffed to form the finished farm sink 192 as shown in FIGS. 46 and 47, with the farm sink shown installed on a cabinet in FIG. 47.

Figure 48:
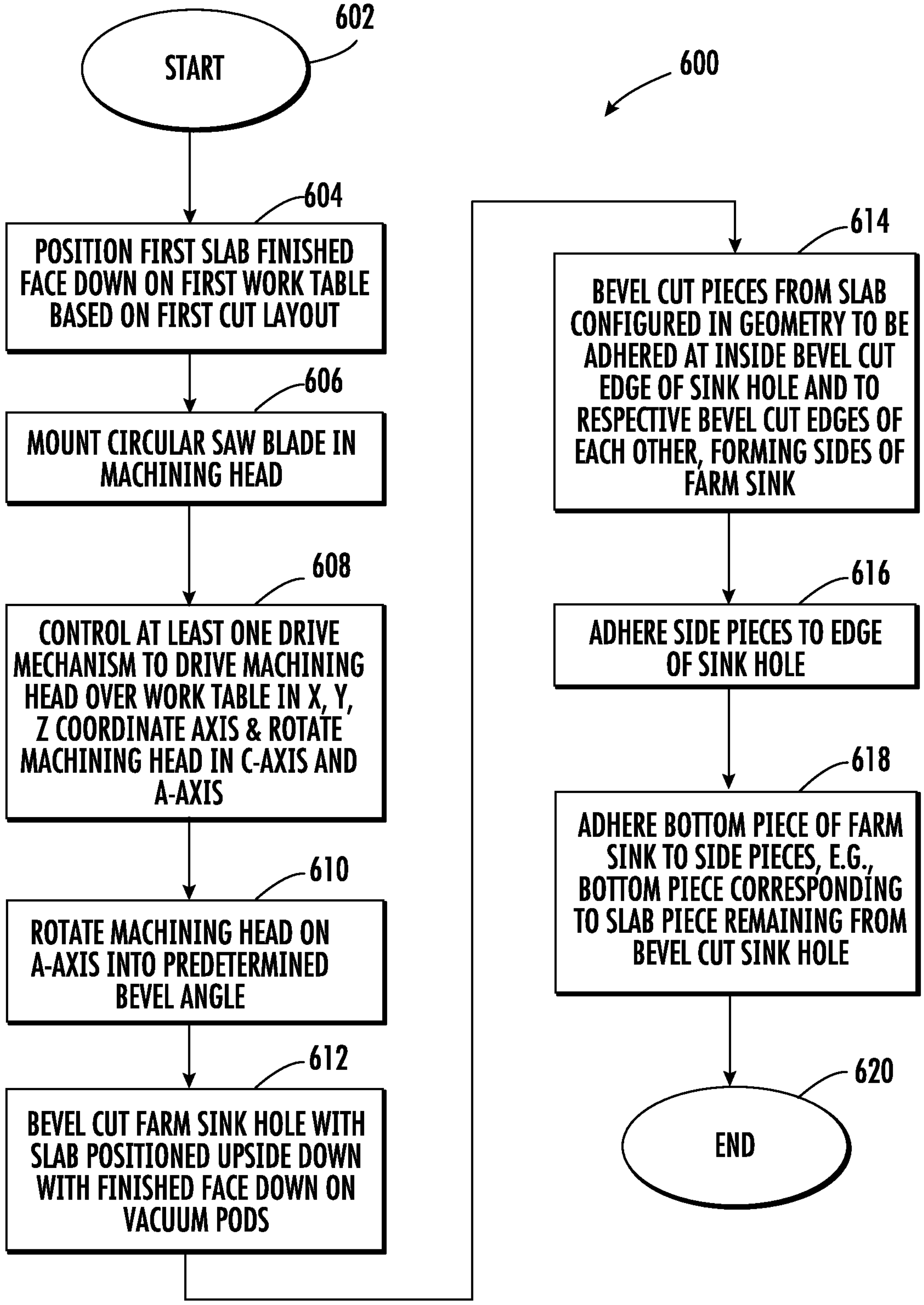
FIG. 48 is a high-level flow sequence showing the making of the farm sink of FIGS. 39-47.

Referring now to FIG. 48, there is illustrated generally at 600 a flow sequence for manufacturing the farm sink 192 in accordance with a non-limiting example. The process starts (Block 602) and a slab 24 is positioned face down on the work table 78 with its finished face 24*a* on the vacuum pods 26 with positioning in this example based on a first cut layout. A circular saw blade 80 is mounted in the machining head 46 (Block 606). At least one drive mechanism 100 is controlled to drive the machining head 46 over the work table 78 in an X, Y, Z coordinate axis and rotate the machining head in the C-axis and A-axis (Block 608). The machining head 46 is rotated on the A-axis into a predetermined bevel angle (Block 610). The slab 24 is bevel cut to form the sink hole 192*a* for the farm sink 192 with the slab 24 positioned upside down with the finished face 24*a* down on the vacuum pods 26 (Block 612). The beveled cut side pieces 192*b* cut from the slab 24 are configured in geometry to be adhered at the inside bevel cut edge 192*c* of the sink hole 192*a* and to respective bevel cut edges 192*d* of each other forming the sides of the farm sink 192 (Block 614). The side pieces 192*b* are adhered to the inside bevel cut edge 192*c* of the sink hole 192*a* (Block 616). The bottom piece 192*e* having bevel cut edges of the farm sink 192 is adhered to the side pieces 192*b*. The bottom piece 192*e* may correspond to a slab piece remaining from the beveled cut sink hole 192*a* in this example (Block 618). The process ends (Block 620).

When manufacturing a farm sink 192 with the slab processing machine 20 using the elevated vacuum pods 26 about six inches in the air, it is possible to cut with a diamond circular saw blade 80 at a rate of about 100 inches per minute, and thus, about 10 times faster than a waterjet cutting machine used for cutting slabs, and there is no wasted waterjet cleanup time. This saves in an example about 30 minutes processing time per farm sink 192. Also, it is possible to overcut in the corners to gain separation. This has not been accomplished before in the slab processing industry. Thus, the farm sink 192 may be cut in close to 5-7 minutes with separation, and no cleanup, before going to the lamination/gluing step.

The adhesive as applied is a quick drying adhesive and typically an epoxy adhesive or "akemi" that dries in about 10 minutes in a non-limiting example. While the assembled farm sink 192 has its adhesive drying as shown in FIG. 44, the machining head 46 may be moved to a second work table 78*b* to allow processing of another slab. Although the slab side pieces 192*b* are preferably cut from the same slab, they may be provided beforehand as cut from a different slab or cut from the same slab piece with the circular saw blade 80.

As shown in FIGS. 49-55, the slab processing machine 20 overcomes the issues that arise when the appearance of a thicker slab section is desired, for example, as used for countertops. There are normally two main choices commercially for selected slab thicknesses, i.e., 2 centimeter slabs, corresponding to about 0.75 inch slabs, or 3 centimeter slabs, corresponding to about 1.25 inches thick slabs. To enhance appearance of the finished slab in a countertop and make the slab appear thicker, sometimes strips of about 1.5 inches to about 3.0 inches wide are cut from the slab and glued to the outer side edge areas of the slab, corresponding to the finished geometrical shape of the slab. This slab fabrication process is also referred to as "laminating" to build-up the outer edge of the slab countertop or other slab piece. The slab cutting with prior art machines usually occurs using a bridge or CNC saw or CNC saw jet, especially in those slab sections where there will be edge detail in a finished slab piece, such as a countertop. This prior art slab cutting process is usually accomplished with 2 (two) centimeter thickness slab material, but it can also be accomplished with 3 (three) centimeter thickness slab material. For example, a 2 centimeter slab may be laminated at its edges with strips to become a 4 centimeter slab at its outer slab edge, making the finished countertop to appear thicker overall once that countertop is installed in a kitchen or other area.

Currently, this slab cutting process is mostly done in the industry by cutting slab pieces into countertop shapes with a handsaw, bridge saw, saw jet robot, or bridge saw jet. The cut slab pieces are removed from a portion of the prior art work table where they were cut and moved to another section of the work table, or another work table altogether, where pieces are manually laid upside down. Using an angle grinder, a worker mills the rough side of the strips and that area of the slab where the lamination strip will be glued to perform the "build-up" of the slab edge and ensure the surfaces are smooth and flat when they are glued together. This previous cutting process created much dust, and the process was slow because it was done by hand. The cut strips were glued onto the slab side edge portions and allowed to dry. Common "akemi" or epoxy glue was typically used for the adhesive. The pieces were glued tight so as not to leave a visible seam where pieces meet when the edge detail is done. This prior art process was not advantageous since so much of the process was accomplished by hand.

After the glued pieces were dry, the slab with its adhered edge strips was flipped over and the edge was usually profiled by hand, and then polished by hand. It was cumbersome to place those slab pieces on a CNC router or other machine. The same process may have been accomplished with the thicker slab to build-up its edge. That process was slower because that thicker edge was much thicker than the average edge, and as a result, feed rates when cutting the thicker slab were slower on the CNC machines. These build-ups were done by hand using a manual worker after the slab came off the bridge saw, corresponding to "step 1" when cutting the basic custom kitchen countertop.

Figure 49:
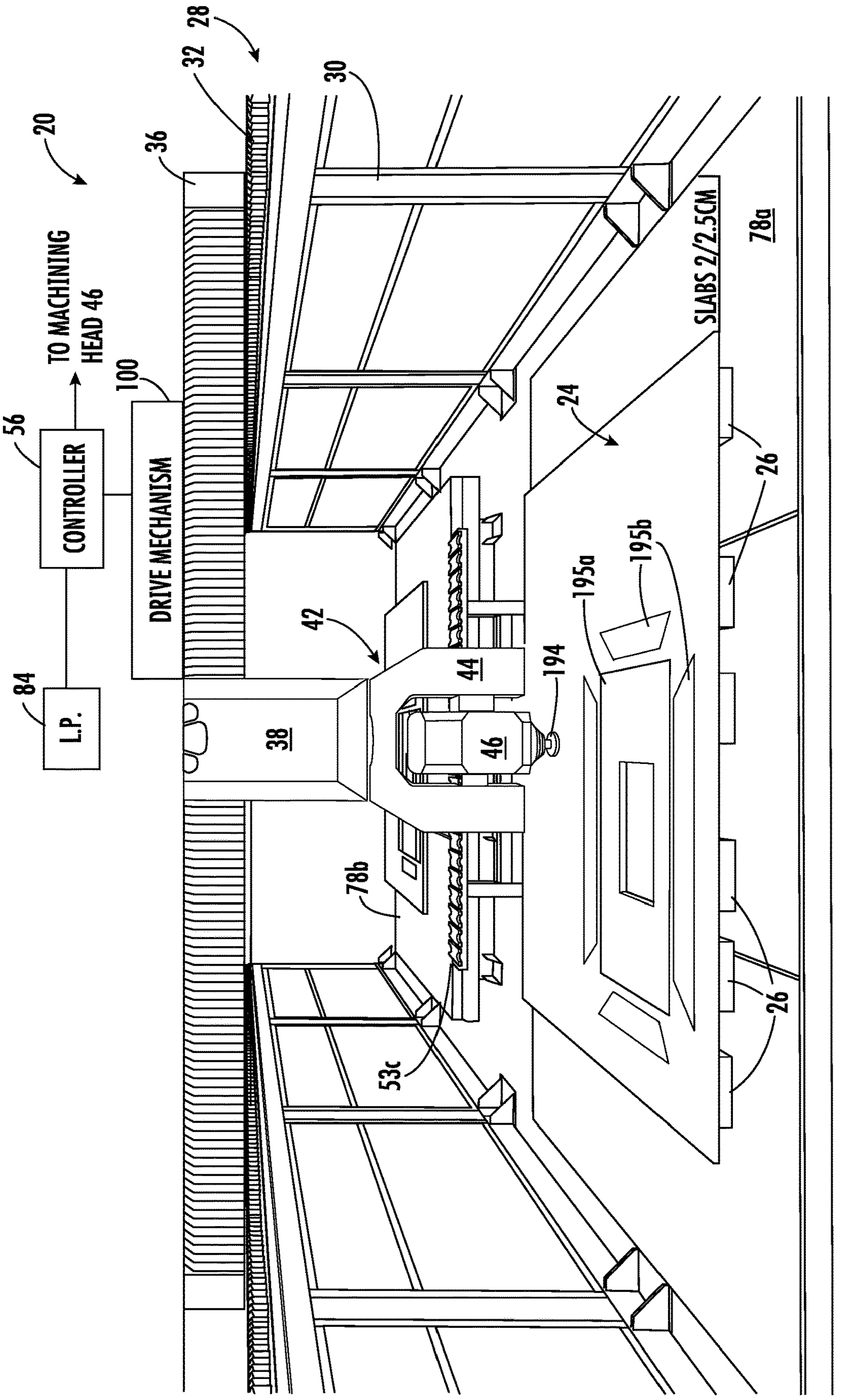
FIG. 49 is a schematic, isometric view of the slab processing machine showing the slab upside down with its finished face down against the vacuum pods and showing the areas of the back side of the slab that had been milled corresponding to the side edge areas of a finished geometrical shape of the slab and lamination strips.

As shown in FIG. 49, in accordance with a non-limiting example using the slab processing machine 20, the slab 24 is positioned upside down with the finished face 24*a* down on the vacuum pods 26 on the first work table 78*a* in this example, showing in FIG. 49 a dual work table slab processing machine 20. A milling wheel 194 has been inserted within the machining head 46. The laser projector 84 projects a lay out of the slab 24 that allows the slab to be positioned correctly on the work table 78*a* in the process as explained before. The controller 56 is connected to the laser projector 84, the machining head 46, and at least one drive mechanism 100 to operate the machining head and mill the side edge sections 195*a* of the upper rough side of the slab corresponding to the edges of a finished slab piece in configuration that will be laminated. The slab 24 is positioned upside down on the vacuum pods 26 on the work table 78*a* and the rough side used for the underside of the final countertop is facing up with finished face 24*a* down against the vacuum pods 26. The milling occurs with the milling wheel 194 received within the machining head 46. The milled sections correspond not only to the side edge sections 195*a* of the finished cut slab, but also to lamination strips 195*b* that are configured in geometry that when cut will be used to build up the side edged sections 195*a* of the finished cut slab.

Figure 50:
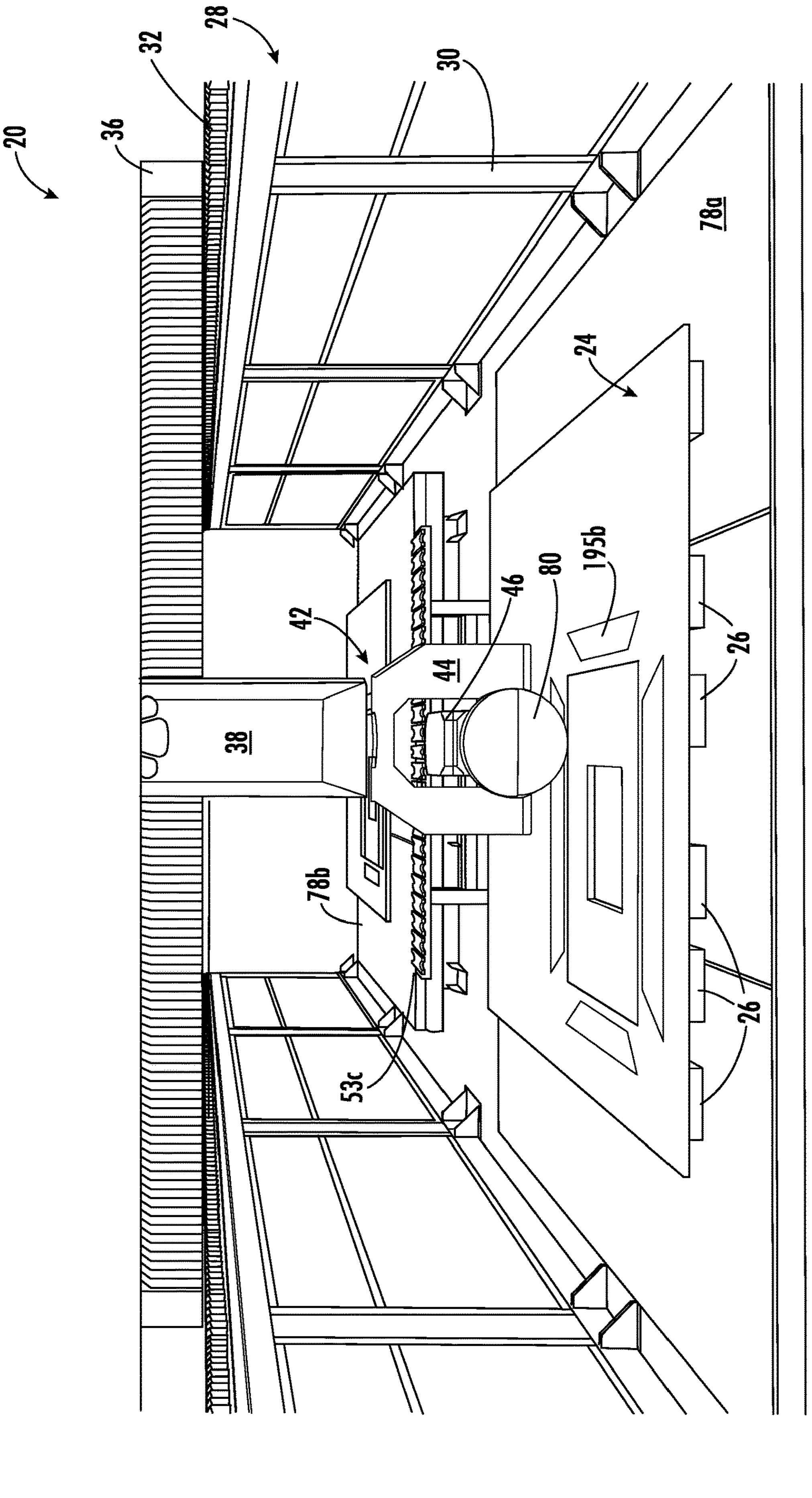
FIG. 50 is a schematic, isometric view of the machine of FIG. 49 showing the lamination strips to be cut from the slab.

After milling as shown in the example of FIG. 49, while maintaining the slab 24 upside down with the finished face 24*a* down on the vacuum pods 26, the slab may be cut using the circular saw blade 80 that has been switched out and received within the machining head 46. The slab 24 is cut into a final geometrical form for the finished cut slab and into the lamination strips 195*b* as shown in FIG. 50, and in FIG. 51, where the cut pieces are supported preferably on either the vacuum pods 26 or other supports. The vacuum pods 26 are preferred to limit movement at this point. As shown, the lamination strips 195*b* include angled or miter cuts so that when reversed or turned upside down and adhered to the milled side edge areas 195*a*, they tightly nest with each other at the corners.

Figure 51:
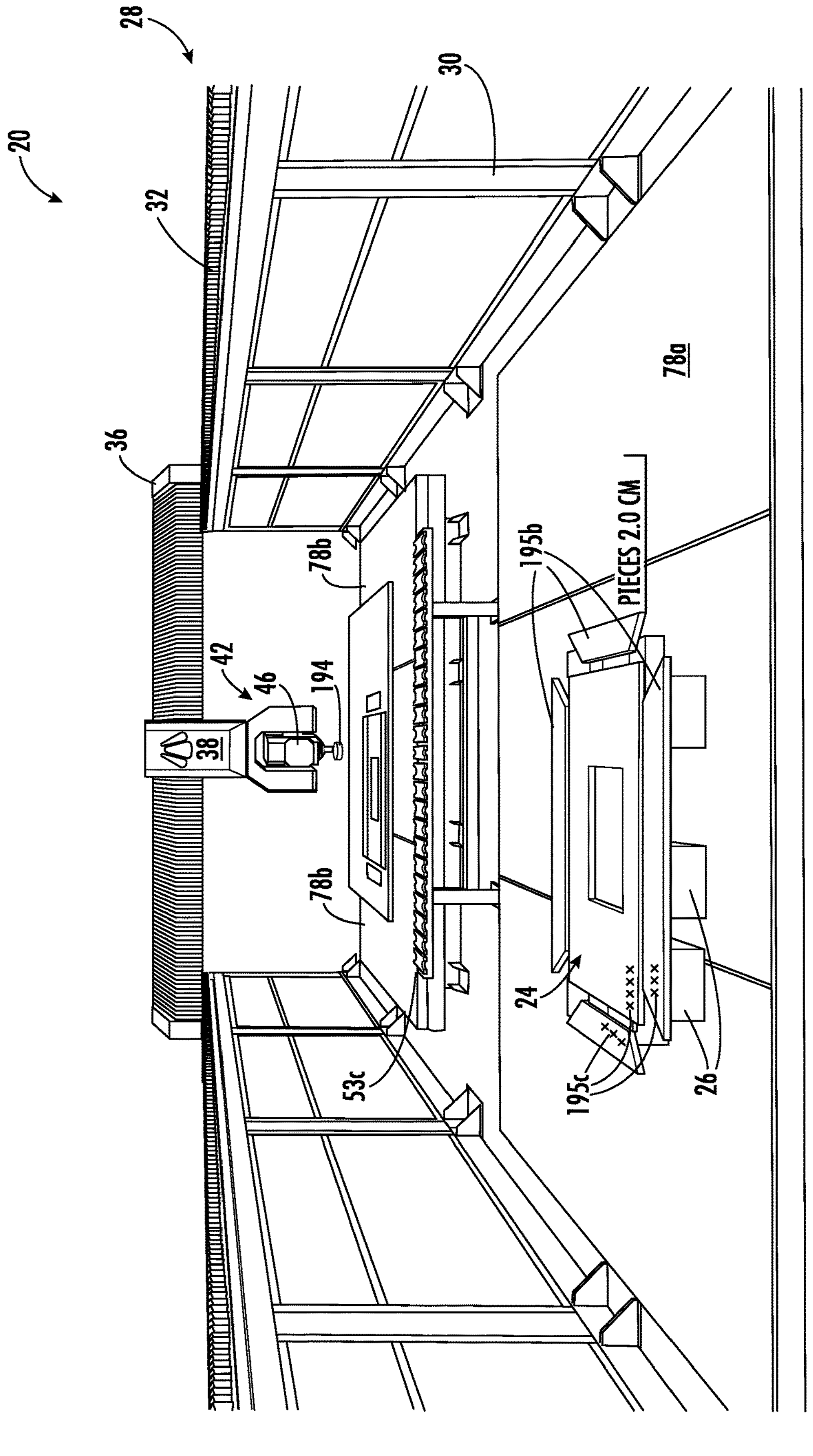
FIG. 51 is a schematic, isometric view of the machine of FIG. 50 showing the lamination strips cut and separated from the slab and waiting to be laminated to the side edge areas of the finished geometrical shape of the slab.
Figure 52:
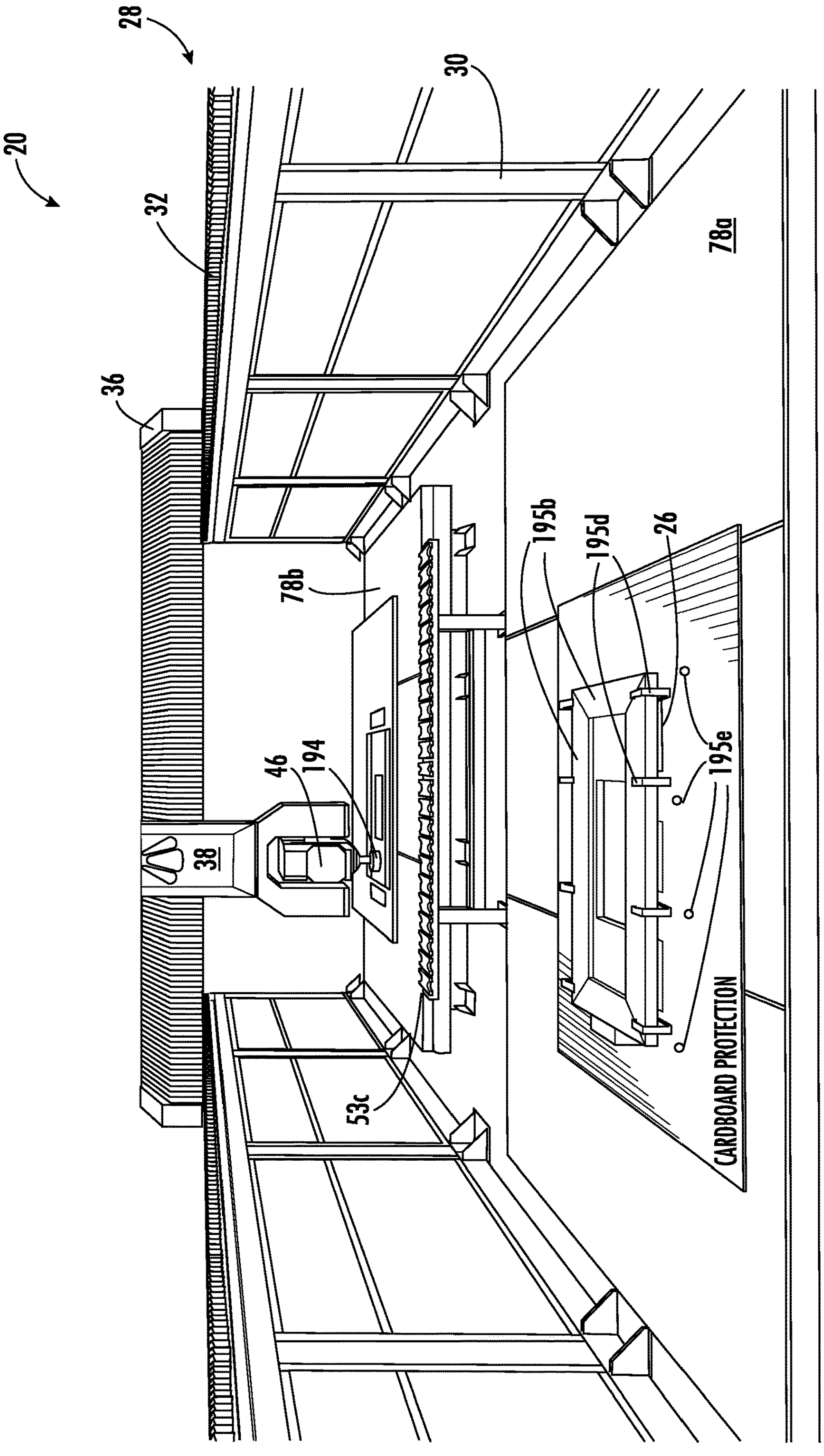
FIG. 52 is a schematic, isometric view of the machine of FIG. 51 showing the lamination strips adhered onto the side edge areas of the slab and retained by C-clamps and cardboard used to protect any adhesive that may fall.
Figure 53:
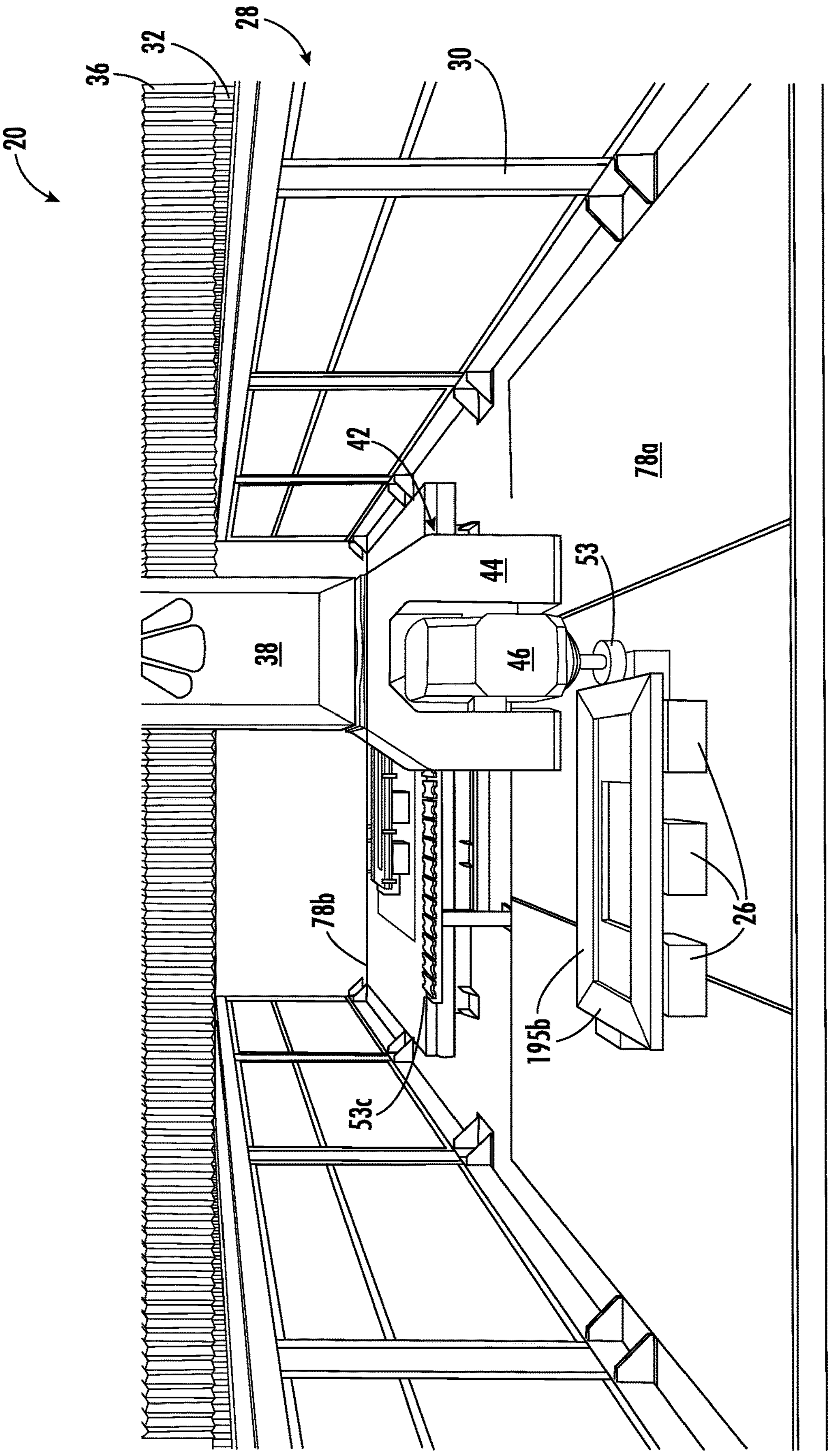
FIG. 53 is a schematic, isometric view of the machine of FIG. 52 showing edge finishing of the completed slab having the adhered lamination strips.

The controller 56 pauses operation of the machining head 46 after cutting the slab 24 into its final geometrical form and into the lamination strips 195*b* (FIG. 51). An adhesive 195*c* may be applied onto the exposed sections of the lamination strips 195*b* and the milled side edge areas 195*a* (FIG. 51) and the lamination strips turned upside down and adhered onto the milled side edge areas as shown in FIG. 52. C-clamps 195*d* may be applied to secure the lamination strips 195*b* onto the milled side edge areas 195*a*. With a quick drying epoxy or other glue, the drying may occur in less than 10-15 minutes. Cardboard 195*e* may be placed near the vacuum pods 26 under the C-clamps 195*d* to prevent dripping of the adhesive 195*c*.

Figure 54:
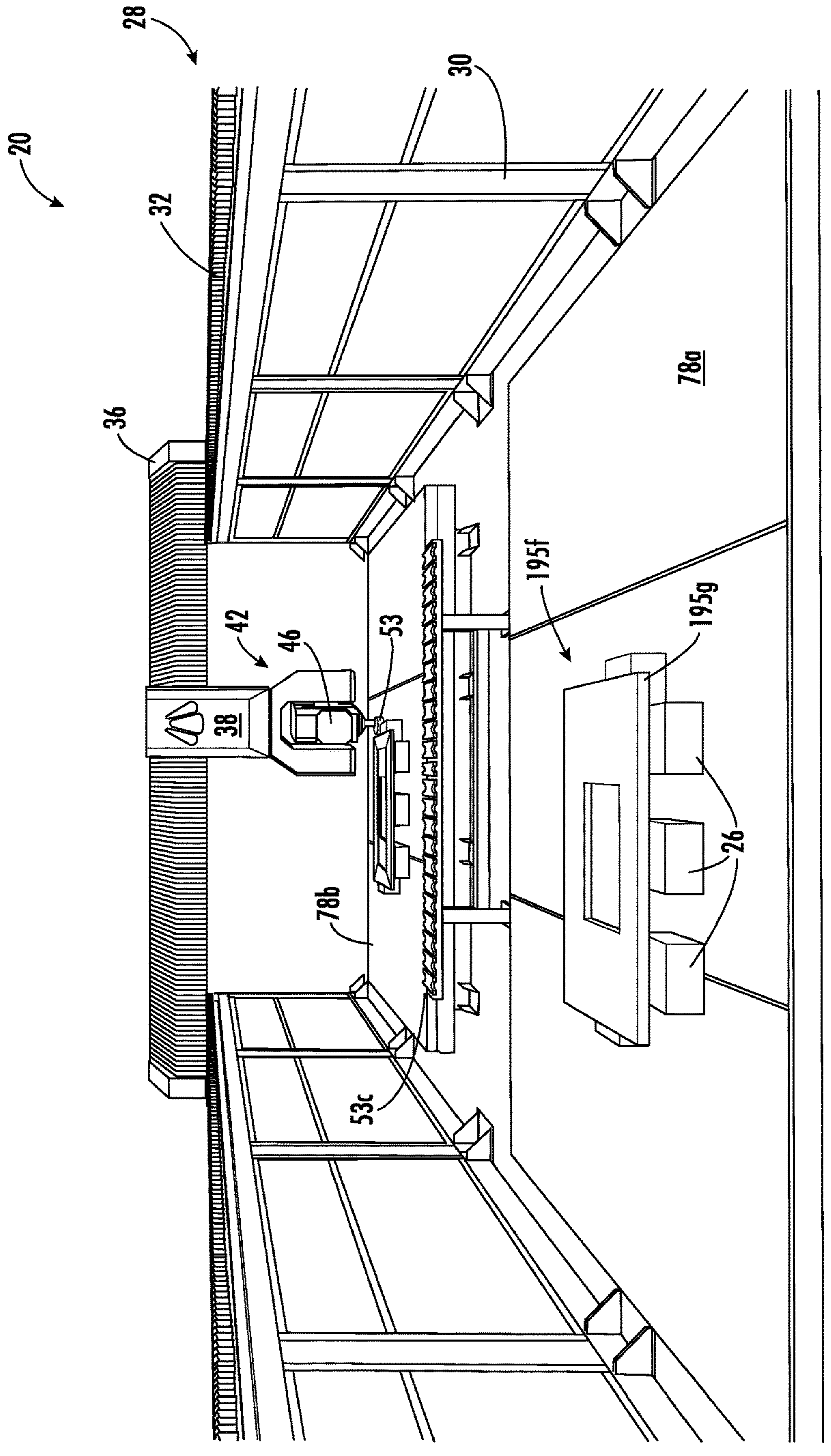
FIG. 54 is a schematic, isometric view of the machine of FIG. 53 showing the completed slab with its finished face up with adhered lamination strips and the machining head moved to a second work table for processing another slab.

Because a fast drying adhesive 195*c* is used, after about 10-15 minutes, the C-clamps 195*d* may be removed and the machining head 46 operated to edge the final slab 24 and the lamination strips 195*b* adhered onto the milled side edges 195*a* (FIG. 53) using a finishing tool 53. The edging may occur with a finishing tool 53, or in some examples, may be the same milling wheel 194 with a side edge for finishing. As shown in FIG. 54, the slab 24 is turned with the finished face 24*a* up to show the finished countertop 195*f* in this example that has the thicker edge 195*g* due to the lamination build-up with the lamination strips 195*b* (FIG. 54).

Figure 55:
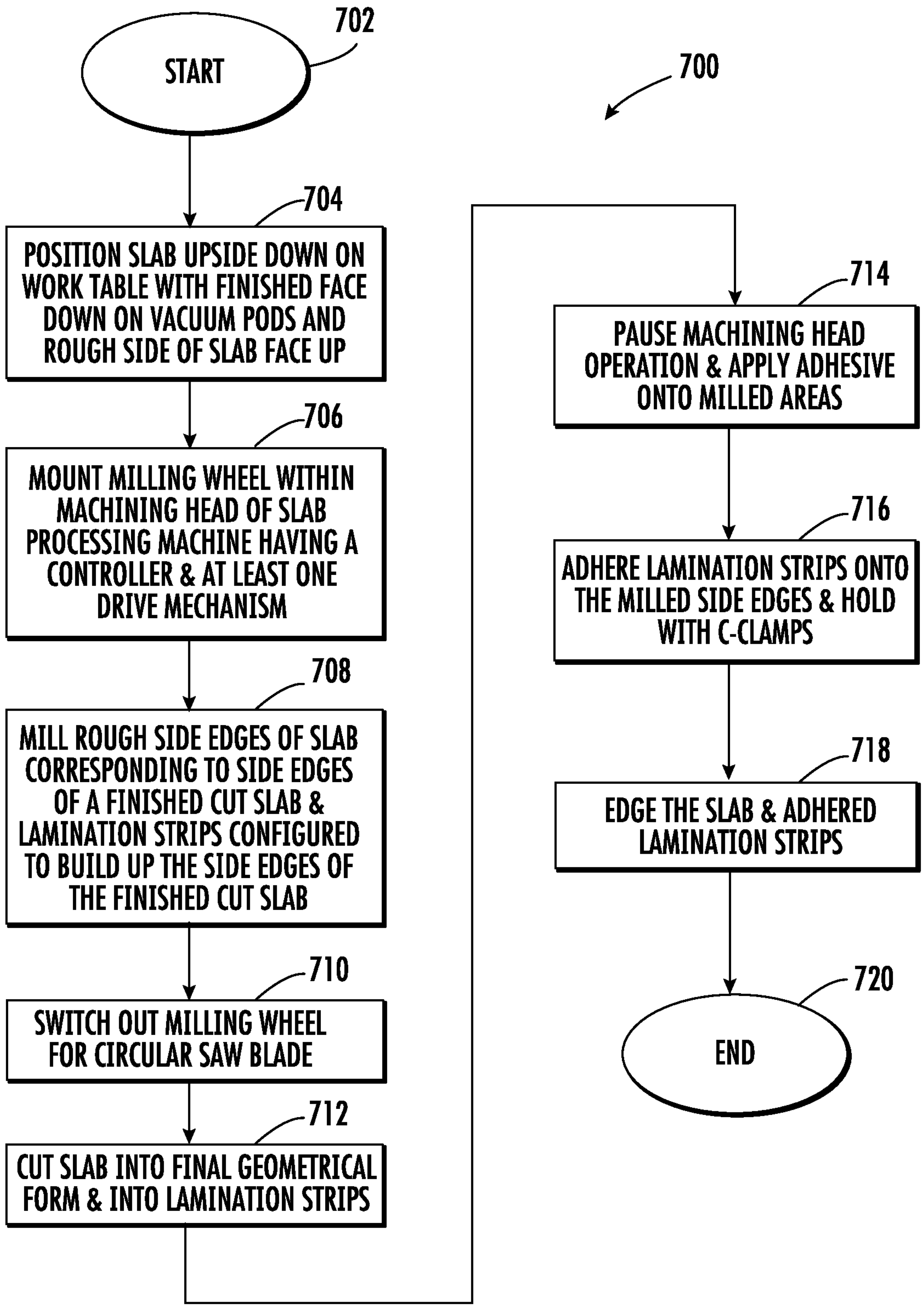
FIG. 55 is a high-level flow sequence of building up the side edge areas with lamination strips.

Referring now to FIG. 55, a flow sequence illustrates the method of manufacturing the slab 24 to produce the final side edge lamination with thick edge 195*g* (FIG. 54) and is illustrated generally at 700. The process starts (Block 702) and the slab 24 is positioned upside down on the work table 78*a* with the finished face 24*a* down on vacuum pods 26 and the rough or back side of the slab facing up (Block 704). The milling wheel 194 is mounted within the machining head 46 of the slab processing machine 20, which includes a controller 56 and at least one drive mechanism 100 (Block 706). The rough side edge sections 195*a* of the slab 24 are milled corresponding to side edge portions of a finished cut slab. The lamination strips 195*b* are milled corresponding to those strips that will build-up the side edge portions of the finished cut slab (Block 708). The milling wheel 194 is switched out for the circular saw blade 80 (Block 710). The slab 24 is cut into its final geometrical form and lamination strips 195*b* cut (Block 712). The machining head 46 is paused in its operation and adhesive 195*c* applied onto the milled areas (Block 714). The lamination strips 195*b* are turned upside down and adhered onto the milled side edge portions 195*a* and held with C-clamps 195*d* (Block 716). After the adhesive has dried, any C-clamps 195*d* may be removed from the slab 24 and the slab edge with the adhered lamination strips 195*b* are finished by edging with a finishing tool 53, for example (Block 718). The process ends (Block 720).

The slab processing machine 20 may be formed as a single table or a dual table slab processing machine. The slab 24 is placed upside down on the vacuum pods 26 using the hybrid cycle principal as described in detail before. The rough side that faces up away from the vacuum pods 26 is milled by the machine 20 automatically, very quickly, and precisely before cutting. This type of process had formerly been done primarily by hand. The slab 24 and lamination strips 195*b* are cut into the proper geometry by the circular saw blade 80 of the slab processing machine 20 while the slab is upside down with the finished face 24*a* down on the vacuum pods 26. If there are sink holes to be cut out and polished, the slab processing machine 20 performs this function before moving to the second work table 78*b*. In a single table model, the cycle is paused.

Cardboard pieces 195*e* may be placed underneath the slab 24 where its edges will be "laminated." Fast drying adhesive, such as an epoxy or other glue, may be applied to the lamination strips 195*b* and the side edge area sections 195*a*. The lamination strips 195*b* may be turned over and glued, and held to the slab using C-clamps 195*d*. The cardboard 195*e* catches any glue that may fall. During the drying process while the lamination strips are held by C-clamps 195*d*, the slab processing machine 20 and its machining head 46 may operate a slab work cycle on the second work table 78*b*, or in case of a single table model, pause since there may be a small waiting time. The C-clamps 195*d* are removed after letting the adhesive dry for about 10-15 minutes, and the cardboard 195*e* is removed. The machine 20 may continue and perform edging via the finishing tools 53, for example, as CNC profile tools. All the manual labor that was part of prior art fabrication techniques is eliminated except the adhesive application, and C-clamp insertion and removal. The slab processing machine 20 cuts the pieces to a correct geometrical shape, and then edges and polishes them with any sink holes that may have been cut by the slab processing machine. The only manual labor process is the gluing and the C-clamping and the time to do this process is literally at a minimum four to five times faster than the more manual process as described before. There is also less probability of slab sections breaking using the slab processing machine 20 and process as described. The milling is more precise as it is done by the computer numerical control (CNC) slab processing machine 20. The edging is more precise as it is also done by the CNC slab processing machine 20.

This application is related to copending patent applications entitled, "MACHINE FOR BEVEL ("MITER") CUTTING A SLAB WITH FINISHED FACE DOWN AND RELATED METHOD," and "SLAB PROCESSING MACHINE FOR SIDE EDGE LAMINATION AND RELATED METHOD," which are filed on the same date and by the same assignee and inventors, the disclosure which are hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A slab processing machine, comprising:

a work table;

a machining head and at least one drive mechanism connected thereto configured to drive the machining head over the work table in an X, Y, Z coordinate axis and rotate the machining head for C-axis rotation and A-axis rotation, said machining head configured to mount a circular saw blade for respective cutting of a stone slab positioned on the work table with a finished face of the slab down on vacuum pods;

a controller connected to the machining head and the at least one drive mechanism, said controller configured to operate the machining head to rotate the machining head on the A-axis and bevel cut in the slab a sink hole for a farm sink while the slab is positioned upside down with the finished face down on the vacuum pods; and a laser projector connected to said controller, wherein said controller is configured to project a first slab cut layout from the laser projector onto the work table to aid in positioning the slab upside down with the finished face down on the vacuum pods positioned on the work table, wherein the slab is oriented finished face down based upon a first mirror imaged slab cut layout that is projected from the laser projector.

2. The machine of claim 1 wherein said controller is configured to operate the machining head to bevel cut pieces from the slab that are configured in geometry to be adhered at an inside bevel cut edge of the sink hole and to respective bevel cut edges of each other, forming the sides of the farm sink.

3. The machine of claim 2 wherein the slab piece remaining from the bevel cut sink hole is configured to be adhered to a lower bevel cut edge of the bevel cut pieces forming the bottom of the farm sink, with the finished face exposed as the bottom of the farm sink.

4. The machine of claim 1 wherein the machining head is rotated about 45 degrees on the A-axis for bevel cutting.

5. The machine of claim 1 wherein the slab is oriented with the respective first mirror imaged slab cut layout that is based upon a slab cut layout on the finished face of the slab.

6. The machine of claim 1 wherein said machining head is configured to mount the circular saw blade, a finger bit, a milling wheel or at least one finishing tool for respective cutting, routing, milling or finishing of stone slabs positioned on the vacuum pods upside down with the finished face down.

7. A slab processing machine, comprising:

a work table;

a frame having guide rails;

a bridge mounted for movement on the guide rails over the work table along an X and Y coordinate axis;

a carriage mounted on the bridge and configured for vertical movement along a Z coordinate axis;

a machining head supported by a lower end of the carriage;

at least one drive mechanism connected to the bridge, carriage and machining head and configured to drive the machining head over the work table in an X, Y, Z coordinate axis and rotate the machining head for C-axis rotation and A-axis rotation, said machining head configured to mount a circular saw blade for respective cutting of a stone slab positioned on the work table with a finished face of the slab down on vacuum pods;

a controller connected to the machining head and the at least one drive mechanism, said controller configured to operate the machining head to rotate the machining head on the A-axis and bevel cut in the slab a sink hole for a farm sink while the slab is positioned upside down with the finished face down on the vacuum pods; and a laser projector connected to said controller, wherein said controller is configured to project a first slab cut layout from the laser projector onto the work table to aid in positioning the slab upside down with the finished face down on the vacuum pods positioned on the work table, wherein the slab is oriented finished face down based upon a first mirror imaged slab cut layout that is projected from the laser projector.

8. The machine of claim 7 wherein said controller is configured to operate the machining head to bevel cut pieces from the slab that are configured in geometry to be adhered at an inside bevel cut edge of the sink hole and to respective bevel cut edges each other, forming the sides of the farm sink.

9. The machine of claim 8 wherein the slab piece remaining from the bevel cut sink hole is configured to be adhered to a lower bevel cut edge of the bevel cut pieces forming the bottom of the farm sink, with the finished face exposed as the bottom of the farm sink.

10. The machine of claim 7 wherein the machining head is rotated about 45 degrees on the A-axis for bevel cutting.

11. The machine of claim 7 wherein the slab is oriented with the respective first mirror imaged slab cut layout that is based upon a slab cut layout on the finished face of the slab.

12. The machine of claim 7 comprising a machine yoke rotatably mounted at the lower end of the carriage and configured for C-axis rotation, said machine yoke comprising opposing support arms, said machining head rotatably mounted between the support arms and configured for A-axis rotation for bevel cutting.

13. The machine of claim 7 wherein said machining head is configured to mount the circular saw blade, a finger bit, a milling wheel or at least one finishing tool for respective cutting, routing, milling or finishing of stone slabs positioned on the vacuum pods upside down with the finished face down.

14. A method of operating a slab processing machine having a work table, a machining head, at least one drive mechanism connected thereto, and a controller connected to the at least one drive mechanism, the method comprising:

positioning a stone slab upside down on vacuum pods on the work table with a finished face of the slab down on the vacuum pods;

mounting a circular saw blade within the machining head;

controlling the at least one drive mechanism to drive the machining head over the work table in an X, Y, Z coordinate axis and rotate the machining head for C-axis rotation and A-axis rotation;

rotating the machining head on the A-axis into a predetermined bevel angle; and bevel cutting in the slab a sink hole for a farm sink while the slab is positioned upside down with the finished face down on the vacuum pods, wherein the controller operates the machining head to bevel cut pieces from the slab that are configured in geometry to be adhered at an inside bevel cut edge of the sink hole and to respective bevel cut edges of each other, forming the sides of the farm sink.

15. The method of claim 14 wherein the slab piece remaining from the bevel cut sink hole is configured to be adhered to a lower bevel cut edge of the bevel cut pieces forming the bottom of the farm sink, with the finished face exposed as the bottom of the farm sink.

16. The method of claim 14 comprising rotating the machining head about 45 degrees on the A-axis for bevel cutting.

17. The method of claim 14 comprising:

connecting a laser projector to the controller; and projecting a first slab cut layout from the laser projector onto the work table to aid in positioning the slab upside down with the finished face down on the vacuum pods positioned on the work table.

18. The method of claim 17 comprising orienting the slab finished face down based upon a first mirror imaged slab cut layout that is projected from the laser projector.

19. The method of claim 18 comprising orienting the slab with the respective first mirror imaged slab cut layout that is based upon a slab cut layout on the finished face of the slab.

20. The method of claim 14 comprising forming a frame having guide rails, a bridge mounted for movement on the guide rails over the work table along an X and Y coordinate axis, a carriage mounted on the bridge and configured for vertical movement along a Z coordinate axis, and the machining head supported at a lower end of the carriage.

21. The method of claim 20 comprising forming a machine yoke rotatably mounted at the lower end of the carriage and configured for C-axis rotation, said machine yoke comprising opposing support arms, and rotatably mounting the machining head between the support arms for A-axis rotation and bevel cutting.

22. The method of claim 14 comprising mounting the circular saw blade, a finger bit, a milling wheel or at least one finishing tool within the machining head for respective cutting, routing, milling or finishing of stone slabs positioned on the vacuum pods upside down with the finished face down.

* * * * *